(12) United States Patent
Hirosawa

(10) Patent No.: US 7,623,733 B2
(45) Date of Patent: Nov. 24, 2009

(54) IMAGE COMBINATION DEVICE, IMAGE COMBINATION METHOD, IMAGE COMBINATION PROGRAM, AND RECORDING MEDIUM FOR COMBINING IMAGES HAVING AT LEAST PARTIALLY SAME BACKGROUND

(75) Inventor: Masashi Hirosawa, Kyoto (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 962 days.

(21) Appl. No.: 10/523,770

(22) PCT Filed: Jul. 3, 2003

(86) PCT No.: PCT/JP03/08510

§ 371 (c)(1),
(2), (4) Date: Feb. 8, 2005

(87) PCT Pub. No.: WO2004/015987

PCT Pub. Date: Feb. 19, 2004

(65) Prior Publication Data

US 2006/0078224 A1 Apr. 13, 2006

(30) Foreign Application Priority Data

Aug. 9, 2002 (JP) ............................ 2002-233012
Aug. 9, 2002 (JP) ............................ 2002-233130

(51) Int. Cl.
*G06K 9/36* (2006.01)
*G06K 9/32* (2006.01)
*H04N 5/228* (2006.01)
*H04N 5/262* (2006.01)
*G03B 17/18* (2006.01)

(52) U.S. Cl. .................... 382/284; 382/294; 348/222.1; 348/239; 396/287

(58) Field of Classification Search .................. 382/284
See application file for complete search history.

(56) References Cited

U.S. PATENT DOCUMENTS 5,465,163 A * 11/1995 Yoshihara et al. ............ 358/444

(Continued)

FOREIGN PATENT DOCUMENTS

JP        60-190078 A       9/1985

(Continued)

OTHER PUBLICATIONS

Casio News Release, Jun. 24, 2002 (http://www.casio.co.jp/release/2002/qv_r4.html).

(Continued)

*Primary Examiner*—Bhavesh M Mehta
*Assistant Examiner*—David P Rashid
(74) *Attorney, Agent, or Firm*—Birch, Stewart, Kolasch & Birch, LLP

(57) ABSTRACT

An image combination device acquires a first object image, a second object image, and a background image by first object image acquiring section (1), second object image acquiring section (3), and background image acquiring section (2) and by using one of the three images as a standard image, generates two corrected images by background correction amount calculating section (4) and corrected image generating section (5), so that background portions of the two images correspond. Superimposed image generating section (9) generates an image by superimposing the standard image and one or two of the corrected images. According to this arrangement, since the backgrounds of the superimposed images correspond to each other, the first object and the second object, which have been photographed separately, can be combined without causing an impression that these objects are combined to the background artificially.

29 Claims, 48 Drawing Sheets

U.S. PATENT DOCUMENTS

| | | | |
|---|---|---|---|
| 5,786,847 A * | 7/1998 | Katayama et al. | 348/47 |
| 5,838,837 A * | 11/1998 | Hirosawa et al. | 382/284 |
| 5,999,662 A * | 12/1999 | Burt et al. | 382/284 |
| 6,005,987 A * | 12/1999 | Nakamura et al. | 382/294 |
| 6,205,259 B1 * | 3/2001 | Komiya et al. | 382/284 |
| 6,215,914 B1 * | 4/2001 | Nakamura et al. | 382/284 |
| 6,292,593 B1 * | 9/2001 | Nako et al. | 382/284 |
| 6,389,179 B1 * | 5/2002 | Katayama et al. | 382/284 |
| 6,429,895 B1 * | 8/2002 | Onuki | 348/208.99 |
| 6,466,262 B1 * | 10/2002 | Miyatake et al. | 382/284 |
| 6,516,154 B1 * | 2/2003 | Parulski et al. | 396/287 |
| 6,549,681 B1 * | 4/2003 | Takiguchi et al. | 382/294 |
| 6,798,923 B1 * | 9/2004 | Hsieh et al. | 382/284 |
| 2002/0001036 A1 | 1/2002 | Kinjo | |
| 2002/0097920 A1 * | 7/2002 | Bender et al. | 382/278 |
| 2003/0103683 A1 * | 6/2003 | Horie | 382/284 |
| 2003/0107586 A1 | 6/2003 | Takiguchi et al. | |
| 2003/0219146 A1 * | 11/2003 | Jepson et al. | 382/103 |
| 2006/0188175 A1 | 8/2006 | Takiguchi et al. | |

FOREIGN PATENT DOCUMENTS

| | | |
|---|---|---|
| JP | 5-14810 A | 1/1993 |
| JP | 5-161050 A | 6/1993 |
| JP | 2000-36032 A | 2/2000 |
| JP | 2000-295564 A | 10/2000 |
| JP | 2000-316125 A | 11/2000 |
| JP | 2001-333327 A | 11/2001 |
| JP | 2002-171398 A | 6/2002 |
| JP | 2003-44852 A | 2/2003 |

OTHER PUBLICATIONS

Olympus News Release, Mar. 12, 2002 (http://www.olympus.co.jp/LineUp/Digicamera/C2z/c2z.html).

* cited by examiner

FIG. 4

|  | x=0 | | | x=1 | | | x=2 | | |
|---|---|---|---|---|---|---|---|---|---|
| y=0 | R | G | B | R | G | B | R | G | B |
| y=1 | R | G | B | R | G | B | R | G | B |
| y=2 | R | G | B | R | G | B | R | G | B |

IMAGE COMBINATION DEVICE, IMAGE COMBINATION METHOD, IMAGE COMBINATION PROGRAM, AND RECORDING MEDIUM FOR COMBINING IMAGES HAVING AT LEAST PARTIALLY SAME BACKGROUND

This application is the national phase of PCT International Application No. PCT/JP2003/008510 filed on Jul. 3, 2003 under 35 U.S.C. § 371. The entire contents of each of the above-identified applications are hereby incorporated by reference.

TECHNICAL FIELD

The present invention relates to devices, methods, programs, and program mediums for combining a plurality of objects, which are imaged separately, into a single image so that the objects look as if they existed spontaneously. The devices, methods, programs, and program mediums help to photograph/combine objects without causing overlap of the objects.

BACKGROUND ART

If two persons wish to have their photographs taken by using a film camera or digital camera while they are standing next to each other, for example, they must use a tripod and a self-timer, or ask a third person such as a stranger to take their photograph.

However, it is a painful job to carry around a tripod. On the other hand, one may feel ill at ease to ask a stranger to take a photograph.

In view of this problem, Japanese Publication for Laid-Open Patent Application, Tokukai 2000-316125 (publication date: Nov. 14, 2000) discloses an image combination device that can extract object regions from a plurality of photographs taken at the same place, and, by combining or not combining an object image with a background, create a background-only image or an image that looks as if an object of another image had been present spontaneously.

Japanese Publication for Laid-Open Patent Application, Tokukai 2001-333327 (publication date: Nov. 30, 2001) discloses a digital camera and an image processing method. With the digital camera and the image processing method, an already photographed image can be used as a reference image, and a specified region (object region) thereof can be displayed on a monitor screen or in a finder as if the specified region were superimposed on an image to be photographed. In addition, it is possible to create image data of a composite image, in which an object in the object region is combined with the image to be photographed.

However, roughly speaking, these prior arts have the following two problems.

The first problem is as follows: if the object region of the reference image is merely carved out and superimposed on another image, (1) an object in the composite image could have a missing part, and/or (2) an unnecessary region could be combined, if the object region is specified imprecisely. In addition, (3) even if the object region is specified precisely, the boundary between combined images could look slightly unnatural.

For example, if (1) the specified object region in the reference image (hereinafter "specified object region") has a missing part that exists in an actual object region, the part is also missing from the composite image. This makes the composite image look obviously unnatural.

If (2) the specified object region in the reference image is too larger than the actual object region, the specified object region includes a background surrounding the object in the reference image. The "unnecessary region" mentioned above is this background portion. According to the combination method described in Tokukai 2001-333327, an image could be photographed at a place different from the place where the reference image was photographed. Therefore, the background image included in the specified object region (background within the reference image) and the background surrounding the object in the composite image (background within the image to be photographed) could be different. In this case, the composite image looks very unnatural, because the background suddenly changes at the specified object region.

According to the combination method described in Tokukai 2001-333327, even if both images are photographed at the same place with the same background, the specified object region in the reference image could be positioned/combined at an arbitrary position in the image to be photographed. Therefore, the background image included in the specified object region (background within the reference image) and the background, of the image to be photographed, surrounding the position where the two images are combined (background within the image to be photographed) not necessarily backgrounds of the same position. Accordingly, the resultant composite image looks unnatural.

If, as in Tokukai 2001-333327, a user specifies an outline of the specified object region in the reference image by using a tablet or the like, it is unlikely that the specified object region is very imprecise. This is because the outline is traced by the human. However, there is a possibility that errors of one, two, or several pixels might occur. It is not easy to specify the outline by hand with a pixel-size precision.

An example of the case where (3) the boundary between combined images looks slightly unnatural even if the specified object region is precise is a case where, even if the specified object region in (1) and (2) has a pixel-size precision, outline pixels do not match the background of the image to be photographed, as a result of combination of the specified object region.

This is because specifying by pixel is not precise enough to define the outline of the specified object region. To define the outline, a unit finer than a pixel is required. In other words, in an outline pixel, originally (0.X) pixel is an object portion, and (1.0-0.X) pixel is a background portion. The pixel value is a proportional sum (i.e. average value) of the pixel value of the object portion and the pixel value of the background portion.

The proportion between the object portion and the background portion cannot be calculated inversely from the averaged pixel value. Therefore, images must be combined on a pixel-by-pixel basis. As a result, the pixel value of the outline of the composite image includes the value of the background of the reference image, and the outline does not match the surrounding background of the image to be photographed.

The problems (1) to (3) cannot be solved by the combination method disclosed in Tokukai 2000-316125. This publication discloses that positioning is performed before superimposing a plurality of images photographed at the same place or at close-hand positions.

However, if two persons take photographs of each other alternately with the same background, for example, the position of the background appears differently in the photographs taken, due to the difference in camera angles. Besides, the image might be rotated if the camera is inclined; the image might be enlarged or reduced if the distance between the photographer and the object differs; and the image might be distorted if the height of the photographers are different, because the elevation angles of the camera are different in this case.

Therefore, the problems (1) to (3) cannot be solved by merely performing positioning of the images to be superimposed. As a result, the composite image looks unnatural.

The second problem is as follows: if photographs are taken for the purpose of combining an object region of a reference image with an image to be photographed that includes another object, and sufficient attention is not paid to the positions of the objects at the time of shooting, object regions of the respective images might be superimposed on each other in the composite image, or the object of one of the images might extend off the composite image.

In connection with this problem, Tokukai 2000-316125 only describes a combination method using an image that has already been photographed. There is no mention to, for example, a photograph-taking method that can prevent objects from being superimposed on each other or prevent the objects from extending off the composite image.

According to an image-processing method of Tokukai 2001-333327, an object region (the outline of which is specified by the user using a tablet or the like) of a reference image and an image to be photographed can be displayed in a superimposed state. Therefore, in combining the object region of the reference image and the object region of the image to be photographed, it is possible to know, at the time of shooting, whether or not the objects will be superimposed on each other and whether or not an object region will extend off the composite image. If the objects are superimposed or an object extends off, the position of the object in the image to be photographed can be changed by moving the object or the camera. Therefore, it is possible to photograph/record an image in which objects are not superimposed and the objects do not extend off.

However, the foregoing method is inconvenient in that high-level processing such as the processing for recognizing the object regions, the processing for judging whether or not the object regions are superimposed on each other, and the processing for judging whether or not an object region extends off the composite image, must be performed by human. It is also inconvenient that the object region of the reference image must be specified manually.

The present invention was made in view of the foregoing problems. The first objective of the present invention is to provide an image combination device (image combination method) that can combine images without making the composite image look unnatural. The second objective of the present invention is to provide an image combination device (image combination method) that helps photographing so that objects will not be superimposed on each other in a composite image in combining a plurality of objects, which are imaged separately, into a single image as if the objects exist spontaneously.

SUMMARY OF THE INVENTION

To attain the foregoing objectives, a first image combination device of the present invention includes: amount of background correction calculating means for calculating an amount of background correction or reading out the amount of background correction after the amount of background correction is calculated and recorded, the background correction being performed among (i) a background image, which is an image of a background, (ii) a first object image, which includes at least a part of the background and a first object, and (iii) a second object image, which includes at least a part of the background and a second object, the amount of background correction being one or a combination of relative amounts including an amount of movement, an amount of rotation, a rate of expansion or reduction, and an amount of distortion correction, with respect to a background; and superimposed image generating means for generating a superimposed image by using one of the background image, the first object image, and the second object image as a standard image, correcting the other two images by the amount of correction obtained from the amount of background correction calculating means, the other two images being corrected so that backgrounds, other than objects, of the other two images correspond to the standard image at least partially, and superimposing the standard image and one or both of the other two images.

In this arrangement, the "first object" and the "second object" are objects to be combined. In general, these objects are persons, but they can be articles or the like. Strictly speaking, the "first object" is a region where pixel values do not correspond when a background portion of a background image and a background portion of a first object image overlap at least partially. In other words, any region where there is a change has a possibility to be a "first object region". Therefore, the background image is acquired to be compared with the first object image, so as to extract the "region of the first object". (In some cases, the background image is used in order to fill a gap when the first object image and the second object image have no corresponding background portion.)

However, "any region where there is a change" could include a minor change in the background portion caused by leaves waving in the breeze. Therefore, in order to obtain a more natural superimposed image, it is preferable to ignore minor changes and small regions. The same holds true with the "second object".

If the object is a person, the object is not necessarily a single person; a plurality of persons may collectively constitute the "first object" or the "second object". In other words, if a plurality of persons are handled collectively as a unit in combining images, the plurality of persons constitute a single "object". This is also true when the object is an article, not a person.

The object is not always a single region; a plurality of regions may constitute the object. The ordinals "first" and "second" are assigned merely for the purpose of distinguishing different frame images, and these ordinals have no such meaning as an order of shooting. Therefore, there is no fundamental difference between the "first object" and the "second object". For example, if a person has a cloth or an article, and these items do not appear on a "background-only image that does not include the first and second objects", these items are also included in the object.

The "first object image" and "second object image" are separate images respectively including the "first object" and the "second object". In general, these images are images of the respective objects photographed separately by a camera or the like. However, if these images only include the objects, and do not include any background portions corresponding to each other, these images are not suitable for combination, because positioning cannot be performed based on a corresponding background portion. Therefore, it is necessary that at least part of these images are background portions corresponding to each other. Usually, the first object image and the second object image are photographed with the same background, that is, without moving the camera significantly.

The camera for photographing the objects may not be a still camera for recording an image as a still picture. Instead, the camera may be a video camera for recording images as a moving picture. In the case where a superimposed image is generated as a still picture by a video camera, an image of one frame, which is part of the moving picture, is picked up as an object image, and combined.

The "background portion" is a portion that remains after the "first object" and the "second object" are removed from a scene.

The "background image" is an image that includes at least a part of the background portion of the first object image and at least a part of the background portion of the second object image. The "background image" neither includes the first object nor the second object. Usually, the "background image" is photographed with the same background as that of the first object image and the second object image (that is, without moving the camera significantly) after the first object and the second object are removed from in front of the camera.

The "background portion other than the first/second object" is a portion that remains after the first/second object region is removed from the first/second object image.

The "amount of movement" is an amount of parallel movement of an image moved so that at least a part of its background corresponds to the standard image. In other words, the "amount of movement" is an amount of parallel movement of a center of rotation, expansion, or reduction.

The "amount of distortion correction" is an amount of correction performed so as to correct an amount of change that remains uncorrected after a change of the image to be photographed caused by a change in the position and/or direction of the camera and/or the lens is corrected incompletely by parallel movement, rotation, and/or expansion or reduction. For example, the "amount of distortion correction" includes an amount of perspective correction or the like. "Perspective" is an effect that, for example, an upper portion of a high building taken in a photograph looks smaller than a lower portion due to the law of perspective, even through the actual size is the same.

"Superimposed image generating means" generates a superimposed image. However, the superimposed image does not have to be a single image. Together with another means, the superimposed image generating means may make images look as if they were combined. For example, in displaying an image on display means, if a part of another image is displayed on the image, it looks as if a composite image created from the two images were displayed. In reality, however, the two images exist separately, and there is no composite image.

The amount of correction calculating means calculates the amount of correction by such a method as block matching, in which partial positional correspondence of two images is calculated. In the case of calculating correspondence between two of the first object image, the second object image, and the background image by such a method, if the two images have corresponding background portions, correspondence between the background portions can be calculated. An object portion of one image does not exist in the other images. Therefore, any correspondence found in the object portion is a false correspondence. Out of true correspondence between background portions and false correspondence between object portions, only the true correspondence between background portions is obtained by a statistical or other method. From the remaining true correspondence, it is possible to calculate the amount of correction that is one or a combination of an amount of relative movement, an amount of rotation, a rate of expansion or reduction, and an amount of distortion correction, with respect to a background portion.

Based on the amount of correction calculated by the amount of background correction calculating means, the superimposed image generating means generates corrected images obtained by correcting the other two images so that the background portions thereof correspond to the background portion of the standard image. The calculated amount of correction indicates the relationship between two images. For example, if the relationship between A and B and the relationship between B and C are determined, the relationship between A and C is also determined. In the same way, whichever one of the three images is chosen as the standard image, the amount of correction calculating means can calculate, as the amount of correction, the relationships between the standard image and the other two images.

The superimposed image generating means then generates an image by superimposing one or two corrected images onto the standard image. The images may be superimposed by mixing image data of positionally corresponding pixels of the three images at arbitrary ratios from zero to one allotted proportionally. For example, if the ratio of the background image is zero, the ratio of the first object image is one, and the ratio of the second object image is zero, only the image data of the first object image is written onto the pixel. If the mixing ratio of the three images is 1:1:1, image data obtained by evenly combining the image data of the three images is written onto the pixel.

How to set the mixing ratio is not an essential matter for the present invention. It depends on the type of the superimposed image the user wishes to display or output.

By the foregoing processing, as a significant feature of the present invention, it is possible to combine the first object and the second object into a single image, after making the background portions correspond to each other.

If the background image is used as the standard image, at least the "region of the first object" and the "region of the second object" extracted from the corrected first object image and the corrected second object image are combined onto the background image.

As described above, the background portions other than the "region of the first object" and the "region of the second object" may be combined with corresponding pixels of the background image, or may not be combined at all.

If the first object image or the second object image is used as the standard image, the superimposed image may be generated by merely combining the region of the object (object region) extracted from the other corrected object image through comparison with the corrected background image. Alternatively, onto the background portion of the standard image, the corresponding pixels of the background image may be combined at an appropriate ratio from zero to one.

Thus, there are various ways of superimposing a standard image and corrected one or two images.

Thus, two images can be combined after correcting the gap and distortion between backgrounds. Therefore, those portions that remain after obviously different regions, such as objects, are removed (that is, background portions) corresponds in the composite image, no matter how they are superimposed. As a result, there is an effect that the composite image does not look unnatural. For example, in combining primarily an object region only, even if the object region is extracted and specified imprecisely, the background portion surrounding the object region does not mismatch a portion of an image to which the object region is to be combined. Therefore, inside and outside of the imprecise region are combined as a continuous scene. As a result, there is an effect of mitigating the unnatural look.

As discussed in the part of problems to be solved by the present invention, even if the object region is extracted with a pixel-size precision, the unnatural look at a level finer than one pixel is inevitable according to the conventional method. In contrast, according to the present invention, images are combined after correcting the gap and distortion in background portions. Therefore, a pixel surrounding an outline pixel is a pixel in the same position of the background portion, and is therefore combined naturally. Thus, there is an effect that it is possible to eliminate or mitigate the unnatural look at the level finer than one pixel.

Moreover, since the images are combined after the gap and distortion of backgrounds are corrected, it is not necessary to fix the camera or the like by a tripod or the like at the time of photographing the first or second object image. It is sufficient to direct the camera or the like approximately by hand or the like. As a result, there is an effect that photographs can be taken easily.

In the case where only the first and second object images are used without using the background image, the amount of background correction calculating means cannot calculate the amount of correction, if there is no correspondence (corresponding portions) between the background portions of the first object image and the second object image. In the case where the background image is used, even if there is no correspondence between the background portions of the first object image and the second object image, the amount of correction between the first object image and the second object image can be calculated if there is correspondence between the background image and the background portion of the second object image.

Therefore, there is an effect that, even if the background between the background portion of the first object image and the background portion of the second object image is missing, it is possible, as long as the missing background portion is filled by the background of the background image, to combine the first object image and the second object image (background portions of which do not overlap) so that their backgrounds are connected to each other.

In addition, the superimposed image can be generated by calculating the amount of correction between the first object image and the second object image by using the background image, extracting required background portions from the background image, the first object image, and the second object image, connecting the background portions to supplement missing portions thereof, and combining the first object and the second object onto the background thus obtained.

The first image combination device may further include: object region extracting means for extracting a region of the first object and a region of the second object from a difference image generated from the standard image and the other one or two corrected images, the superimposed image generating means superimposing the standard image and the regions of the one or two corrected images obtained from the object region extracting means, instead of superimposing the standard image and the one or two corrected images.

The "region of an object" is a region demarcated by a boundary which separates an object from the background. For example, if a person has a cloth or an article in the first object image, and these items do not appear in the second object image, these items are also included in the object region as an object. The object region is not always a continuous, single region; the object may be divided into a plurality of regions.

"To superimpose the standard image and the regions of the one or two corrected images obtained from the object region extracting means" does not mean that no image is generated other than that region; it means that the other regions are filled with the standard image or the like.

Since the background portions are corrected so as to correspond to each other, what appear as differences are primarily the object portions. Therefore, the object regions included in the difference image can be extracted by the object region extracting means. At this time, if such processing as noise reduction for the difference image is performed (e.g. remove those pixels of the difference image whose pixels values are not higher than a threshold value), the object regions can be extracted more precisely.

In generating the superimposed image, a pixel value in each pixel position is determined. The image of an object is superimposed only if the pixel position is within the object region obtained from the object region extracting means.

As a result, there is an effect that only the object region of the corrected object image can be combined onto the reference image or the corrected background image. Alternatively, it is possible to combine only the object region of the standard image onto the corrected object image or the corrected background image, combine the object region of the standard image and the object region of the corrected object image onto the corrected background image, or combine the object region of the corrected object image onto the background image as the reference image.

If images are combined at different transmittances, the user can easily know which region is to be combined and, if any, the occurrence of overlap between objects. This also brings about an effect of helping the photography by avoiding overlap.

If there is overlap, the image may be photographed again after resolving the overlap by moving the object or the camera. Helping the photography in this case means, for example, making it easier for the user to know whether or not there is overlap, and giving the user information (here, the composite image) on how much the object or the camera should move to avoid the overlap.

It is possible to calculate the amount of background correction by using only the first object image and the second object image, without using the background, correct the first object image or the second object image, generate the difference image, and calculate the difference region, if the background portions have an appropriate amount of correspondence. In this case, if the region of the first object and the region of the second object do not overlap, the difference region is determined to be two independent regions: one is a region having the outline of the first object (hereinafter referred to as "first region", for the purpose of explanation), and the other is a region having the outline of the second object (hereinafter "second region").

Within one object image, it is certain that one of the first region or the second region is an object portion and the other of the first region or the second region is a background portion (around the difference regions is the same background portion). For example, in the first object image, one is a first object portion and the other is a background portion. In other words, out of the first region of the first object image and the first region of the second object image, one is an object portion and the other is a background portion.

However, from the difference image created based solely on the first object image and the second object image, it is impossible to judge which is the object portion and which is the background portion.

On the other hand, if the background image is used, there is an effect that it is easy to judge which is the object portion and which is the background portion. For example, if the background image is used as the standard image, the object region obtained from the background image and the corrected first object image is the first region only. In this case, needless to say, the first region of the corrected first object image is the object portion, and the first region of the background image is the background portion. The same holds true with the second object image. Since the first region and the second region are never extracted simultaneously from the difference image, it is easy to judge which is the object portion and which is the background portion.

By thus using the three images, that is, the background image, the first object image, and the second object image, there is an effect that the region of the first object or the region of the second object can be extracted easily. In addition, since the region of the first object and the region of the second object can be extracted separately, there is also an effect that it is possible to decide which one to combine with preference, that is, if there is overlap between the objects, whether the first object comes in front of the second object or behind the second object in the composite image.

To attain the foregoing objectives, a second image combination device of the present invention includes: amount of background correction calculating means for calculating an amount of background correction or reading out the amount of background correction after the amount of background correction is calculated, the background correction being performed among (i) a first object image, which includes a background and a first object, and (ii) a second object image, which includes at least a part of the background and a second object, the amount of background correction being one or a combination of relative amounts including an amount of movement, an amount of rotation, a rate of expansion or reduction, and an amount of distortion correction, with respect to a background; and superimposed image generating means for generating a superimposed image by using one of the first object image or the second object image as a standard image, correcting the other of the first object image or the second object image by the amount of correction obtained from the amount of background correction calculating means, so that a background portion, other than the object, of the other of the first object image or the second object image corresponds to the standard image at least partially, and superimposing the standard image and a corrected image.

In this arrangement, the "first object" and the "second object" are objects to be combined. In general, these objects are persons, but they can be articles or the like. Strictly speaking, an "object" is a region where pixel values do not correspond when a background portion of a background image and a background portion of a first object image overlap at least partially. In other words, any region where there is a change has a possibility to be a "region of an object".

However, "any region where there is a change" could include a minor change in the background portion caused by leaves waving in the breeze. Therefore, in order to extract the "region of an object" more precisely and obtain a more natural superimposed image, it is preferable to ignore minor changes and small regions.

If the object is a person, for example, the object is not necessarily a single person; a plurality of persons may collectively constitute the "first object" or the "second object". In other words, if a plurality of persons are handled collectively as a unit in combining images, the plurality of persons constitute a single "object". This is also true when the object is an article, not a person.

The object is not always a single region; a plurality of regions may constitute the object. The ordinals "first" and "second" are assigned merely for the purpose of distinguishing different frame images, and these ordinals have no such meaning as an order of shooting. Therefore, there is no fundamental difference between the "first object" and the "second object". For example, if a person has a cloth or an article, and these items do not appear on a "background-only image that does not include the first and second objects", these items are also included in the object.

The "first object image" and "second object image" are separate images respectively including the "first object" and the "second object". In general, these images are images of the respective objects photographed separately by a camera or the like. However, if these images only include the objects, and do not include any background portions corresponding to each other, these images are not suitable for combination. Therefore, it is necessary that at least part of these images are background portions corresponding to each other. Usually, the first object image and the second object image are photographed with the same background, that is, without moving the camera significantly.

The camera for photographing the objects may not be a still camera for recording an image as a still picture. Instead, the camera may be a video camera for recording images as a moving picture. In the case where a superimposed image is generated as a still picture by a video camera, an image of one frame, which is part of the moving picture, is picked up as an object image, and combined.

The "background portion" is a portion that remains after the "first object" and the "second object" are removed from a scene.

The "amount of movement" and the "amount of distortion correction" are the same as those described in connection with the first image combination device.

The "superimposed image generating mean" generates a superimposed image. However, the superimposed image does not have to be a single image. Together with image data of another means, the superimposed image generating means may make images look as if they were combined. For example, in displaying an image on display means, if a part of another image is displayed on the image, it looks as if a composite image created from the two images were displayed. In reality, however, two images based on two sets of image data exist separately, and there is no composite image data.

The amount of correction calculating means calculates the amount of correction by such a method as block matching, in which partial positional correspondence of two images is calculated. In the case of calculating correspondence between two of the first object image, the second object image, and the background image by such a method, if the two images have corresponding background portions, correspondence between the background portions can be calculated. An object portion of one image does not exist in the other images. Therefore, any correspondence found in the object portion is a false correspondence. Out of true correspondence between background portions and false correspondence between object portions, only the true correspondence between background portions is obtained by a statistical or other method. From the remaining true correspondence, it is possible to calculate the amount of correction that is one or a combination of an amount of relative movement, an amount of rotation, an a rate of expansion or reduction, and an amount of distortion correction, with respect to a background portion.

Based on the amount of correction calculated by the amount of background correction calculating means, the superimposed image generating means generates a corrected image obtained by correcting the other image so that the background portion thereof correspond to the background portion of the standard image. The superimposed image generating means then generates an image by superimposing the corrected image onto the standard image.

The images may be superimposed by mixing image data of positionally corresponding pixels of the two images at arbitrary ratios from zero to one allotted proportionally. For example, if the ratio of the first object image is one, and the ratio of the second object image is zero, only the image data of the first object image is written onto the pixel. If the mixing ratio of the two images is 1:1, image data obtained by evenly combining the image data of the two images is written onto the pixel.

How to set the mixing ratio is not an essential matter for the present invention. It depends on the type of the superimposed image the user wishes to display or output.

By the foregoing processing, it is possible to combine the first object and the second object into a single image, after making the background portions correspond to each other.

Since two images can be combined after correcting the gap and distortion between backgrounds, those portions that remain after obviously different regions, such as objects, are removed (that is, background portions) corresponds in the composite image, no matter how they are superimposed. As a result, there is an effect that the composite image does not look unnatural. For example, in combining primarily an object region only, even if the object region is extracted and specified imprecisely, the background portion surrounding the object region does not does not have a gap or distortion from a portion of an image to which the object region is to be combined. Therefore, inside and outside of the imprecise region are combined as a continuous scene. As a result, there is an effect of mitigating the unnatural look.

As discussed in the part of problems to be solved by the present invention, even if the object region is extracted with a pixel-size precision, the unnatural look at a level finer than one pixel is inevitable according to the conventional method. In contrast, according to the present invention, images are combined after correcting the gap and distortion in background portions. Therefore, a pixel surrounding an outline pixel is a pixel in the same position of the background portion, and is therefore combined almost naturally. Thus, there is an effect that it is possible to eliminate or mitigate the unnatural look at the level finer than one pixel.

Moreover, since the images are combined after the gap and distortion of backgrounds are corrected, it is not necessary to fix the camera or the like by a tripod or the like at the time of photographing the first or second object image. It is sufficient to direct the camera or the like approximately by hand or the like. As a result, there is an effect that photographs can be taken easily.

The operation of the amount of background correction calculating means, that is, "calculating an amount of background correction that is one or a combination of relative amounts including an amount of movement, an amount of rotation, a rate of expansion or reduction, and an amount of distortion correction, with respect to a background portion", may be "calculating an amount of correction that is a combination of a relative amount of movement of the background portion and one or a plurality of relative amounts including an amount of rotation, a rate of expansion or reduction, and an amount of distortion correction, of the background portion". This further improves the precision of correction. As a result, it is possible to obtain a more natural composite image.

Further, if the two kinds of operation of the amount of background correction calculating means can be switched selectively by the user through input means, it is possible to choose whether to give preference to the precision of correction or to give preference to the processing rate or reduction of processing burden. As a result, the image combination device becomes user-friendlier.

The second image combination device of the present invention may further include: object region extracting means for extracting a region of the first object and a region of the second object from a difference image generated from the standard image and the corrected image, the superimposed image generating means superimposing (a) the standard image or the corrected image and (b) images within the regions obtained from the object region extracting means, instead of superimposing the standard image and the corrected image.

The "region of an object" is a region demarcated by a boundary which separates an object from the background. For example, if a person has a cloth or an article in the first object image, and these items do not appear in the second object image, these items are also included in the object region as an object. The object region is not always a continuous, single region; the object may be divided into a plurality of regions.

"To superimpose an image of the region acquired from the object region extracting means" does not mean that no image is generated other than that region; it means that the other regions are filled with the standard image or the like.

Since correction is performed so that the background portions correspond to each other, what appear as a difference is primarily the object portion. Therefore, the object region included in the difference image can be extracted by the object region extracting means. At this time, if such processing as noise reduction for the difference image is performed (e.g. remove those pixels of the difference image whose pixels values are not higher than a threshold value), the object region can be extracted more precisely.

In generating the superimposed image, a pixel value in each pixel position is determined. The image of an object is superimposed only if the pixel position is within the object region obtained from the object region extracting means.

As a result, there is an effect that only the object region of the corrected object image can be combined onto the reference image. Alternatively, it is possible to combine only the object region of the standard image onto the corrected object image.

Together with the processing of combining images at different transmittances, the user can easily know which region is to be combined and, if any, the occurrence of overlap between objects. This also brings about an effect of helping the photography by avoiding overlap.

If there is overlap, the image may be photographed again after resolving the overlap by moving the object or the camera. Helping the photography in this case means, for example, making it easier for the user to know whether or not there is overlap, and giving the user information (here, the composite image) on how much the object or the camera should move to avoid the overlap.

For a fuller understanding of the nature and advantages of the invention, reference should be made to the ensuing detailed description taken in conjunction with the accompanying drawings.

BRIEF DESCRIPTION OF THE DRAWINGS

FIG. 4 is an explanatory diagram illustrating an example of data structure of image data.

FIG. 6(a) is an explanatory diagram illustrating an example of a first object image; and FIG. 6(b) is an explanatory diagram illustrating how remaining reference blocks are arranged in the first object image.

DESCRIPTION OF THE EMBODIMENTS

Figure 1:
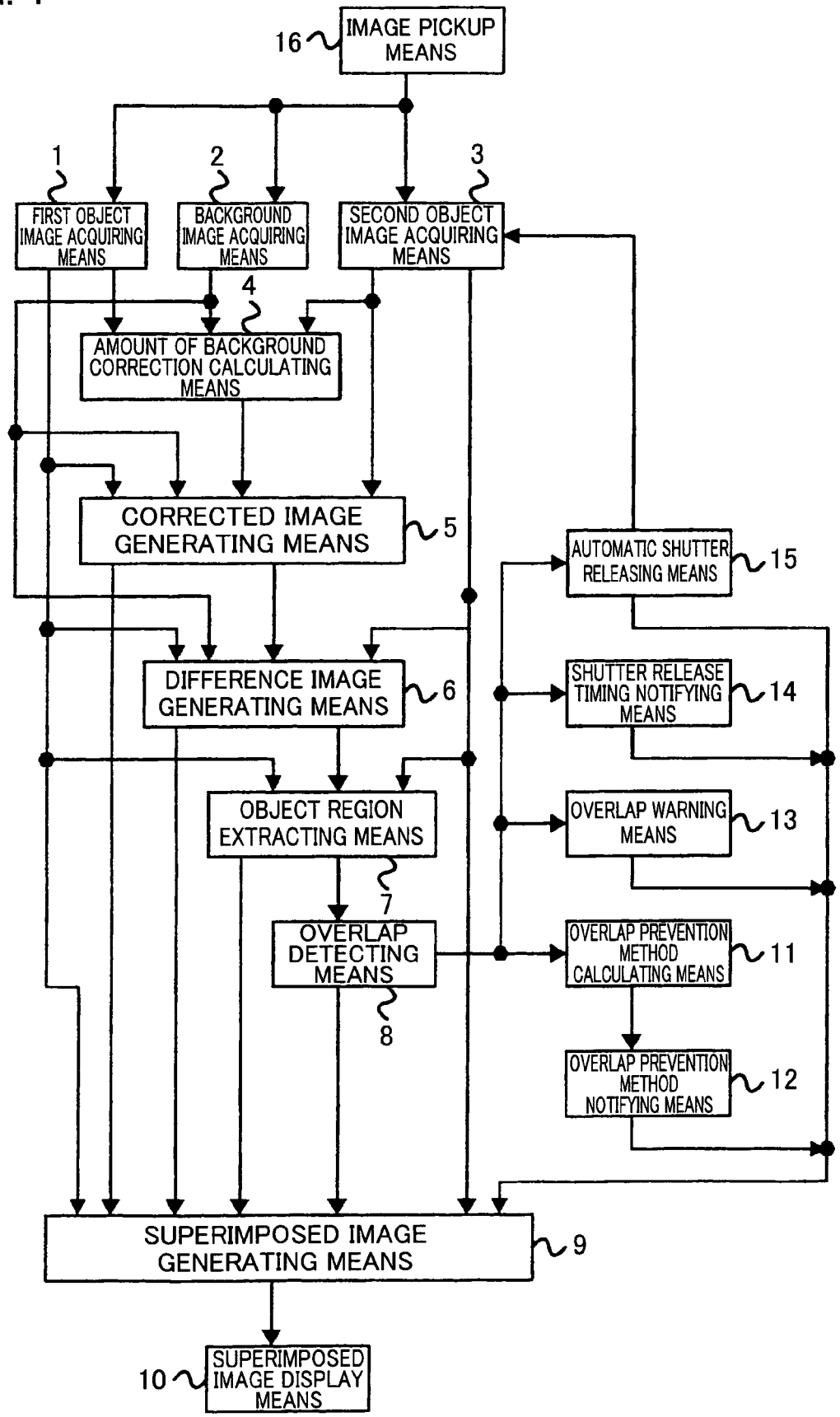
FIG. 1 is a block diagram illustrating a functional block of a first image combination device of the present invention.

Through examples and comparative examples, the following more fully describes the present invention. It should be noted, however, that the present invention is not limited in any way by the following examples and comparative examples.

Embodiments 1

With reference to the drawings, the following describes embodiments of the present invention.

First, definitions of terms are set forth below.

"First object" and "second object" are objects to be combined. In general, these objects are persons, but they can be articles or the like. Strictly speaking, the "first object" is a region where pixel values do not correspond when a background portion of a background image and a background portion of a first object image overlap at least partially. In other words, any region where there is a change has a possibility to be a "first object region". However, "any region where there is a change" could include a minor change in the background portion caused by leaves waving in the breeze. It is therefore preferable to ignore minor changes and small regions. The same holds true with the "second object".

If the object is a person, the object is not necessarily a single person; a plurality of persons may collectively constitute the "first object" or the "second object". In other words, if a plurality of persons are handled collectively as a unit in combining images, the plurality of persons constitute a single "object".

This is also true when the object is an article, not a person. The object is not always a single region; a plurality of regions may constitute the object. The ordinals "first" and "second" are assigned merely for the purpose of distinguishing different frame images, and these ordinals have no such meaning as an order of shooting. Therefore, there is no fundamental difference between the "first object" and the "second object". For example, if a person has a cloth or an article, and these items do not appear on a "background-only image that does not include the first and second objects", these items are also included in the object.

The "first object image" and "second object image" are separate images respectively including the "first object" and the "second object". In general, these images are images of the respective objects photographed separately by a camera or the like. However, if these images only include the objects, and do not include any background portions corresponding to each other, these images are not suitable for combination, because positioning cannot be performed based on a corresponding background portion. Therefore, it is necessary that at least a part (preferably a surrounding part of the object to be combined, so that a surrounding part of the combined object will look natural) of these images is a background portion corresponding to the background image. Usually, the first object image and the second object image are photographed with the same background, that is, without moving the camera significantly.

The "background portion" is a portion that remains after the "first object" and the "second object" are removed from a scene.

The "background image" is an image that includes at least a part of the background portion of the first object image and at least a part of the background portion of the second object image. The "background image" neither includes the first object nor the second object. Usually, the "background image" is photographed with the same background as that of the first object image and the second object image (that is, without moving the camera significantly) after the first object and the second object are removed from in front of the camera.

The first object image and the second object image may respectively include background portions corresponding to the background image, so that positioning can be performed between the background image and the first and second object images. Therefore, the background portion of the first object image and the background portion of the second object image may correspond to each other completely or partially, or may not correspond at all.

The "background portion other than the first/second object" is a portion that remains after the first/second object region is removed from the first/second object image.

An "amount of movement" is an amount of parallel movement. In other words, the "amount of movement" is an amount of parallel movement of a center of rotation, expansion, or reduction.

An "amount of distortion correction" is an amount of correction performed so as to correct an amount of change that remains uncorrected after a change of the image to be photographed caused by a change in the position and/or direction of the camera and/or the lens is corrected incompletely by parallel movement, rotation, and/or expansion or reduction. For example, the "amount of distortion correction" includes an amount of perspective correction or the like. "Perspective" is an effect that, for example, an upper portion of a high building taken in a photograph looks smaller than a lower portion due to the law of perspective, even through the actual size is the same.

"Superimposed image generating means" generates a superimposed image. However, the superimposed image does not have to be a single image. Together with another means (in cooperation with another means), the superimposed image generating means may make images look as if they were combined. For example, in displaying an image on display means, if a part of another image is displayed on the image, it looks as if a composite image created from the two images were displayed. In reality, however, the two images exist separately, and there is no composite image.

A "pixel value" is a value of a pixel, and is generally indicated by a predetermined number of bits. For example, in the case of two values of black and white, the pixel value is indicated by one bit. In the case of monochrome in 256 gradations, eight bits are used. In the case of colors of red, green, and blue each in 256 gradations, 24 bits are used. In the case of color display, the pixel value is often indicated by using three primary colors of red, green, and blue.

Similar terms such as "density value" and "luminance value" are used according to intended purposes. The term "density value" is used mainly when pixels are printed; the term "luminance value" is used mainly when pixels are displayed on a display. Since the purposes are not limited in this description, the term "pixel value" is used.

A "transmittance" is a "predetermined ratio" used in the processing in which pixel values of a plurality of pixels are multiplied by a predetermined ratio and the sum is used as a new pixel value. The transmittance is usually not lower than zero and not higher than one. The sum of the transmittance of each pixel, used for calculating the single new pixel value, is often one. Instead of "transmittance", the term "opacity" may be used. "Transparency" is a value obtained by subtracting the "opacity" from one.

A "predetermined transmittance" includes a fixed value, a value that differs from region to region, and a value that gradually changes in the vicinity of a boundary between regions.

A "difference image" is an image created by comparing pixel values at corresponding positions of two images, and using a value of the difference as a pixel value. In general, the value of the difference is an absolute value.

A "pixel value that is different from an original pixel value" is a pixel value that realizes, for example, (i) translucency by changing the transmittance, (ii) inverted display by inverting brightness/darkness of the pixel value, hue, and the like, and (iii) striking colors such as red, white, and black. The "pixel value that is different from an original pixel value" also includes such cases where (i) the a pixel value at a boundary between regions and a pixel value inside a region are different, (ii) the boundary is surrounded by dotted lines, or (iii) blink display (the pixel value is changed temporally) is performed.

A "region of an object" is a region demarcated by a boundary which separates an object from the background. For example, if a person has a cloth or an article in the first object image, and these items do not appear in the background image, these items are also included in the object region as an object. The object region is not always a continuous, single region; the object may be divided into a plurality of regions.

To "superimpose only a region acquired from object region extracting means" does not mean that no image is generated other than that region; it means that the other regions are filled with the standard image or the like.

A "warning" includes a warning by displaying letters and/or an image on display means or the like. The warning includes a warning by any other method (e.g. light of a lamp or the like, sounds from a speaker or the like, vibrations of a vibrator or the like), as long as the user and/or the object can sense the warning.

Like the "warning", a "notification" includes a notification by any method, as long as the user and/or the object can sense the notification.

A "frame" is a rectangle of the image as a whole. If a portion of an object is at an edge (outline) of an image, the object is "at the frame" or "cut by the frame".

FIG. 1 is a diagram illustrating an arrangement of an image combination device for carrying out an image combination method in accordance with one embodiment of the present invention.

Major parts of the image combination device are the following functional blocks: first object image acquiring means 1, background image acquiring means 2, second object image acquiring means 3, amount of background correction calculating means 4, corrected image generating means 5, difference image generating means 6, object region extracting means 7, overlap detecting means 8, superimposed image generating means 9, superimposed image display means 10, overlap prevention method calculating means 11, overlap prevention method notifying means 12, overlap warning means 13, shutter release timing notifying means 14, automatic shutter releasing means 15, and image pickup means 16.

Figure 2:
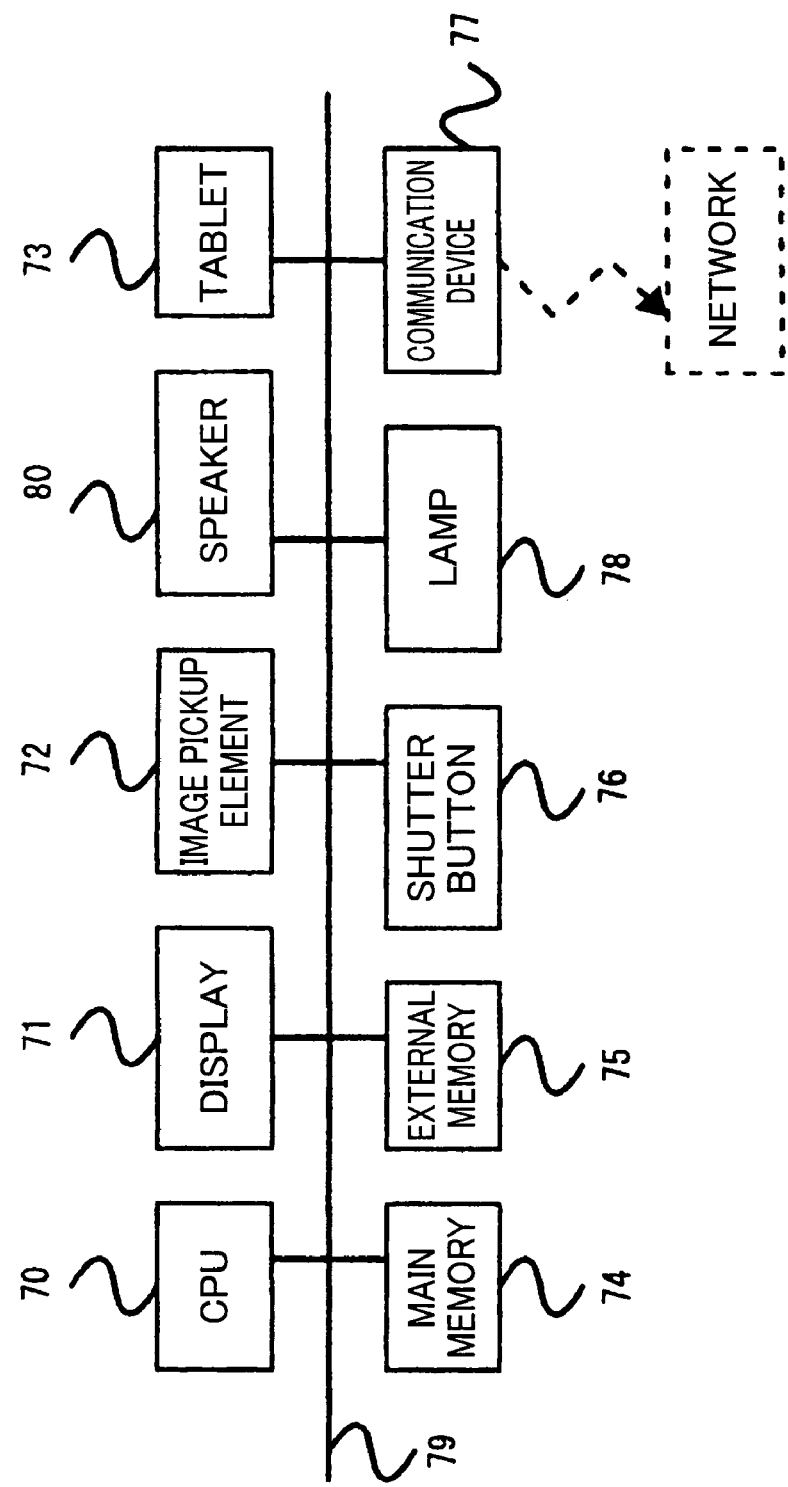
FIG. 2 is a block diagram illustrating an arrangement example of specific devices for realizing each means of the image combination device.

FIG. 2 illustrates an arrangement example of devices that specifically realize the means 1 to 16 of FIG. 1.

A CPU (central processing unit) 70 functions as the amount of background correction calculating means 4, the corrected image generating means 5, the difference image generating means 6, the object region extracting means 7, the overlap detecting means 8, the superimposed image generating means 9, the superimposed image display means 10, the overlap prevention method calculating means 11, the overlap prevention method notifying means 12, the overlap warning means 13, the shutter release timing notifying means 14, and the automatic shutter releasing means 15. The CPU 70 acquires a program that describes processing procedures for the means 1 to 16, from a main memory 74, an external memory 75, and a network destination or the like via a communication device 77.

In some cases, the first object image acquiring means 1, the background image acquiring means 2, the second object image acquiring means 3, and the image pickup means 16 are also realized by the CPU or the like, for the purpose of internally controlling the image pickup device and various kinds of processing for image data outputted by the image pickup device.

The CPU 70 performs processing while transmitting and receiving data to and from a display 71, an image pickup element 72, a tablet 73, the main memory 74, the external memory 75, a shutter button 76, the communication device 77, a lamp 78, and a speaker 80, which (including the CPU 70) are connected to each other by the bus 79.

The data may be transmitted and received by using such means as communication cables or wireless communication devices, instead of the bus 79. Instead of using the CPU, the means 1 to 16 may be realized by a DSP (digital signal processor) or a logic circuit that includes the processing procedures in the form of circuits.

Usually, the display 71 is realized in combination with a graphic card or the like. The graphic card has a VRAM (video random access memory). The display 71 transforms data in the VRAM into display signals, and transmits the display signals to a display (display/output medium) such as a monitor. Then, the display displays the display signals as an image.

The image pickup element 72 is a device that photographs a scene or the like and acquires image signals. Usually, the image pickup element 72 includes an optical member (e.g. a lens), a light-receiving element, and an electronic circuit attached thereto. The image pickup element 72 of the present embodiment covers a function of transforming the image signals into digital image data through an A/D transformer or the like, and transmitting the image data to such members as the first object image acquiring means 1, the background image acquiring means 2, and the second object image acquiring means 3, through the bus 79. A device generally used as the image pickup device is a CCD (charge coupled device), for example. Any other device may be used as the image pickup device, as long as a scene or the like can be acquired as image data.

Means for inputting user's instructions are the tablet 73, the shutter button 76, and the like. The user's instructions are inputted to the means 1 to 16 via the bus 79. Various other input means may be used, such as various operation buttons, sound inputs through a microphone, and the like. The tablet 73 includes a pen and a detecting device for detecting the position of the pen. The shutter button 76 includes a mechanical or electronic switch or the like. When pressed by the user, the shutter button 76 usually generates a start signal that starts a series of processing, for example, for recording the image photographed by the image pickup element 72 into the main memory 74, external memory 75, or the like.

Usually, the main memory 74 is a memory device such as a DRAM (dynamic random access memory) or a flash memory. Memories, registers and the like in the CPU may also be regarded as a kind of main memory.

The external memory 75 is recording means to which a HDD (hard disk drive), a PC (personal computer) card, or the like can be mounted and detached. Alternatively, the external memory 75 may be a main memory, an external device, or the like attached to another network device that is connected to the CPU 70 by wire or wireless via a network.

The communication device 77, which transmits and receives data to and from another network device connected by wire or wireless, is realized by a network interface card or the like.

The speaker 80 interprets sound data (which is transmitted via the bus 79 or the like) as sound signals, and outputs the sound signals as sounds. The outputted sounds can be simple sounds having a short wavelength, or can be complex sounds such as music or human voices. If the outputted sounds are predetermined, the transmitted data can be mere control signals for controlling ON/OFF operation, instead of the sound signals.

Next, the means 1 to 16 of FIG. 1 are described from the viewpoint of transmission and reception of data among these means.

Unless otherwise noted, data "acquired from . . . means" and data "transmitted (transferred) to . . . means" are received or transmitted mainly via the bus 79. Data may be transmitted and received directly among these means, or may be transmitted and received through the main memory 74, external memory 75, or a network or the like via the communication device 77.

The first object image acquiring means 1 includes such members as the image pickup means 16 (including the image pickup element 72), the main memory 74, and the external memory 75, for example. The first object image acquiring means 1 acquires a first object image from the image pickup means 16, the main memory 74, the external memory 75, or a network destination or the like via the communication device 77. The first object image acquiring means 1 may include a CPU or the like for the purpose of, for example, internally controlling the image pickup element 72 and various kinds of processing for the image data outputted by the image pickup element 72.

In the case where the image pickup means 16 is used, the current scene (first object image) including a first object is photographed by the image pickup element 72 usually at the timing when the shutter button 76 or the like is pressed. The photographed image is recorded in the main memory 74, the external memory 75, or the network destination or the like via the communication device 77.

On the other hand, in the case where the first object image acquiring means 1 acquires the first object image from a network destination or the like via the main memory 74, the external memory 75, or the communication device 77, an image that has already been photographed and prepared in advance is read out. The first object image may be photographed through a network by using a camera provided at a network destination or the like via the communication device 77.

The first object image is transmitted to the amount of background correction calculating means 4, the corrected image generating means 5, the difference image generating means 6, the object region extracting means 7, and/or the superimposed image generating means 9, for example.

The background image acquiring means 2 includes, for example, the image pickup means 16 (including the image pickup element 72), main memory 74, and/or the external memory 75, and acquires the background image from a network destination or the like via the image pickup means 16, the main memory 74, the external memory 75, and/or the communication device 77. The background image acquiring means 2 may include a CPU for the purpose of internal control or the like, as described above. The background image acquiring means 2 acquires the image in the same manner as the first object image acquiring means 1, although the content of the acquired image is different.

The background image is transmitted to the amount of background correction calculating means 4, the corrected image generating means 5, and/or the difference image generating means 6.

The second object image acquiring means 3 includes, for example, the image pickup means 16 (including the image pickup element 72), the main memory 74, and/or the external memory 75, and acquires an image including the second object (the second object image) from the image pickup means 16, the main memory 74, the external memory 75, and/or the network destination or the like via the communication device 77. The second object image acquiring means 3 may include a CPU for the purpose of internal control or the like, as described above. The second object image acquiring means 3 acquires the image in the same manner as the first object image acquiring means 1, although the content of the acquired image is different.

The second object image is transmitted, for example, to the amount of background correction calculating means 4, the corrected image generating means 5, the difference image generating means 6, the object region extracting means 7, and/or the superimposed image generating means 9.

As the amount of background correction calculating means 4, the CPU 70 calculates an amount of correction that is one or a combination of relative amounts including an amount of movement, an amount of rotation, a rate of expansion or reduction, and an amount of distortion correction, among the first object image, the second object image, and the background, other than an object, of the background image.

In this case, one of two images whose backgrounds correspond to each other at least partially may be used as a standard image, so as to determine at least the amount of correction between the standard image and the other of the two images. The amount of correction for another image with respect to the standard image can be finally determined, as long as the background of the aforesaid another image corresponds to the background(s) of the standard image and/or the other of the two images at least partially.

Since the amount of correction is a relative amount, the amount of correction between the standard image and the other of the two images may be calculated indirectly, rather than directly. For example, in the case where the first object image is the standard image, it is possible to calculate the amount of correction between the standard image and the second object image by directly determining the amount of correction between the standard image and the background image and the amount of correction between the second object image and the background image, even if the amount of correction between the standard image and the second object image and the amount of correction between the standard image and the background image cannot be determined directly.

The amount of background correction calculating means 4 transmits the calculated amount of correction to the corrected image generating means 5. In the case where the amount of correction is calculated in advance and read out by the amount of background correction calculating means 4, the amount of correction is read out of the main memory 74, the external memory 75, and/or the network destination or the like via the communication device 77.

Using the first object image, the second object image, or the background image as a standard image, the CPU 70 as the corrected image generating means 5 corrects the other two images by the amount of correction calculated by the amount of background correction calculating means 4. The two images are corrected so that the background portions thereof (those portions other than the objects) correspond to the standard image. The CPU 70 then transmits the corrected images to the difference image generating means 6 and the superimposed image generating means 9. In the case where corrected images are generated in advance and read out by the corrected image generating means 5, the corrected images are read out of the main memory 74, the external memory 75, and/or the network destination or the like via the communication device 77.

As the difference image generating means 6, the CPU 70 generates a difference image from (i) the standard image determined by the corrected image generating means 5 and (ii) the corrected one or two images generated by the corrected image generating means 5. The CPU 70 then transmits the difference image to the object region extracting means 7 and the superimposed image generating means 9. The standard image is the first object image, the second object image, or the background image.

As the object region extracting means 7, the CPU 70 extracts the regions of the first and second objects from the difference image generated by the difference image generating means 6, and transmits the extracted regions to the overlap detecting means 8 and the superimposed image generating means 9.

As the overlap detecting means 8, the CPU 70 detects, from the regions of the first and second objects extracted by the object region extracting means 7, whether or not the first and second objects overlap each other. The CPU 70 then transmits information on whether or not there is overlap and information on overlap regions to the superimposed image generating means 9, the overlap prevention method calculating means 11, the overlap warning means 13, the shutter release timing notifying means 14, and the automatic shutter releasing means 15.

As the superimposed image generating means 9, the CPU 70 generates an image in which the first object image acquired by the first object image acquiring means 1, the second object image acquired by the second object image acquiring means 3, the background image acquired by the background image acquiring means 2, and the corrected image generated by the corrected image generating means 5 are superimposed completely or partially. The CPU 70 then transmits the generated image to the superimposed image display means 10.

The superimposed image generating means 9 may generate an image having a pixel value different from the original pixel value, based on a difference region of the difference image generated by the difference image generating means 6.

The superimposed image generating means 9 may superimpose, onto the standard image, only the regions of the first object and the second object extracted by the object region extracting means 7.

The superimposed image generating means 9 may generate an image having a pixel value different from the original pixel value, based on the overlap regions detected by the overlap detecting means 8.

As the superimposed image display means 10, the CPU 70 displays, at the display 71 or the like, the superimposed image generated by the superimposed image generating means 9.

The superimposed image display means 10 may perform the following operation, for example: (i) display a method for preventing overlap in accordance with information on the method for preventing overlap obtained from the overlap prevention method notifying means 12, (ii) display a warning in accordance with warning information obtained from the overlap warning means 13, (iii) display an indication of the right timing for releasing the shatter in accordance with shutter release timing information obtained from the shutter release timing notifying means 14, and (iv) display, in accordance with shutter information obtained from the automatic shutter releasing means 15, an indication that the shutter has been released automatically.

As the overlap prevention method calculating means 11, based on the information on overlap obtained from the overlap detecting means 8, the CPU 70 calculates the position, or direction of the position, of the first or second objects for reducing or eliminating the overlap between the first and second objects. The CPU 70 then transmits the information on the position or direction to the overlap prevention method notifying means 12, as the method for preventing overlap. The position or direction may be calculated with respect to the first object or the second object. It is more convenient to calculate the position or direction with respect to the object currently being photographed (or previously photographed object).

As the overlap prevention method notifying means 12, the CPU 70 notifies the user and/or the object the method for preventing overlap obtained from the overlap prevention method calculating means 11.

The notification may be made in various forms, such as (i) letters or the like including the contents of notification, transmitted to the superimposed image display means 10 and displayed at the display 71, (ii) light emitted from the lamp 78, and (iii) sounds from the speaker 80. Any other device may be used, as long as the notification can be made.

If there is overlap according to the information on overlap obtained from the overlap detecting means 8, the CPU 70 as the overlap warning means 13 notifies the user and/or the object that there is overlap. The notification may be made in various forms, as in the case of the overlap prevention method notifying means 12.

If there is no overlap according to the information on overlap obtained from the overlap detecting means 8, the CPU 70 as the shutter release timing notifying means 14 notifies the user and/or the object that there is no overlap. The notification may be made in various forms, as in the case of the overlap prevention method notifying means 12.

If there is no overlap according to the information on overlap obtained from the overlap detecting means 8, the CPU 70 as the automatic shutter releasing means 15 automatically instructs the second object image acquiring means 3 to record the image obtained from the image pickup means 16 into the main memory 74, the external memory 75, or the like.

In the present embodiment, it is primarily assumed that the image obtained from the image pickup means 16 is finally recorded/stored as the background image, the first object image, or the second object image in the main memory 74, the external memory 75, or the like, and is then combined. Until finally recorded/stored, the background image and the first object image are obtained from the image pickup means 16, and are recorded/stored every time they are supplied. On the other hand, the second object image is not stored immediately after it is obtained from the image pickup means 16.

In the case where the image obtained from the image pickup means 16 is the second object image, the following series of processing are repeated: (i) such processing as overlap detection and overlap prevention performed based on the second object image and the stored background image and first object image, and (ii) displaying various types of information at the superimposed image display means 10 or the like, or such processing as warning and notifying. When recording/storing is instructed by the automatic shutter releasing means 15, the second object image is finally recorded/stored.

The second object image may be recorded/stored when an instruction is made by the automatic shutter releasing means 15, and the shutter button 76 is pressed by the user.

The automatic shutter releasing means 15 may notify the user and/or the object that a photographed image has been recorded as a result of instruction. The notification may be made in various forms, as in the case of the overlap prevention method notifying means 12.

As the automatic shutter releasing means 15, the CPU 70 not only makes the instruction for recording, but also automatically instructs the second object image acquiring means 3 not to record the image obtained from the image pickup means 16 into the main memory 74, the external memory 75, or the like, if there is overlap according to the information on overlap obtained from the overlap detecting means 8. This operation is opposite the operation performed in the case of automatic recording described above.

In this case, if storing is prohibited by the instruction of the automatic shutter releasing means 15, the second object image is not recorded/stored even if the shutter button 76 is pressed by the user.

The image pickup means 16, which includes the image pickup element 72 as a main member thereof, transmits the photographed scene or the like as image data, to the first object image acquiring means 1, the second object image acquiring means 3, and/or the background image acquiring means 2.

Figure 3:
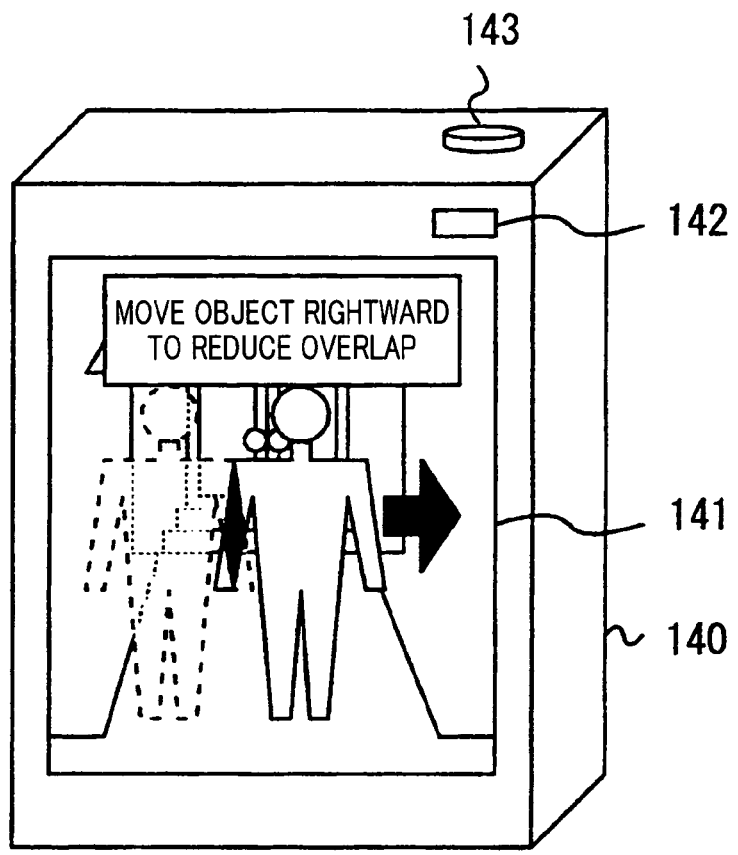
FIG. 3(a) is a schematic perspective view illustrating an example of an exterior view of the back side of the image combination device.
FIG. 3(b) is a schematic perspective view illustrating an example of an exterior view of the front side of the image combination device.
Figure 3:
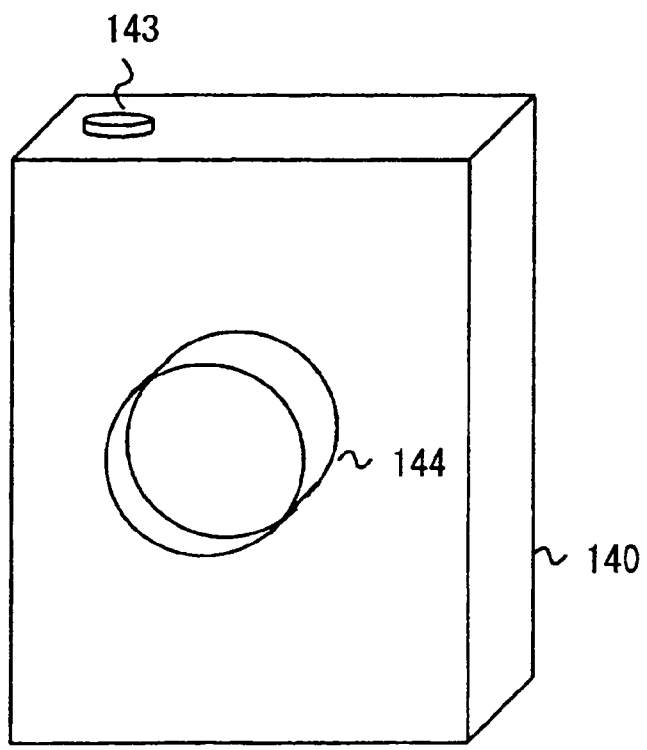

FIG. 3(*a*) illustrates an example of an exterior view of the image combination device of the present invention seen from the back side. On a main body 140, a display-cum-tablet 141, a lamp 142, and a shutter button 143 are provided.

The display-cum-tablet 141 functions as an input/output device (the display 71, the tablet 73, and the like) and as the superimposed image display means 10. As shown in FIG. 3(*a*), the display-cum-tablet 141 displays, for example, the composite image generated by the superimposed image generating means 9, and the notification/warning information obtained from the overlap prevention method notifying means 12, the overlap warning means 13, the shutter release timing notifying means 14, the automatic shutter releasing means 15, and the like. The display-cum-tablet 141 is also used for displaying a menu of various settings of the image combination device, so that the setting can be changed on the tablet with a finger, a pen, or the like.

In addition to the tablet, buttons or the like may be provided as a means for changing the setting. The display-cum-tablet 141 may be so designed that not only the photographer but also the object can view the display-cum-tablet 141 by rotating or separating the main body 140, for example.

The lamp 142 is used for indicating the notification and/or warning transmitted from the overlap prevention method notifying means 12, the overlap warning means 13, the shutter release timing notifying means 14, the automatic shutter releasing means 15, or the like.

The shutter button 143 is used mainly for instructing the timing at which the first object image acquiring means 1, the background image acquiring means 2, or the second object image acquiring means 3 imports/records an image from the image pickup means 16.

Although not shown in this example, a built-in speaker or the like may be used as a notifying/warning means.

FIG. 3(b) illustrates an example of an exterior view of the image combination device of the present invention seen from the front side. A lens section 144 is provided on the front side of the main body 140. The lens section 144 is a part of the image pickup means 16. Although not shown in the example of FIG. 3(b), a display section, a lamp, a speaker, and the like may be provided on the front side, so as to transmit information (the notification, warning, and the like) to the object.

Figure 4:
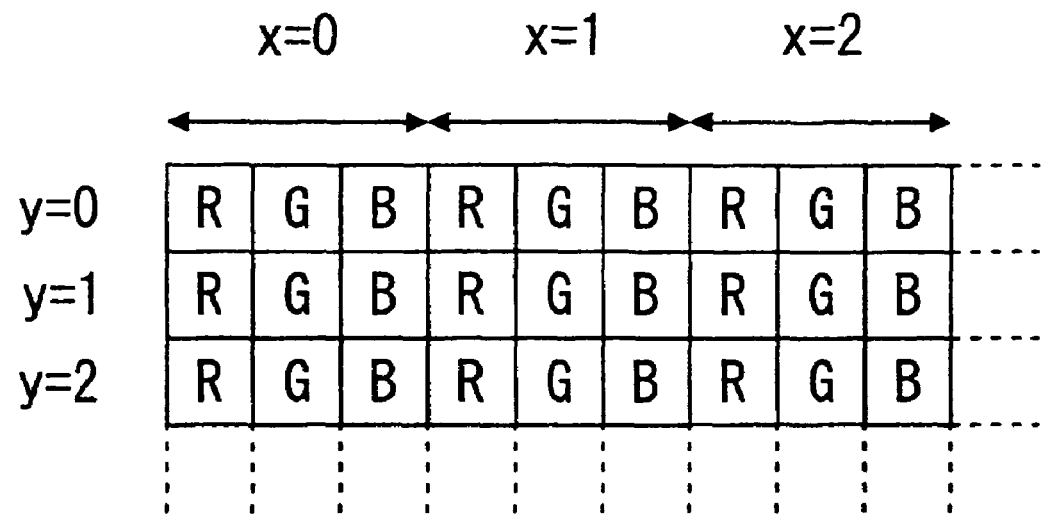

FIG. 4 is an explanatory diagram illustrating an example of the data structure of the image data. The image data is arranged two-directionally. A "pixel" has a position and a pixel value as properties. In the present embodiment, the pixel value is values of R, G, and B respectively corresponding to the three primary colors of light (red, green, and blue). The set of R, G, and B arranged horizontally in FIG. 4 represents data of one pixel. However, in the case where only monochrome luminance information with no color information is provided, the luminance value, instead of R, G, and B, represents data of one pixel.

The position is represented by X-Y coordinate (x, y). In FIG. 4, the upper left is the origin, the rightward direction is the +X direction, and the downward direction is the +Y direction.

For the purpose of explanation, the pixel provided at the position (x, y) is hereinafter referred to as "P(x, y)". Likewise, the pixel value of the pixel P(x, y) is hereinafter referred to as "pixel value P(x,y)", or simply as "P(x, y)". If the pixel value is divided into R, G, and B, calculation is performed with respect to each color. However, it is sufficient to perform the same calculation with respect to each value of R, G, and B, unless special calculation regarding color is to be performed. Therefore, the following describes a method for calculating "pixel value P(x, y)" as a common calculation method.

Figure 5:
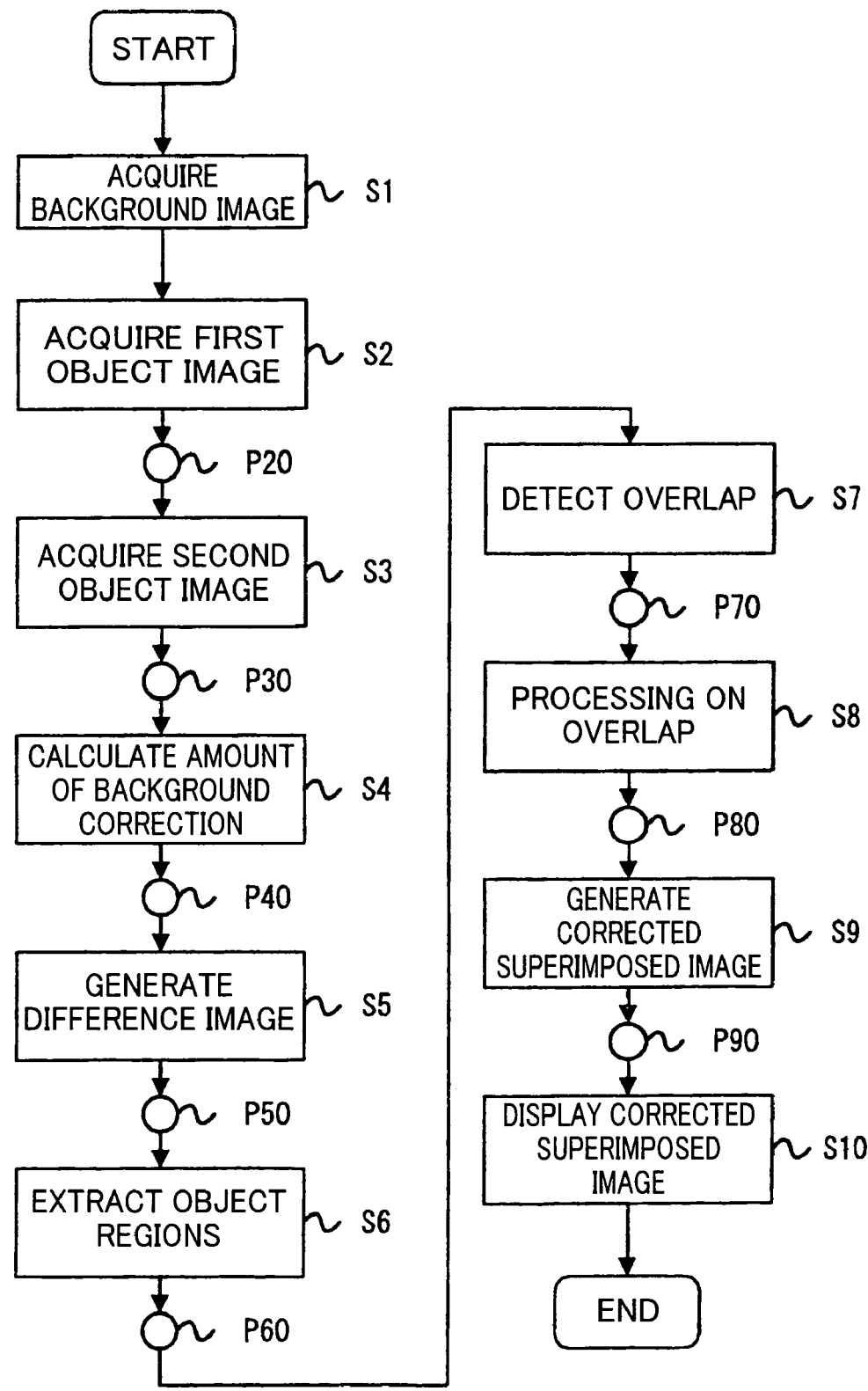
FIG. 5 is a flowchart illustrating an overall flow of an image combination method.

FIG. 5 is a flowchart illustrating an example of an adaptive output method in accordance with one embodiment of the present invention.

First, in step S1 ("step S" is hereinafter abbreviated as "S"), the background image acquiring means 2 acquires the background image, and the processing proceeds to S2. The background image may be photographed by the image pickup means 16, or may be prepared in advance and read out of a network destination or the like connected via the main memory 74, the external memory 75, and the communication device 77.

Next, in S2, the first object image acquiring means 1 acquires the first object image having a background portion that corresponds to the background image at least partially. Then, through the junction P20 ("junction P" is hereinafter abbreviated as "P"), the processing proceeds to S3. The first object image is acquired by the same method used for acquiring the background image. The order of S1 and S2 may be reversed.

In S3, the second object image acquiring means 3 acquires the second object image having a background portion that corresponds to the background image or the first object image at least partially. Then, through P30, the processing proceeds to S4. The processing in this step is described later in detail, with reference to FIG. 14. The second object image is acquired by the same method used for acquiring the background image.

In S4, the amount of background correction calculating means 4 calculates the amount of background correction based on the first object image, the second object image, and the background image. Then, through P40, the processing proceeds to S5. The first object image, the second object image, and the background image are obtained from the first object image acquiring means 1 (S2), the second object image acquiring means 3 (S3), and the background image acquiring means 2 (S1), respectively.

In the following steps, the first object image, the second object image, and the background image are supplied by the same methods/steps in S4, unless otherwise noted. Therefore, explanations for the methods/steps used for supplying these images are omitted.

The processing in S4 is described later in detail, with reference to FIG. 15.

In S5, the corrected image generating means 5 corrects two of the first object image, the second object image, and the background image other than the standard image, by the amount of background correction obtained from the amount of background correction calculating means 4. The difference image generating means 6 generates a difference image from (i) the images corrected by the corrected image generating means 5 and (ii) the standard image. Then, through P50, the processing proceeds to S6. The processing in S5 is described later in detail, with reference to FIG. 17.

In S6, the object region extracting means 7 extracts the regions of the first and second objects (hereinafter "the first object region" and "the second object region") from the difference image obtained from the difference image generating means 6 (S5). Then, through P60, the processing proceeds to S7. The processing in S6 is described later in detail, with reference to FIG. 19.

In S7, the overlap detecting means 8 obtains information on overlap between the first and second object regions obtained from the object region extracting means 7 (S6). Then, through P70, the processing proceeds to S8. The processing in S7 is described later in detail, with reference to the drawings.

In S8, at least one of the overlap prevention method calculating means 11, the overlap prevention method notifying means 12, the overlap warning means 13, the shutter release timing notifying means 14, and the automatic shutter releasing means 15 performs various processing, in accordance with the information on overlap obtained from the overlap detecting means 8 (S7). Then, through P80, the processing proceeds to S9. The processing in S8 is described below in detail, with reference to FIGS. 21 to 24, and 27.

In S9, the superimposed image generating means 9 generates a "superimposed image" in which a plurality of images are superimposed, based on the first object image, the second object image, the background image, the images obtained by correcting these images by the corrected image generating means 5 (S5), the first and second object regions obtained from the object region extracting means 7 (S6), the information on overlap between the first and second objects obtained from the overlap detecting means 8 (S8), and the like. Then, through P90, the processing proceeds to S10. The processing in S9 is described later in detail, with reference to FIG. 30.

In S10 the superimposed image display means 10 displays, at the display 71 or the like, the superimposed image obtained from the superimposed image generating means 9 (S9). This is the end of the processing.

By the processing in S1 to S10, the first object and the second object can be combined into a single image, based on the first object image, the second object image, and the background image. In addition, various processing can be performed in accordance with the degree of overlap between the objects.

The processing is briefly outlined below by taking a simple example, leaving specific processing and its effects to be described later in detail.

FIG. 6(a) is an example of the background image acquired in S1. The background image is a scene including a building and a road thereto, with no person as an object.

FIG. 7(a) is an example of the first object image acquired in S2. In front of the background of FIG. 6(a), a person (1) (the first object) stands on the left. To make a distinction, the face of the person (1) is labeled with "1". In the following explanation, "on the right" and "on the left" mean "on the right" and "on the left" in the drawings, unless otherwise noted. The directions are directions seen from the photographer/camera.

Figure 8:
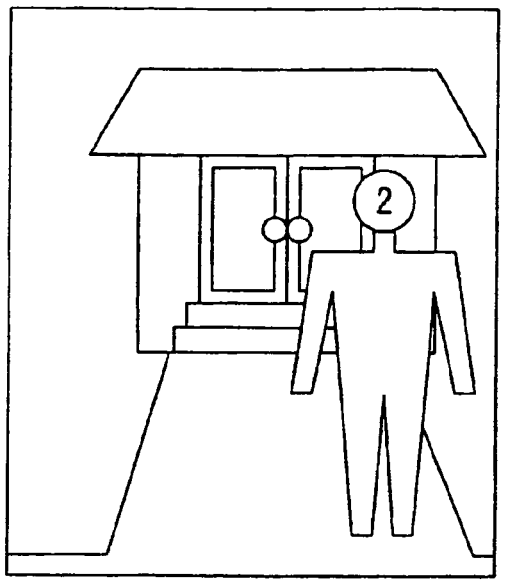
FIG. 8(a) is an explanatory diagram illustrating a second object image.
FIG. 8(b) is an explanatory diagram illustrating remaining matching blocks in the second object image.
FIG. 8(c) is an explanatory diagram illustrating a corrected second object image obtained by correcting the second object image.
FIG. 8(d) is a mask image for the corrected second object image.
Figure 8:
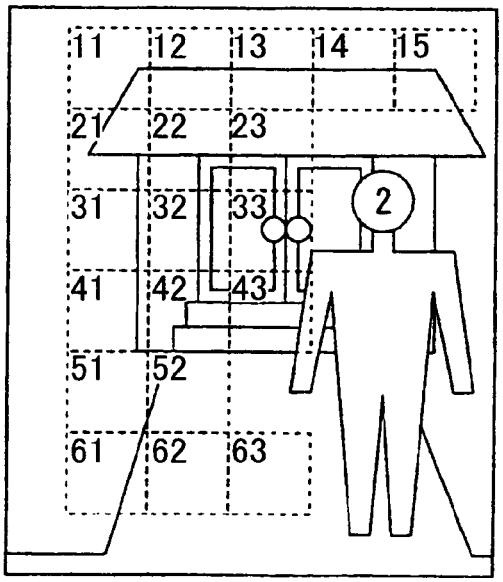
Figure 8:
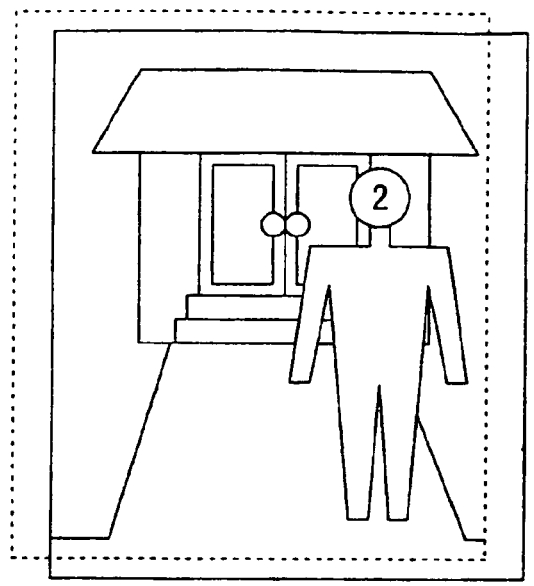
Figure 8:
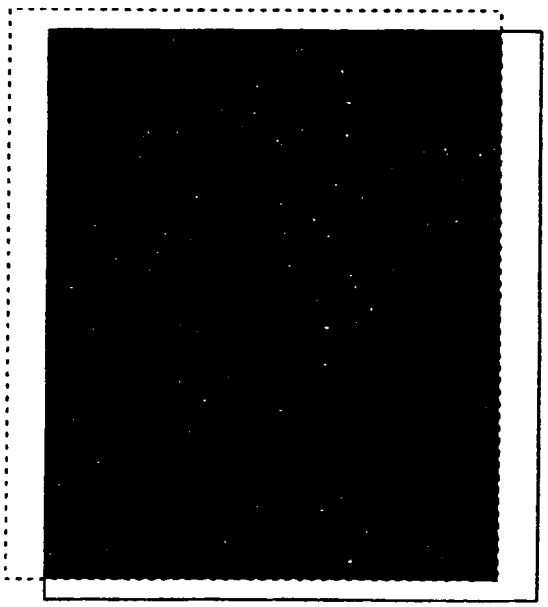

FIG. 8(a) is an example of the second object image acquired in S3. In front of the background of FIG. 6(a), a person (2) (the second object) stands on the right. To make a distinction, the face of the person (2) is labeled with "2".

FIG. 6(c) is an image generated by (i) calculating an amount of background correction based on the background image of FIG. 6(a) and the first object image of FIG. 7(a), and then (ii) correcting the background image by using the first object image as a standard image. Likewise, FIG. 8(c) is an image generated by (i) calculating an amount of background correction based on the first object image of FIG. 7(a) and the second object image of FIG. 8(a), and then (ii) correcting the second object image by using the first object image as a standard image.

The corrected image is the region surrounded by the solid line. To show how the image has been corrected the original scope of the background image of FIG. 6(a) is indicated by the dotted line in FIG. 6(c), and the original scope of the second object image of FIG. 8(a) is indicated by the dotted line in FIG. 8(c).

For example, the background image of FIG. 6(a) is obtained by photographing the scene of FIG. 7(a) from slightly rightward. In order to correct the background image of FIG. 6(a) so that it overlaps the background of FIG. 7(a), it is necessary to choose the scene that is slightly on the left of FIG. 6(a). Accordingly, FIG. 6(c) is the scene that is slightly on the left of FIG. 6(a), as a result of correction. The original scope of FIG. 6(a) is indicated by the dotted line. Since there is nothing on the left of FIG. 6(a), there is a blank space on the left of the dotted line at the left end of FIG. 6(c). On the other hand, the right end of FIG. 6(a) is cut off.

In this case, the correction is performed only through parallel movement, with no expansion, reduction, or rotation. Therefore, the amount of background correction determined in S4 is the amount of parallel movement indicated by the gap between the solid line and the dotted line.

FIG. 9(a) is a difference image generated in S5 based on the first object image of FIG. 7(a) and the corrected background image of FIG. 6(c). Likewise, FIG. 10(a) is a difference image generated based on the corrected second object image of FIG. 8(c) and the corrected background image of FIG. 6(c).

In a difference image, a portion where the amount of difference is zero (that is, where the backgrounds correspond to each other) is indicated as a black region. There is a difference within the object region and at a noise portion. The object region portion is a strange image in which the background image and the image of the object portion are superimposed (a region where pixels exist only in one of the images as a result of the correction (e.g. a region between the solid line and the dotted line on the left or right of FIG. 6(c)) is excluded from the target of differentiation, and the amount of difference is set as zero).

FIG. 9(d) is a result of extraction of the first object region from FIG. 9(a). Details of the extraction processing are described later. The black, human-shaped region 112 in the figure is the first object region. Likewise, FIG. 10(d) is a result of extraction of the second object region from FIG. 10(a). The black, human-shaped region 112 is the second object region.

Figure 9:
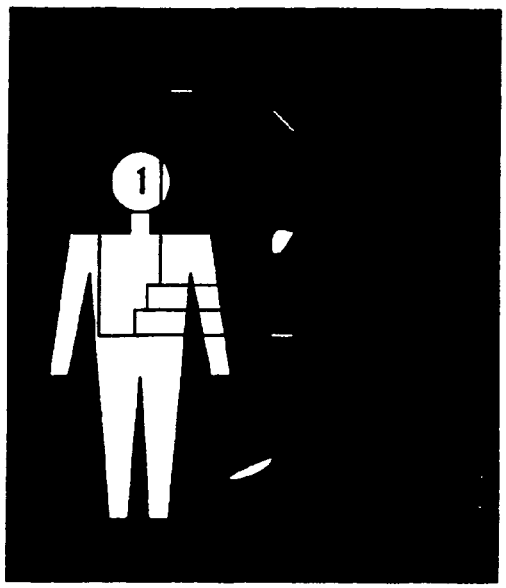
FIG. 9(a) is an explanatory diagram illustrating an example of a difference image generated from the first object image and the corrected background image.
FIG. 9(b) is an explanatory diagram illustrating an example of a label image generated from the difference image.
FIG. 9(c) is an explanatory diagram illustrating an example of a label image obtained by removing noise portions from the label image.
FIG. 9(d) is an example of a first object region image obtained by extracting a first object region from the label image.
Figure 9:
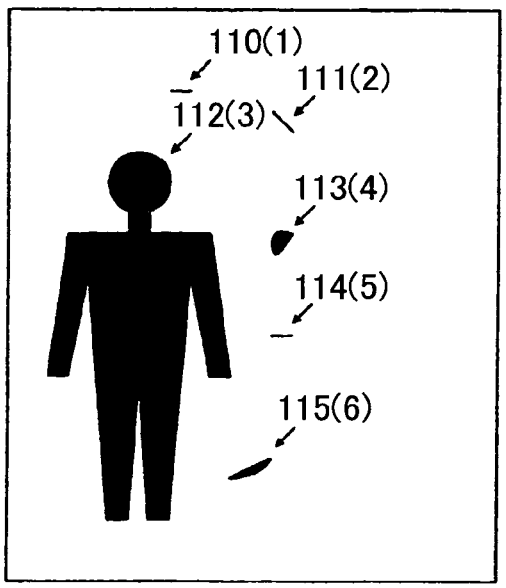
Figure 9:
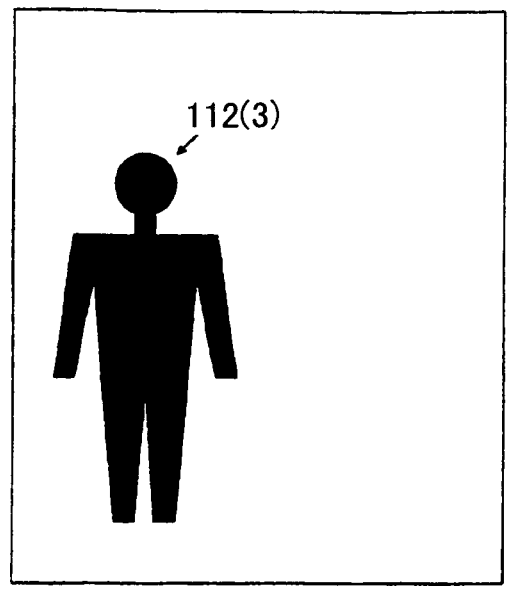
Figure 9:
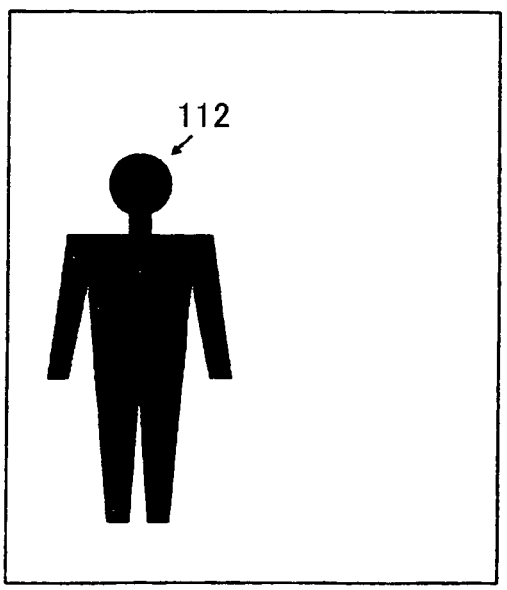
Figure 10:
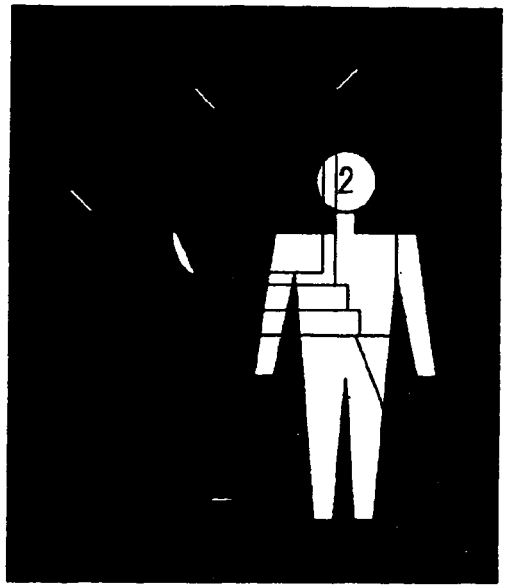
FIG. 10(a) is an explanatory diagram illustrating an example of a difference image generated from the second object image and the corrected background image.
FIG. 10(b) is an explanatory diagram illustrating an example of a label image generated from the difference image.
FIG. 10(c) is an explanatory diagram illustrating an example of a label image obtained by removing noise portions from the label image.
FIG. 10(d) is an explanatory diagram illustrating an example of a second object region image obtained by extracting a second object region from the label image.
Figure 10:
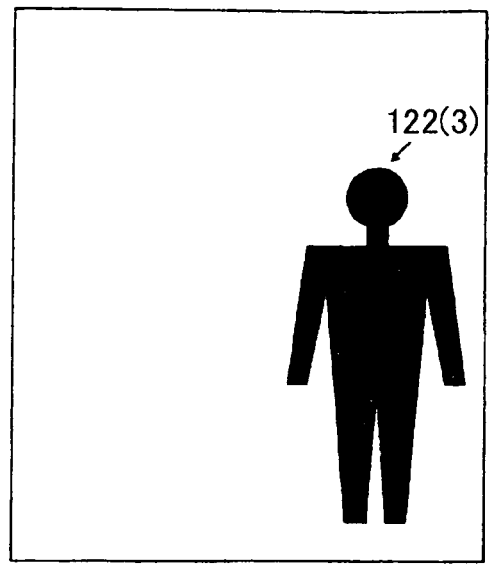
Figure 10:
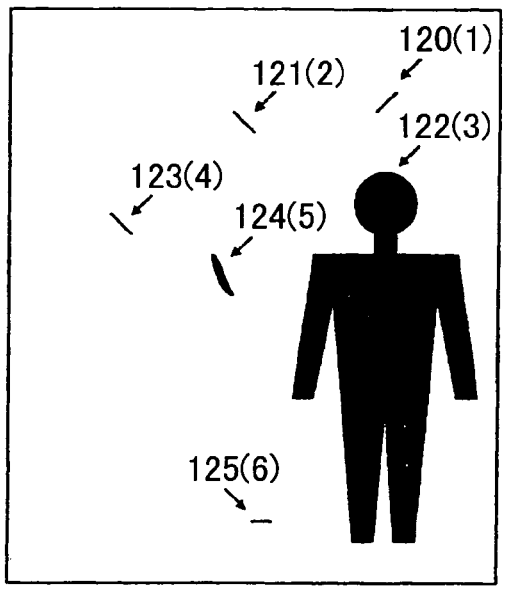
Figure 10:
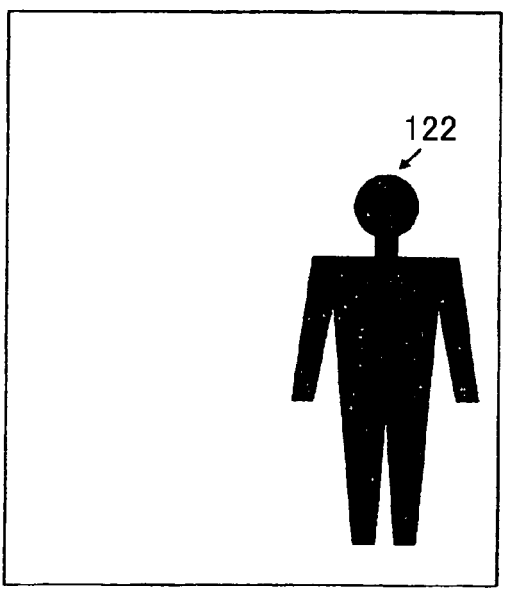

In S7, the overlap between the object regions of FIG. 9(d) and FIG. 10(d) are detected. However, since there is no overlap in this example, figures of the overlap are omitted.

The processing on the overlap in S8 can be performed in various ways. However, since no overlap is detected in this example, no particular processing is performed here so as to simplify the explanation.

FIG. 11(a) is an image generated by extracting the image corresponding to the second object region in FIG. 10(d) from the corrected second object image of FIG. 8(c), and superimposing (writing) it on the first object image of FIG. 7(a). As a result, in FIG. 11(a), the objects that were respectively in FIG. 7(a) and FIG. 8(a) are arranged next to each other in the same image, without overlap. There are various ways to superimpose the image, and they are described later in detail. The image of FIG. 11(a) is displayed as a composite image on the superimposed image display means 10.

This arrangement brings about an effect that it is possible to generate a composite image including objects that were photographed separately but look as if they were photographed at the same time.

Having outlined the processing from the beginning to the end, the following briefly outlines an example of the processing in S8 in the case where the object regions overlap in S7.

Figure 20:
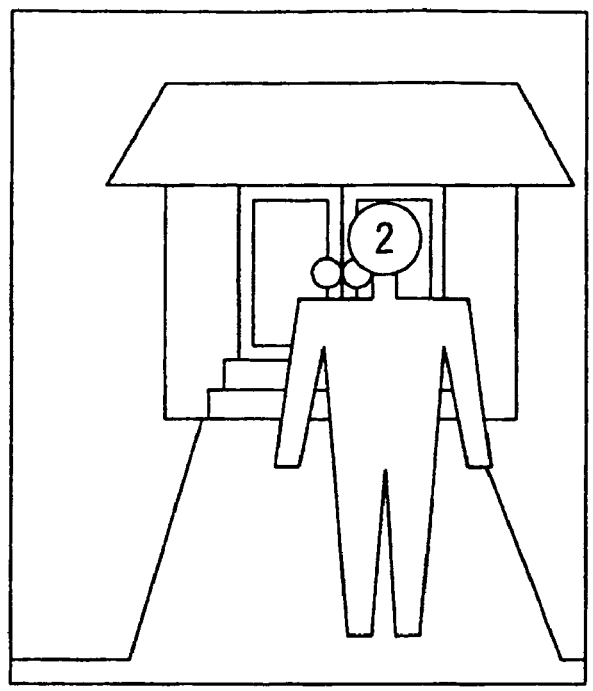
FIG. 20(a) is an explanatory diagram illustrating an example of a second object image whose object region overlaps the object region of the first object of FIG. 7(a)
FIG. 20(b) is an explanatory diagram illustrating an example of a second object region image extracted from the second object image.
Figure 20:
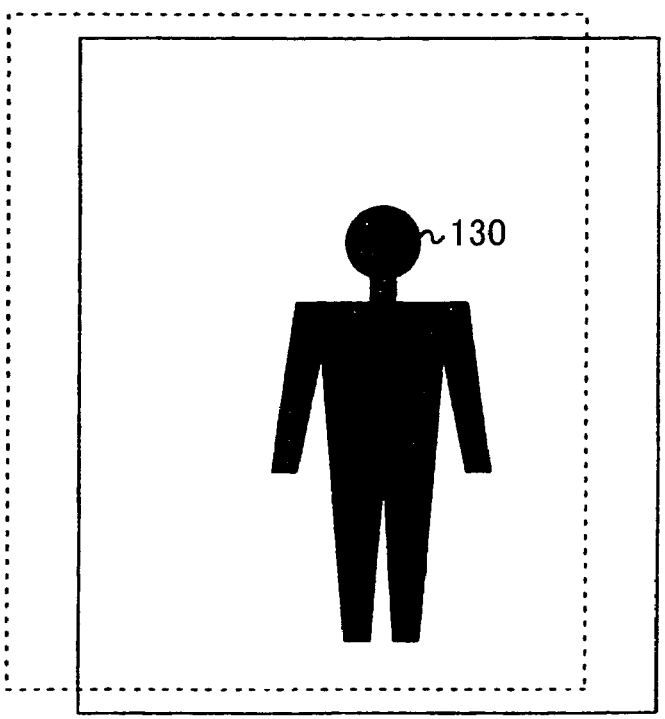

FIG. 20(a) is an example of the second object image different from FIG. 8(a). As compared with FIG. 8(a), the second object in FIG. 20(a) is positioned slightly on the left, with respect to the same background. The background image and the first object image are the same as those used in FIGS. 6(a) and 7(a).

FIG. 20(b) illustrates the second object region. The region 130 in the figure is the second object region. As in the case above, the region 130 as the second object region is obtained as follows: (i) calculate an amount of background correction based on the first object image of FIG. 7(a) and the second object image of FIG. 20(a), (ii) correct the second object image by using the first object image as a standard image, (iii) generate a difference image from the corrected image and the corrected background image of FIG. 6(c), and (iv) extract the region 130 from the difference image.

Figure 12:
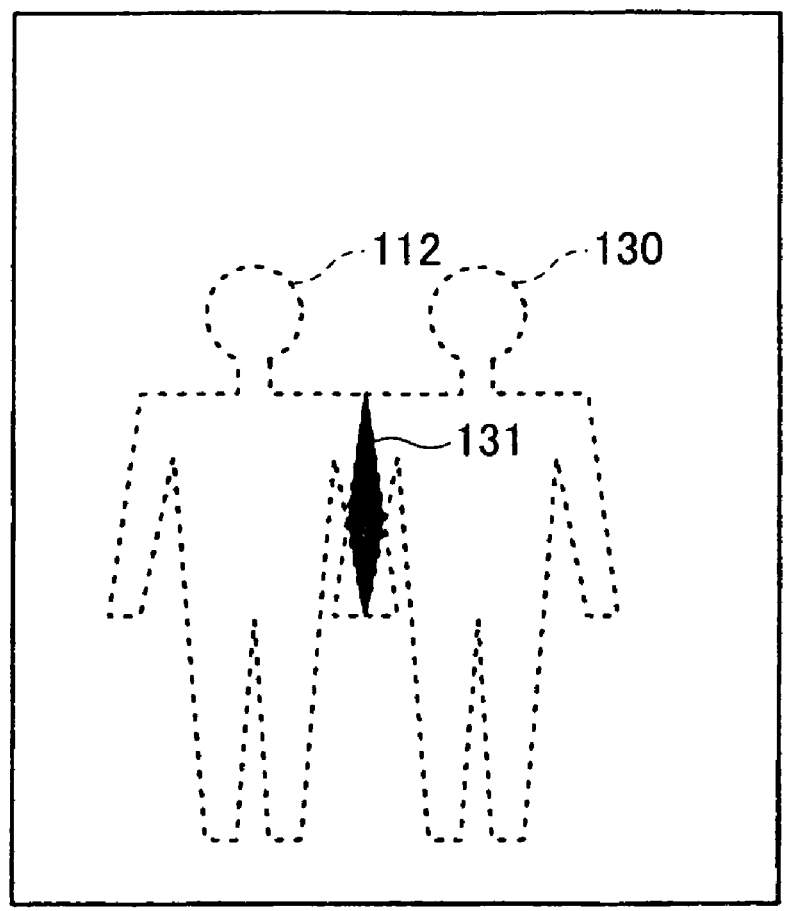
FIG. 12 is an explanatory diagram illustrating an overlap image between the first object region of FIG. 9(d) and the second object region of FIG. 20(b).

FIG. 12 illustrates overlap region between the objects, detected in S7 based on the region 112 of FIG. 9(d) and the region 130 of FIG. 20(b). The blackened region 131 in FIG.

12 is the overlap region. To be visually recognizable, the first object region 112 and the second object region 130 are indicated by the dotted line.

Figure 13:
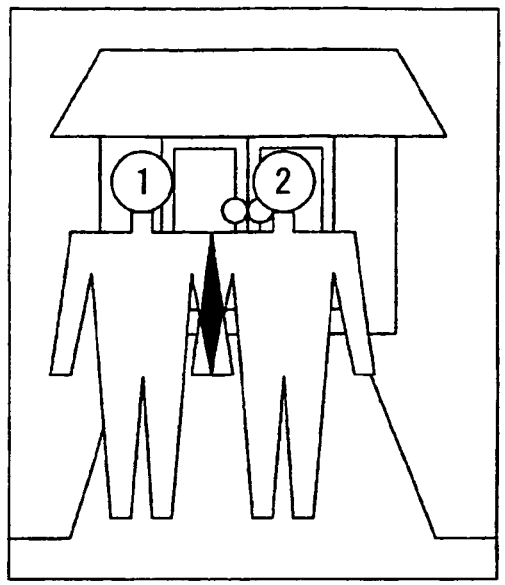
FIG. 13(a) is an explanatory diagram illustrating a superimposed image obtained by combining the first object region of FIG. 9(d), the second object region of FIG. 20(b), and the background portion, the overlap portion being displayed in a highlighted manner.
FIG. 13(b) is an explanatory diagram illustrating an example of a superimposed image where the first object region is translucent.
FIG. 13(c) is an explanatory diagram illustrating an example of a message warning that there is overlap.
Figure 13:
Figure 13:
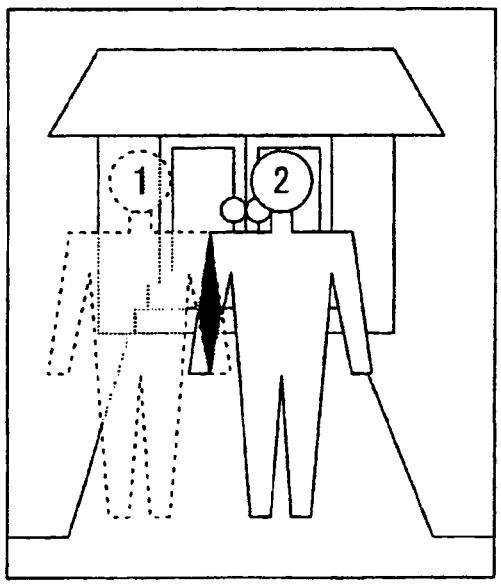

FIG. 13(a) is an example of the superimposed image generated in S9 in the case where there is overlap in S8. In this case, the portion corresponding to the overlap region 131 in which the first object and the second object overlap as a result of superimposing and writing the second object image on the first object image is displayed so as to stand out. Specifically, the original pixel value of the overlap region 131 is changed to, for example, a pixel value that blackens the overlap region 131.

By displaying the superimposed image in such a manner that the overlap region 131 stands out, there is an effect of helping the photographing in that it becomes apparent to the user and the object that there is overlap between the first object and the second object.

Thus, the example of the processing in S8 in the case where the object regions overlap in S7 has been outlined.

The processing is typically used in the following scene, for example. First, a background image like that of FIG. 6(a) is photographed by a camera (image combination device), and recorded. Next, using the same background, a first object like that of FIG. 7(a) is photographed and recorded. Finally, using the same background, a second object like that of FIG. 8(a) is photographed.

The first object and the second object can be photographed alternately by the first object and the second object themselves, without the help of a third person. The background image may be photographed either by the first object or by the second object, although it will be smoother if the background image is photographed by the second object, who conducts the next photographing. In order to take photographs using the same background, it is better not to move the camera. However, since correction will be made based on the background, it is not necessary to fix the camera by using a tripod, as long as the camera is held by hand substantially at the same position and directed in the same direction at the time of photographing. The positional relationship between the objects may be an arbitrary relationship, and is not limited to the right-left relationship in FIGS. 7(a) and 8(a).

After the three images are photographed, the processing of S4 to S10 are performed, and the display operation as shown in FIGS. 11(a) and 13(a) (and warning/notification described later) are performed.

If it is displayed or notified that there is overlap between the objects, the processing of S1 to S10 may be repeated. That is, the background image, first object image, second object image may be photographed and a superimposed image may be generated and displayed, for example. The processing may be repeated as many times as necessary, until a satisfactory processing result is displayed.

If the second object moves to another position, for example, there are cases where only the second object needs to be photographed again, and it is not necessary to photograph the background image and the first object image once again. In such cases, it is sufficient if S3 to S10 are repeated.

In this case, if S3 (acquiring the second object image) to S10 (displaying) are repeated automatically, that is, if (i) the second object image is acquired continuously in such a manner as to shoot a moving picture without pressing the shutter button, and (ii) the processing and displaying are repeated, it is possible to track the movement of the camera, the second object, and the like, thereby confirming the processing result in real time. Thus, it is possible to know in real time whether or not the new position of the second object is appropriate (whether or not the second object overlaps the first object). Therefore, there is an advantage that it is easy to photograph the second object in such a manner that the objects in the composite image do not overlap.

In order to start this repeat processing, it is necessary to enter into an exclusive mode by, for example, choosing start of the processing from the menu or the like. When the new position of the second object is appropriate, the shutter button may be pressed, so as to determine (record) the second object image. Then, the repeat processing/exclusive mode may be terminated (even after termination, the processing may be continued until S10 in which the final combination result is obtained).

In the case where the background image is good, but the first object image is not good (for example, in the case where the first object is in the middle of the background, and the second object cannot be placed without overlapping the first object or without framing out of the superimposed image), the processing may be performed once again from S2 (obtaining the first object image).

In this case, the first object image is photographed again because the first object image is combined as a standard image. Alternatively, if the background image is set to a standard image, and the first object region and the second object region are combined thereto, the background image may be photographed again, leaving the first object image as it is.

For example, in the case where the first object must be placed in the middle of the background image (standard image) in order that the backgrounds of the first object and the background image match each other, enough space for placing the second object without causing overlap might not be left in the portion surrounding the first object. In this case, by photographing the background image so that the first object is placed closer to an edge rather than in the middle, there is an effect that a region for placing the second object can be created.

The following provides details of the processing described above.

Figure 14:
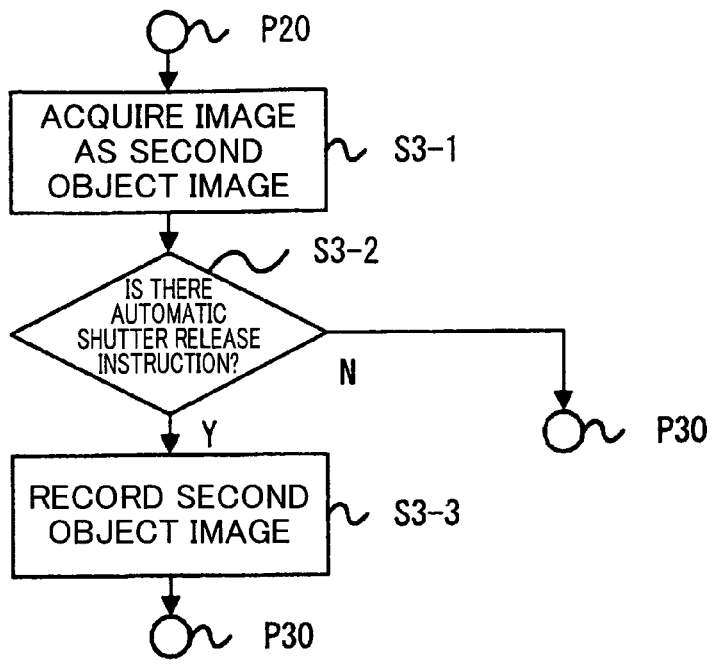
FIG. 14 is a flowchart illustrating a processing method for acquiring the second object image.

FIG. 14 is a flowchart illustrating a processing method for performing S3 of FIG. 5, that is, a processing for acquiring the second object image.

In S3-1, which is performed after P20, the second object image acquiring means 3 acquires the second object image. Then, the processing proceeds to S3-2. The processing in S3-1 is performed by the same method employed for acquiring the background image in S1 of FIG. 5.

In S3-2, the second object image acquiring means 3 judges whether or not there is an instruction of the automatic shutter releasing means 15 to record the image. If there is an instruction, the processing proceeds to S3-3. If there is no instruction, the processing moves to P30.

In S3-3, the second object image acquiring means 3 records the second object image acquired in S3-1 into the main memory 74, the external memory 75, or the like. Then, the processing jumps to P30.

By the processing S3-1 to S3-3, the processing in S3 of FIG. 5 is performed.

A photographed image may be recorded not only when the shutter is released by the automatic shutter releasing means 15, but also when the shutter button is pressed manually by the photographer or the shutter is released by a self timer. These are included in the processing in S1, S2, and S3-1.

Figure 15:
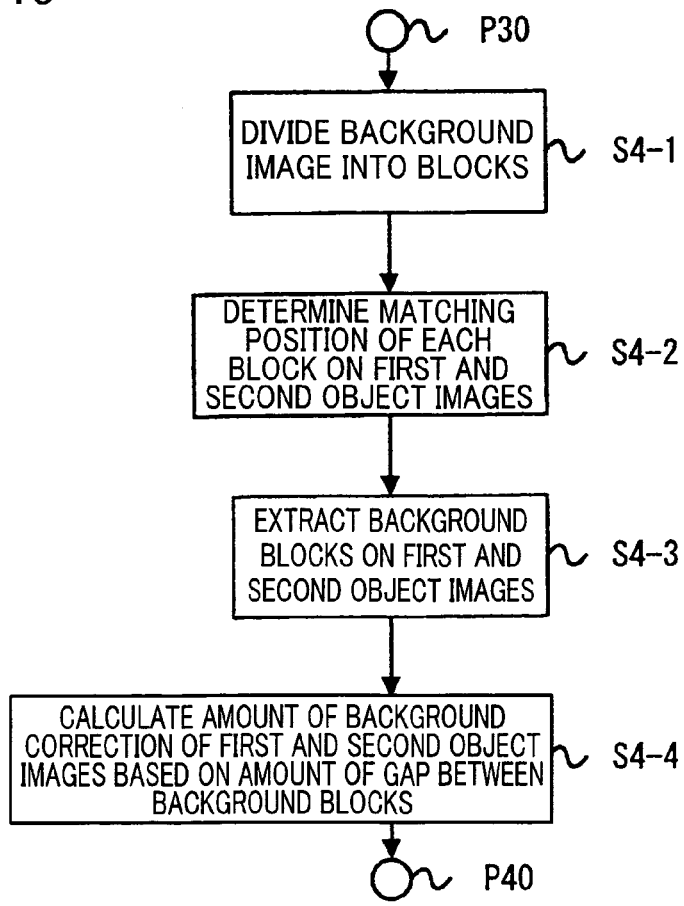
FIG. 15 is a flowchart illustrating a processing method for calculating an amount of background correction.

FIG. 15 is a flowchart illustrating a processing method for performing S4 of FIG. 5, that is, a processing for calculating the amount of background correction.

There are various methods for calculating the amount of background correction. Described below is a simple method using block matching.

In S4-1, which is performed after P30, the amount of background correction calculating means 4 divides the background image into block regions. FIG. 6(b) is an explanatory diagram illustrating the background image divided into block regions. The rectangles partitioned by the dotted lines are the block regions. The upper left block is expressed as "B(1, 1)". On the right of B(1,1) is "B(1, 2)", and below B(1,1) is "B(2,1)". In FIG. 6(b), the block B(1, 1) is labeled as "11" at the upper left of the block, so as to save spaces.

In S4-2, the amount of background correction calculating means 4 determines positions of the first object image and the second object image to which the blocks of the background image match respectively. Then, the processing proceeds to S4-3. In this case, "(block) matching" is a processing for searching, on the first object image and the second object image, a block region that is most similar to a block of the background image.

For the purpose of explanation, the image that defines the blocks (in this case, the background image) is referred to as a "reference image", and its counterpart image (the image on which resembling blocks are searched; in this case, the first object image and the second object image) are referred to as a "search image". The blocks on the reference image are referred to as "reference blocks", and the blocks on the search image are referred to as "search blocks". The pixel value (x, y) of an arbitrary point on the reference image is expressed as Pr(x, y), and the pixel value (x, y) of an arbitrary point on the search image is expressed as Ps(x, y).

The reference image is not limited to the background image; it may be the standard image, or the first object image or the second image irrelevant to the standard image. However, since the block matching is performed in order to calculate the amount of correction of the background portion, it is more advantageous to choose the background image (which has the largest background portion) as the reference image in that the background image has a higher probability of matching the background image portion of the search image.

For example, in the case where the first object image is set to the reference image, and the second object image is set to the search image, if a background portion of the second object image (e.g. B(4,2) of FIG. 8(b)) corresponds to the object portion of the first object image, the corresponding block cannot be determined correctly. In the case where the background image is set to the reference image, the block corresponding to B(4, 2) of FIG. 8(b) exists as B(4, 2) of FIG. 6(b).

Suppose that a reference block is a quadrate having the size of m×m pixels. Then, the position of an upper left pixel of a reference block B(i, j) is represented by (m×(i−1), m×(j−1)), and the pixel value at a position that is (dx, dy) pixels away from the upper left pixel of the reference block B(i, j) is represented by Pr(m×(i−1)+dx, m×(j−1)+dy)

If an upper left position of the search block is (xs, ys), a similarity S(xs, ys) between the reference block B(i, j) and the search block is represented by the following two formulas:

$D(xs, ys; dx, dy) = |Ps(xs+dx, ys+dy) - Pr(m \times (i-1)+dx, m \times (j-1)+dy)|$ $$S(xs, ys) = \sum_{dx=0}^{m-1} \sum_{dy=0}^{m-1} D(xs, ys; dx, dy)$$

D(xs, ys; dx, dy) is an absolute value of the difference between (i) the pixel value of the pixel that is (dx, dy) pixels away from the upper left pixel of the reference block and (ii) the pixel value of the pixel that is (dx, dy) pixels away from the upper left pixel of the search block. S(xs, ys) is a sum of the absolute value of the difference with respect to each pixel of the block.

If the reference block and the search block are identical images (if the corresponding pixel values are identical), S(xs, ys) is zero. The value of S(xs, ys) becomes higher as dissimilar portions increase, that is, as the difference between the pixel values becomes larger. Therefore, the lower the value of S(xs, ys) is, the more similar the blocks are.

Since S(xs, ys) is a similarity where the upper left position of the search block is (xs, ys), a similarity at a different position can be obtained by changing (xs, ys) on the search image. The position where the similarity is the smallest may be regarded to be a position where the blocks match each other. The search block at the position of matching is referred to as "matching block".

Figure 16:
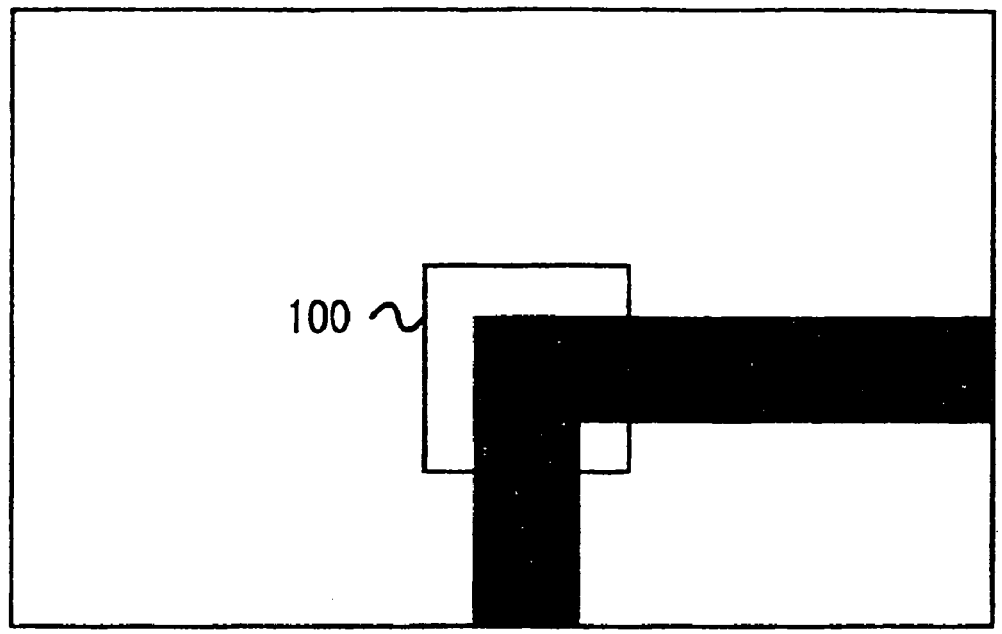
FIG. 16(a) is an explanatory diagram illustrating an example of a reference image so as to explain block matching.
FIG. 16(b) is an explanatory diagram illustrating an example of a search image so as to explain the block matching.
Figure 16:
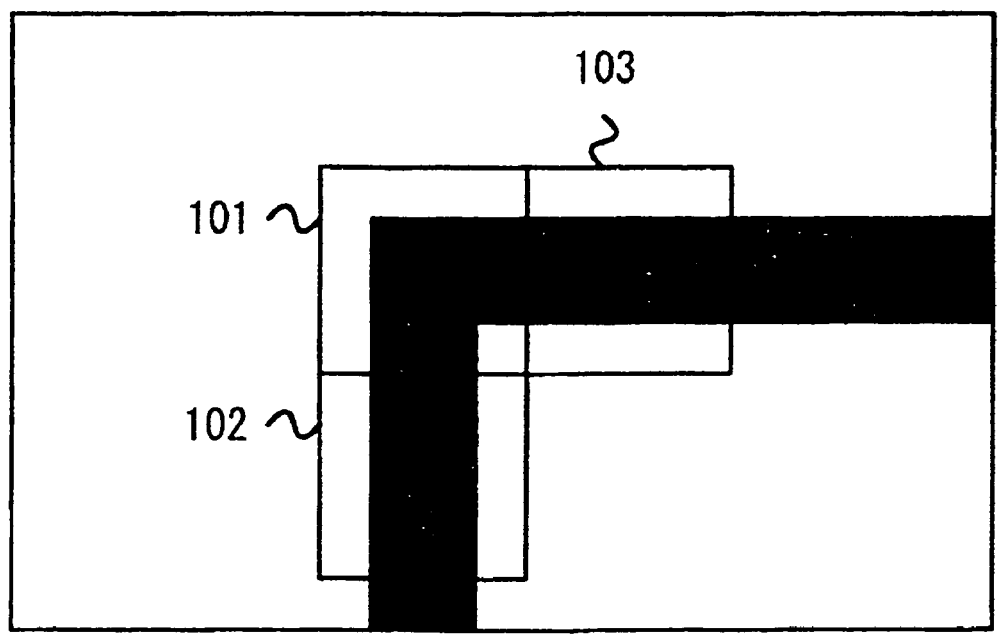

FIG. 16 is a diagram illustrating the matching. The image of FIG. 16(b) is the reference image., and the image of FIG. 16(b) is the search image. The reference image and the search image respectively include L-shaped lines at slightly different positions. A reference block 100 in the reference image is positioned at the corner of the L-shaped line. There are search blocks 101, 102, and 103 in the search image. If similarities between the reference block 100 and the search block 101, between the reference block 100 and the search block 102, and between the reference block 100 and the search block 103 are calculated, the similarity has the lowest value in the case of the search block 101. Therefore, the search block 101 is the matching block for the reference block 100.

The matching of a reference block B(i, j) has been discussed so far. The matching block can be determined with respect to each reference block. With respect to each of the 42 reference blocks in FIG. 6(b), a matching block is searched on the first object image and on the second object image.

In the foregoing example, the absolute value of the difference is used in order to calculate the similarity of the matching block. However, there are various other methods, and any of such methods may be employed.

For example, there are a method of using a coefficient of correlation, a method of using a frequency component, and various speed-up methods. There are various ways to set the position, size, and the like of the reference blocks. However, since minor improvements of the block matching is not a purport of the present invention, explanations for such matters are omitted.

It is preferable that the reference blocks have an appropriate size. If the reference blocks are too small, the accuracy of matching decreases, because the feature of each block cannot be fully captured. On the other hand, if the reference blocks are too large, the reference blocks might include objects and/or image frames, resulting in lowered accuracy of matching. Moreover, if the reference blocks are too large, the reference blocks might become vulnerable to changes such as rotation, expansion, and reduction.

Next, in S4-3, the amount of background correction calculating means 4 extracts only those search blocks that correspond to the background portion, among the matching blocks determined in S4-2. Then, the processing proceeds to S4-4.

The matching blocks determined in S4-3 are chosen merely because they have the smallest difference. Therefore, there is no guarantee that the matching blocks are identical to the reference blocks. It is possible that they include similar patterns or the like by chance. Moreover, there are cases in which no portion in the search images correspond to a reference block, because of the first and/or second objects. In such cases, the matching blocks are determined in an unreliable manner.

In view of this circumstance, it is necessary to remove, from each matching block, what is considered to be an image portion not identical to the reference block. The remaining matching blocks, having considered to be image portions identical to the reference blocks, are background portions, which do not include the first and second objects.

There are various methods for choosing the matching blocks. In the present embodiment, the simplest method is adopted. In this method, the similarity S(xs, ys) is judged by using a predetermined threshold value. If S(xs, ys) of a matching block exceeds the threshold value, the matching block is judged to be incorrect, and removed. Since the size of the block influences S(xs, ys), it is preferable to consider the size of the block in determining the threshold value.

FIG. 7(b) is obtained by removing incorrect matching blocks from the matching result in S4-2 of the first object image of FIG. 7(a). Those matching blocks that are judged to be correct are labeled with numbers identical to those of the corresponding reference blocks. Likewise, FIG. 8(b) is obtained by removing incorrect matching blocks from the matching result in S4-2 of the second object image of FIG. 8(a). From these results, it is found that the remaining matching blocks are only those matching blocks that do not include, or hardly include, object portions.

In S4-4, the amount of background correction calculating means 4 calculates the amount of background correction of the first object image and the second object image based on the matching blocks of the background portions obtained in S4-3. Then, the processing jumps to P40.

As the amount of background correction, an amount of rotation θ, an amount of expansion or reduction R, and/or an amount of parallel movement (Lx, Ly) are calculated, for example. There are various ways to calculate these amounts. Described below is the simplest method using two blocks.

The amount of distortion correction other than the amount of rotation, the amount of expansion or reduction, and the amount of parallel movement is not required in many cases, because correction can be performed with sufficiently little noises by using the difference image, unless the camera is relocated significantly at the time of photographing. In order to obtain the amount of distortion correction other than the amount of rotation, the amount of expansion or reduction, and the amount of parallel movement, at least three or four blocks and calculations that considers perspective (transparent) transformation are required. Since a known method (see, for example, Kyoritsu Shuppan, "Computer Science", separate volume of bit, Nov. 1994, p. 90) used for such purposes as combining panoramic images is employed, details of this processing is omitted.

First, two matching blocks that are as distanced from each other as possible are chosen. If only one matching block is left after S4-3, the following processing for calculating the rate of expansion or reduction and the amount of rotation is omitted, and the difference between the position of the matching block and the position of the corresponding reference block is calculated as the amount of parallel movement. If there is no matching block left after S4-3, it is preferable to make a warning indicating that to photograph the background image, the first object image, the second object image, or the like.

The two matching blocks may be chosen in various ways. For example, the two matching blocks may be chosen as follows:

1) Choose any two of the matching blocks, and calculate the distance between centers of the two blocks;
2) Perform the calculation of 1) with respect to all combinations of the matching blocks; and
3) Choose the combination that have the longest distance from each other, as the two blocks used for calculating the amount of background correction.

An advantage of using, as in 3), the matching blocks that have the longest distance from each other is that the rate of expansion or reduction and the amount of rotation can be calculated at high accuracy. Since the position of a matching block is defined by the unit of pixels, the accuracy is also determined by the unit of pixels. For example, an angle formed by two matching blocks distanced from each other by 50 pixels in the horizontal direction and one pixel in the vertical direction is identical to an angle formed by two matching blocks distanced from each other by 5 pixels in the horizontal direction and 0.1 pixel in the vertical direction. However, the gap of 0.1 pixel cannot be detected by the matching. Therefore, it is better to perform the matching by using matching blocks that are as distanced from each other as possible.

The number of matching blocks used is two merely because the calculation is simple. If the rate of expansion or reduction, the amount of rotation, and the like are calculated as average values by using more than two blocks, there is an advantage that errors are reduced.

For example, in the example of FIG. 8(b), the two matching blocks that are the most distanced from each other are the combination of blocks 15 and 61.

Next, the centers of the two matching blocks chosen are expressed as (x1', y1') and (x2', y2') by using coordinates on the search image, and centers of the corresponding reference blocks are expressed as (x1, y1) and (x2, y2) by using coordinates on the reference image.

To begin with, the rate of expansion or reduction is calculated.

The distance Lm between the centers of the matching blocks is represented by $$Lm=((x2'-x1')\times(x2'-x1')+(y2'-y1')\times(y2'-y1'))^{1/2}$$

The distance Lr between centers of reference blocks is represented by $$Lr=((x2-x1)\times(x2-x1)+(y2-y1)\times(y2-y1))^{1/2}$$

The rate of expansion or reduction R is represented by $$R=Lr/Lm$$

Next, the amount of rotation is calculated.

The slope θm of a linear line that passes through the centers of the matching blocks is represented by $$\theta m = \arctan((y2'-y1')/(x2'-x1')) \text{ (if } x2'=x1', \theta m=\pi/2)$$

The slope θr of a linear line that passes through the centers of the reference blocks is represented by $$\theta r = \arctan((y2-y1)/(x2-x1)) \text{ (if } x2=x1, \theta r=\pi/2)$$

Note that arctan is the inverse function of tan.

Therefore, the amount of rotation θ can be calculated as follows:

$$\theta = \theta r - \theta m$$

Finally, the amount of parallel movement is calculated. The amount of parallel movement needs to be such that the centers of the corresponding blocks become identical. For example, to make (x1' y1') and (x1, y1) identical, the amount of parallel movement (Lx, Ly) is as follows:

$$(Lx, Ly) = (x1' - x1, y1' - y1)$$

The amount of rotation and the amount of expansion or reduction can be calculated wherever the center is. Therefore, the point at which centers are located after parallel movement, that is, the center of the corresponding blocks, is used as a center of rotation and a center of expansion or reduction.

Therefore, an arbitrary point (x', y') can be transformed into a corrected point (x", y") according to the following transformation formulas:

$$x'' = R \times (\cos\theta \times (x' - x1') - \sin\theta \times (y' - y1')) + x1$$

$$y'' = R \times (\sin\theta \times (x' - x1') + \cos\theta \times (y' - y1')) + y1$$

To be precise, calculated here are not the amount of rotation, the amount of expansion or reduction, and the amount of parallel movement, but are θ, R, (x1, y1), and (x1', y1'). The amount of correction/transformation formulas may be expressed in other ways, without being limited to the foregoing ways.

The transformation formulas are formulas for transforming the point (x', y') on the search image into the point (x", y") on the corrected image. Since the (background portion of the) point (x", y") on the corrected image corresponds to the (background portion of the) reference image, this transformation means a transformation from the search image to the reference image (such a transformation that the background portions correspond to each other). Therefore, the transformation formulas can be expressed, by using a transformation function Fsr for conversing a point (Xs, Ys) on the search image into a point (Xr, Yr) on the reference image, as follows:

$$(Xr, Yr) = Fsr(Xs, Ys)$$

The formulas above can also be transformed into the following transformation formulas for reversely transforming the corrected point (x", y") into the arbitrary point (x', y') on the search image:

$$x' = (1/R) \times (\cos\theta \times (x'' - x1) + \sin\theta \times (y'' - y1)) + x1'$$

$$y' = (1/R) \times (\sin\theta \times (x'' - x1) - \sin\theta \times (y'' - y1)) + y1'$$

These formulas, when expressed by using a transformation function Frs, is as follows:

$$(Xs, Ys) = Frs(Xr, Yr)$$

The transformation function Frs is also known as an inverse transformation function of the transformation function Fsr.

In the examples of FIGS. 6(a), 7(a), and 8(a), correction is performed through parallel movement only, with no rotation, expansion or reduction. Details are described later, with reference to FIGS. 6(c) and 8(c).

By the processing in S4-1 to S4-4, the processing for calculating the amount of background correction in S4 of FIG. 5 is performed.

Figure 17:
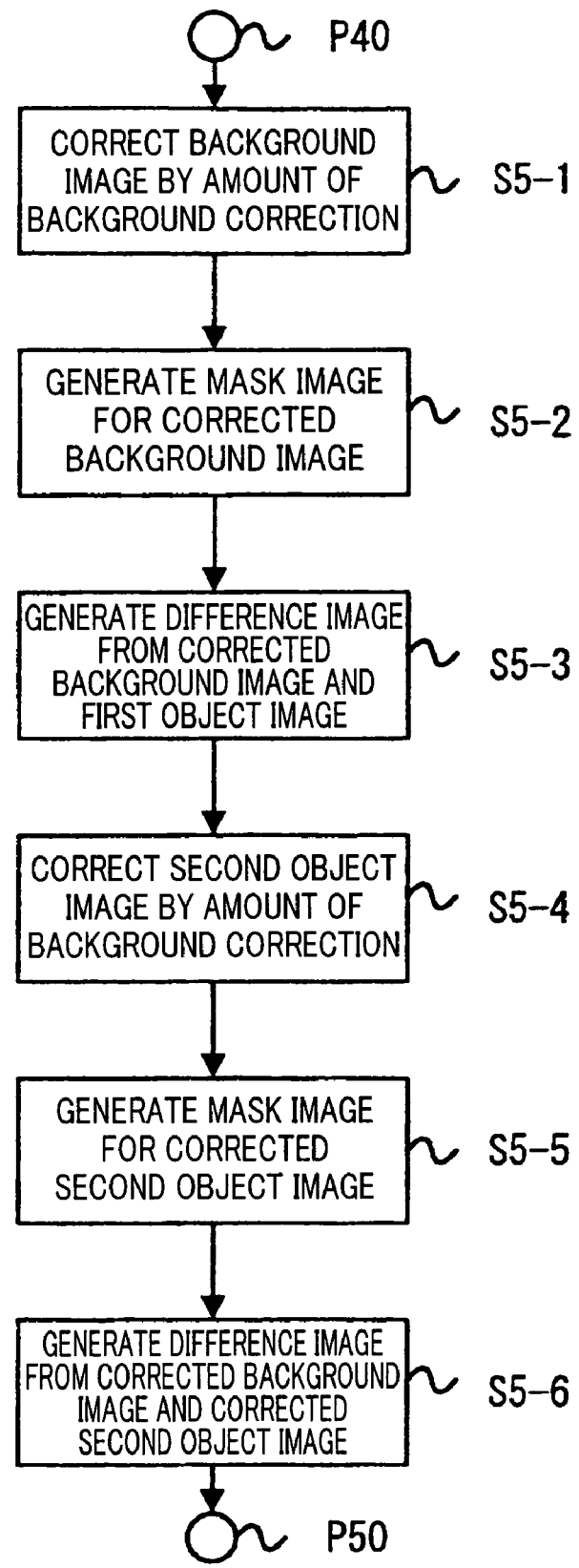
FIG. 17 is a flowchart illustrating a processing method for generating corrected images of the background image and the second object image, and generating difference images from the first object image and the corrected images.

FIG. 17 is a flowchart illustrating a method of performing the processing in S5 of FIG. 5, that is, the processing for generating a corrected image based on the background image and the second object image, and generating a difference image from the corrected image and the first object image.

The amount of correction calculated in S4 is the amount of correction between the background image and the first object image, and the amount of correction between the background image and the second object image.

In the form of transformation formula, calculated in S4 are as follows:

$$(X1, Y1) = Fb1(Xb, Yb)$$

$$(Xb, Yb) = F1b(X1, Y1)$$

$$(X2, Y2) = Fb2(Xb, Yb)$$

$$(Xb, Yb) = F2b(X2, Y2)$$

where (Xb, Yb) is a point on the background image, (X1, Y1) is a point on the first object image, (X2, Y2) is a point on the second object image, Fb1 is a transformation function for transforming (Xb, Yb) into (X1, Y1), F1b is the inverse transformation function of Fb1, Fb2 is a transformation function for transforming (Xb, Yb) into (X2, Y2), and F2b is the inverse transformation function of Fb2.

By thus calculating the transformation function (amount of correction) between two out of three images, any two out of the three images can be transformed from one into the other. Therefore, the next issue is which image to use as a standard image in performing the correction. In the present embodiment, considering the efficiency of processing performed later, the first object image (that is, the first/second object image that is photographed earlier than the other) is used as a standard image, and the background image and the second object image are corrected in such a manner that background portions thereof correspond to background portions of the first object image.

For example, suppose that an image is to be photographed again for such reasons as there is overlap between objects. If the first and second objects are photographed in this order, and the first object is the standard image, the second object image is to be photographed again. In this case, (i) the first object image and (ii) the background image corrected by using the first object image as the standard image do not have to be photographed again, and can be directly used for generating a composite image.

On the other hand, if (i) the second object image, which is photographed after the first object image, is used as the standard image, (ii) there is overlap between the objects, and (iii) the second object image is to be photographed again, the correction performed on the first object image and on the background image by using the second object image as the standard image becomes meaningless, as a matter of course. As a result, the first object image and the background image must be corrected again.

By thus using, as the standard image, the first object image or the second object image that is photographed earlier than the other, there is an effect that the processing amount and processing time can be reduced in the case where images are photographed again and again.

A transformation function F21 for transforming the second object image into the first object image is obtained by combining the transformation formulas above as follows:

$$(X1, Y1) = F21(X2, Y2)$$
$$= Fb1(F2b(X2, Y2))$$

An inverse transformation function F12 can be obtained in the same way.

In S5-1, which is performed after P40, the corrected image generating means 5 generates a corrected image by correcting the background image by the amount of correction calculated by the amount of background correction calculating means 4 (S4). The correction is performed so that the background portion corresponds to the first object image. Then, the processing proceeds to S5-2. The corrected background image generated in S5-1 is hereinafter referred to as "corrected background image" (See FIG. 6(*c*)).

The correction may be performed by using the transformation function F*b*1 or the inverse transformation function F1*b*. In general, in order to generate a clear transformed image, the position of a pixel of the original image (in this case, the background image) corresponding to the position of a pixel of the transformed image (in this case, the corrected background image) is determined, and a pixel value is calculated based on the position of the pixel. The transformation function used at this time is F1*b*.

In general, the determined position of the pixel of the original image is not an integer. Therefore, the pixel value at the determined position of the original image cannot be obtained directly. Usually, some sort of interpolation is performed. For example, in the most common method, the pixel value is calculated by primary interpolation based on four pixels whose pixel values are integers, the four pixels surrounding the pixel at the determined position of the original image. The interpolation is described in widely available books on image processing (for example, Takeshi Agui and Masayuki Nakajima, "Image Information Processing", Morikita Shuppan, p. 54). Therefore, the interpolation is not described here in detail.

Figure 6:
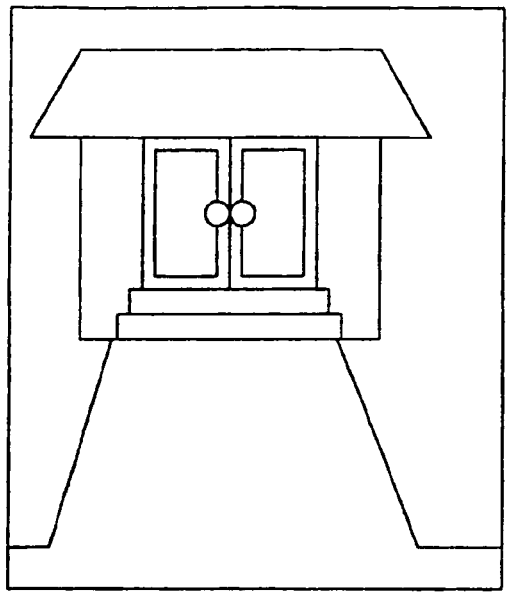
FIG. 6(a) is an explanatory diagram illustrating an example of a background image.
FIG. 6(b) is an explanatory diagram illustrating how reference blocks are arranged in the background image.
FIG. 6(c) is an explanatory diagram illustrating a corrected background image obtained by correcting the background image.
FIG. 6(d) is an explanatory diagram illustrating a mask image for the corrected background image.
Figure 6:
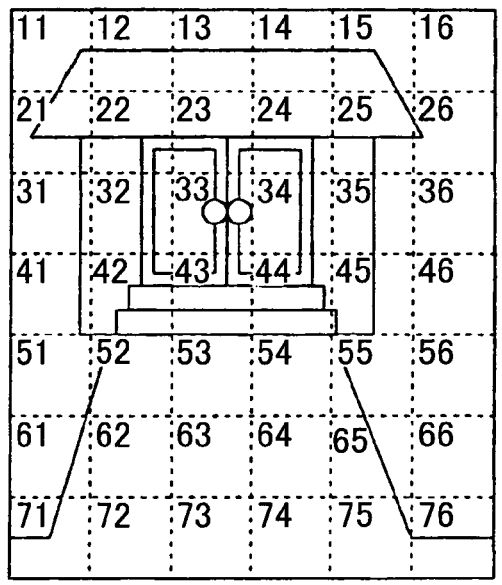
Figure 6:
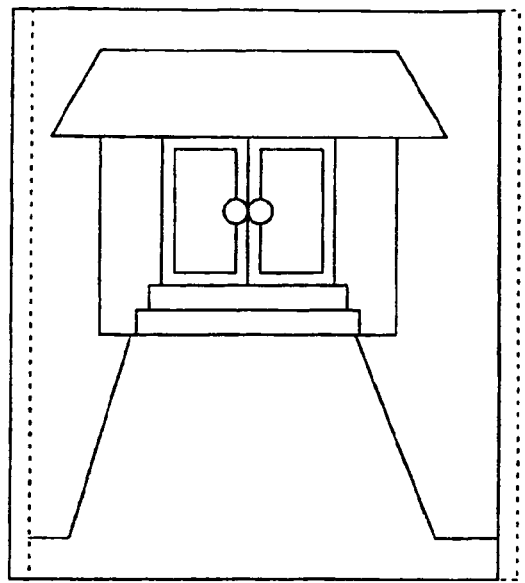
Figure 6:
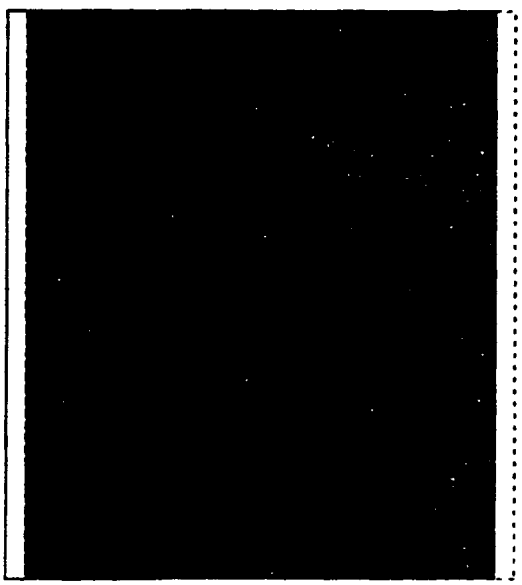
Figure 7:
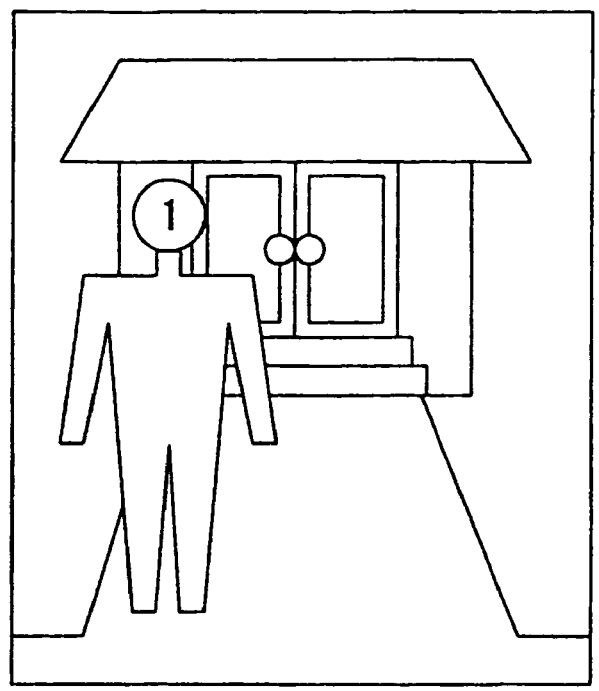
Figure 7:
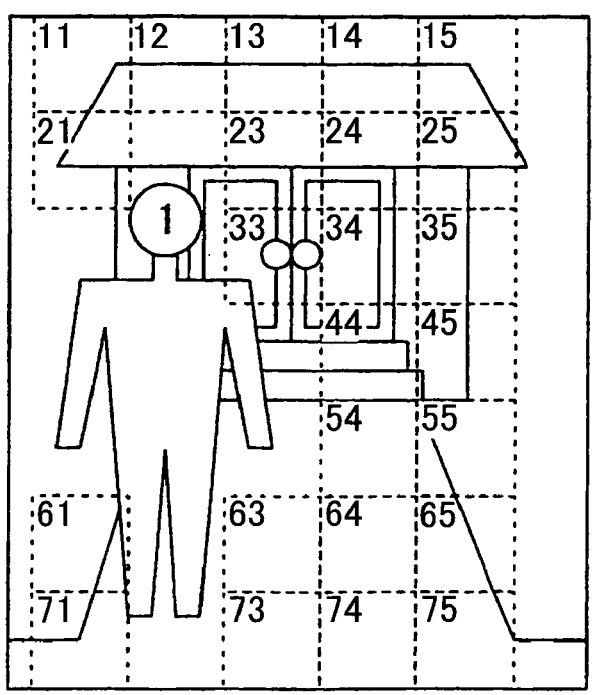

FIG. 6(*c*) is an example of the corrected background image generated based on the background image of FIG. 6(*a*) and the first object image of FIG. 7 so that the background image corresponds to the background portion of the first object image. In this example, the correction is performed only through parallel movement. To show how the image has been corrected, the scope of the background image of FIG. 6(*a*) is indicated by the dotted line. In FIG. 6(*c*), the frame as a whole is slightly shifted to the left, as compared with the background image of FIG. 6(*a*).

As a result of the correction, there is a portion that has no corresponding portion in the background image. For example, in FIG. 6(*c*), the portion between the dotted line and the solid line at the left end is blank, because this portion does not exist in the background image of FIG. 6(*a*). This can also be seen from the fact that the horizontal line (part of a road) at the bottom abruptly ends, without reaching the left end. Since this portion is to be excluded by using a mask image, it will not become a problem that the pixel values at this portion are unreliable.

In S5-2, the corrected image generating means 5 generates a mask image for the corrected background image. Then, the processing proceeds to S5-3.

The mask image is generated as follows. With respect to each pixel of the corrected image to be generated, the position of a corresponding pixel on the original image is calculated according to the formulas described above. If the position of the corresponding pixel falls within the range of the original image, the pixel value of the pixel of the corrected image is set, for example, to zero (black) as a mask portion. If the position of the corresponding pixel does not fall within the range of the original image, the pixel value of the pixel of the corrected image is set, for example, to 255 (white). The pixel value of the mask portion may be determined freely, without limitation to zero or 255. The following discusses the case where the pixel value of the mask portion is zero (black) or 255 (white).

FIG. 6(*d*) is an example of a mask image for FIG. 6(*c*). The blackened region within the frame indicated by the solid line is the mask portion. The mask portion indicates the region of the corrected image where the original image (image before correction) has pixels. Therefore, in FIG. 6(*d*), the left end portion, which has no corresponding portion on the background image, is white, and not included in the mask portion.

In S5-3, the difference image generating means 6 generates a difference image by using the first object image, and the corrected background image and its mask image obtained from the corrected image generating means 5 (S5-1). The difference image is based on the difference between the first object image and the corrected background image. Then, the processing proceeds to S5-4. The difference image generated in S5-3 is hereinafter referred to as "first object difference image".

In order to generate the difference image, it is judged whether or not the pixel value of the corresponding point, on the mask image, of a point (x, y) is zero. If the pixel value is zero (black), since there must be a corrected pixel on the corrected background image, the pixel value Pd(x, y) of the point (x, y) on the difference image is represented by $$Pd(x, y)=|P1(x, y)-Pfb(x, y)|$$

Thus, the pixel value Pd(x, y) is an absolute value of the difference between the pixel value P1(x, y) on the first object image and the pixel value Pfb(x, y) on the corrected background image.

If the pixel value, on the mask image, of a point (x, y) is not zero (black), $$Pd(x, y)=0$$

These processing are repeated with respect to each point (x, y) from the upper left to the lower right of the difference image.

FIG. 9(*a*) is an example of the first object difference image generated based on the first object image of FIG. 7(*a*), the corrected background image of FIG. 6(*c*), and the mask image of FIG. 6(*d*). In those regions other than the region of person (1), the difference is zero because the backgrounds correspond to each other or because the regions are outside the mask portion. As a result, FIG. 9(*a*) is an image where the image of person (1) and the image of the background are combined mainly within the region of person (1).

Usually, there are small regions where the difference is not zero, due to errors in calculating the amount of correction in S4, errors in the interpolation processing for generating the corrected image, and subtle changes of the background portion itself caused by photographing images at different times. Such regions are usually about several pixels in size, and the difference is not large. FIG. 9(*a*) has several white portions surrounding the region of person (1).

In S5-4, the corrected image generating means 5 generates a corrected image by correcting the second object image by the amount of correction calculated by the amount of background correction calculating means 4 (S4), so that the background portion of the second object image overlaps the first object image. Then, the processing proceeds to S5-4. The correction may be performed by using the transformation function F21 or the inversion transformation function 12. This processing is the same as the processing in S5-1 except that the image and the transformation function are different. The corrected second object image generated in S5-4 is hereinafter referred to as "corrected second object image".

FIG. 8(c) is an example of the corrected second object image generated based on the second object image of FIG. 8(a) and the first object image of FIG. 7(a). Also in this example, the correction is performed by parallel movement only. To show how the image has been corrected, the scope of the second object image of FIG. 8(a) is indicated by the dotted line. In FIG. 8(c), the frame as a whole is slightly shifted to the lower right, as compared with the background image of FIG. 6(a).

Figure 18:
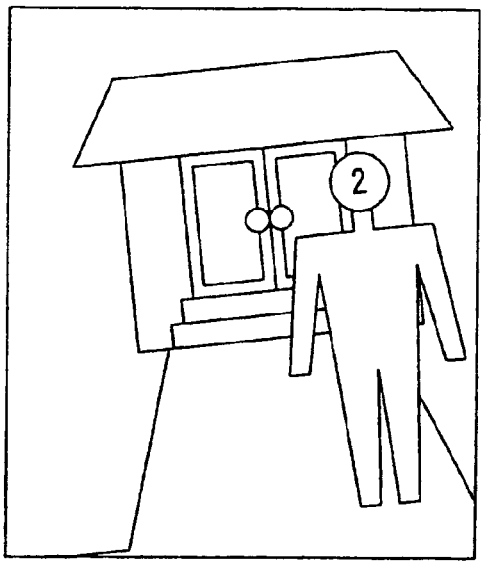
FIG. 18(a) is an explanatory diagram illustrating a rotated second object image.
FIG. 18(b) is an explanatory diagram illustrating how remaining matching blocks are arranged in the second object image.
FIG. 18(c) is an explanatory diagram illustrating a corrected second object image obtained by correcting the second object image.
FIG. 18(d) is an explanatory diagram illustrating a mask image for the corrected second object image.
Figure 18:
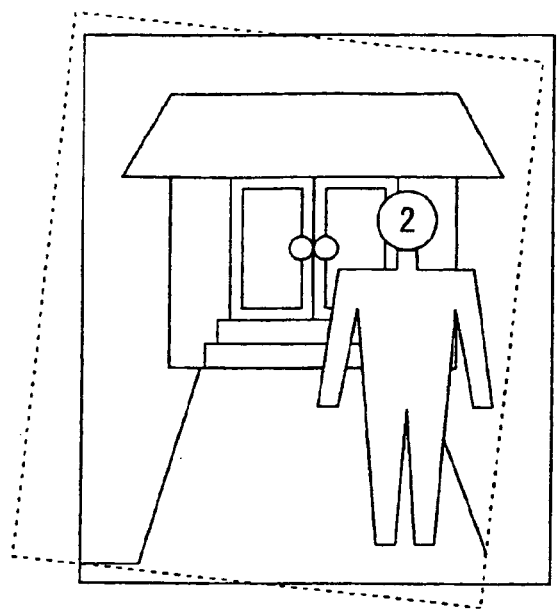
Figure 18:
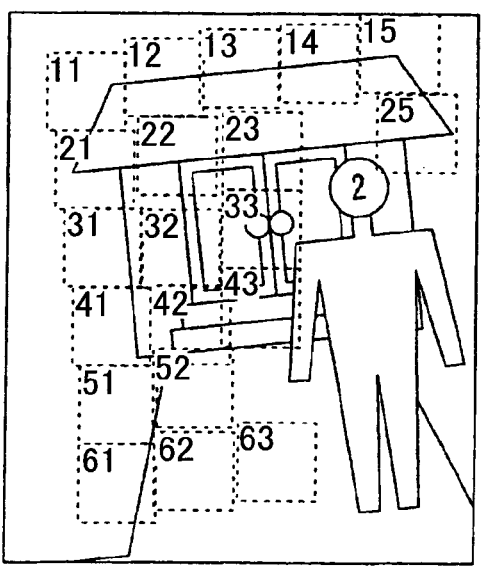
Figure 18:
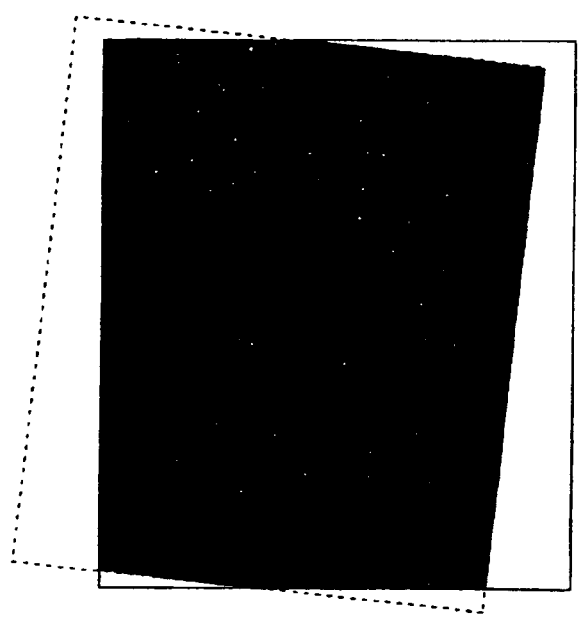

FIG. 18(a) is an example of the second object image that requires rotation so as to be corrected. The background image and the first object image are identical to FIG. 6(a) and FIG. 7(a), respectively. The screen as a whole is slightly rotated in the counterclockwise direction, as compared with FIG. 8(a).

FIG. 18(b) is a is a result of block matching performed between the second object image of FIG. 18(a) and the background image of FIG. 6(a). Even if the image is rotated, an image within a block does not change significantly, as long as the amount of rotation and the size of the block are not very large. Therefore, precise matching can be performed to some extent in accordance with the rotation.

FIG. 18(c) is the corrected second object image corrected by the amount of correction calculated based on the result of block matching of FIG. 18(b). Since the background portion of FIG. 18(c) overlaps the first object image of FIG. 7(a), it can be seen that rotation has been corrected. To show how the image has been corrected, the frame of FIG. 18(a) is indicated by the dotted line.

In S5-5, the corrected image generating means 5 generates the mask image for the corrected second object image. Then, the processing proceeds to S5-6. The mask image is generated in the same way as in S5-2. FIG. 8(d) is an example of the mask image for FIG. 8(c). In the case of FIG. 18(b), the mask image is as shown in FIG. 18(d).

Even if the amount of correction includes the amount of expansion or reduction and and/or the amount of rotation, the processing after the correction and mask image generation in S5-4 and S5-5 is performed by the same procedure. Therefore, the following description uses FIG. 8(a), instead of FIG. 18(a), as the second object image.

In FIGS. 5-6, the difference image generating means 6 generates a difference image by using the corrected background image obtained from the corrected image generating means 5 (S5-1), the mask image for the corrected background image obtained from the corrected image generating means 5 (S5-2), the corrected second object image obtained from the corrected image generating means 5 (S5-4), and the mask image for the corrected second object image obtained from the corrected image generating means 5 (S5-5). The difference image is based on the difference between the corrected second object image and the corrected background image. Then, the processing jumps to P50. The difference image generated in S5-6 is hereinafter referred to as "second object difference image" (see FIG. 10(a)).

The difference image is generated basically in the same way as in S5-3. However, the mask images are processed in a slightly different manner in that the difference between the images is calculated only when the pixel value of a point (x, y) is zero (black), both on the mask image of the corrected background image and on the mask image of the corrected second object image.

FIG. 10(a) is an example of the second object difference image generated based on the corrected background image of FIG. 6(c) and the corrected second object image of FIG. 8(c). FIG. 10(a) is in the same state as FIG. 9(a) except that the first object is replaced by the second object.

By the processing in S5-1 to S5-6, the processing in S5 of FIG. 5 for generating the difference image can be performed.

Figure 19:
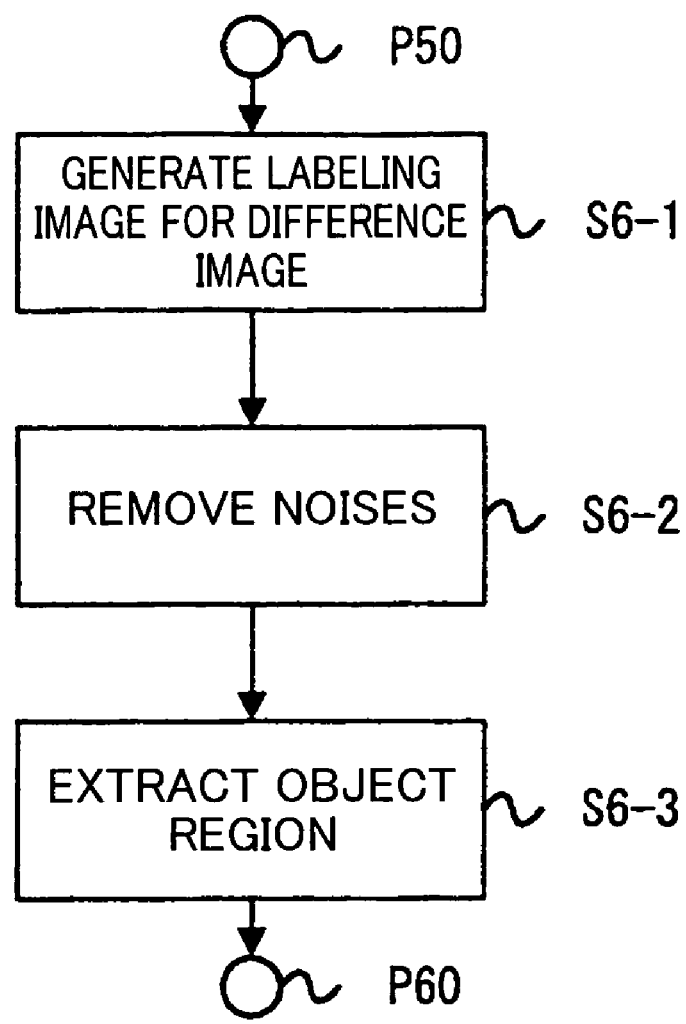
FIG. 19 is a flowchart illustrating a processing method for extracting an object region.

FIG. 19 is a flowchart illustrating an example of the processing in S6 of FIG. 5, that is, the processing for extracting an object region.

In S6-1, which is performed after P50, the object region extracting means 7 generates a "labeling image" (the meaning of "labeling image" is described later), based on the difference image obtained from the difference image generating means 6 (S6). Then, the processing proceeds to S6-2. Since there are two difference images (the first object difference image and the second object difference image), the labeling image is generated for each. The processing procedure for generating the labeling image is the same in both cases. Therefore, as used in the following description, the term difference image" concurrently means the "first object difference image" and the "second object difference image".

First, as a preparation, a binary image is generated based on the difference image. There are various methods for generating the binary image. For example, by comparing each pixel value of the difference image with a predetermined threshold value, white is allocated if the pixel value is higher than the threshold value, and black is allocated if the pixel value is not higher than the threshold value. If the difference image has pixel values of R, G, and B, the sum of the pixel values of R, G, and B may be compared with the threshold value.

FIG. 9(b) is an example of the binary image generated based on the first object difference image of FIG. 9(a). There are six black regions 110 to 115, which, except the large human-shaped region 112, are small regions. Likewise, FIG. 10(b) is an example of the binary image generated based on the second object difference image of FIG. 10(a). There are six black regions 120 to 125, which, except the large human-shaped region 122, are small regions.

Next, based on the generated binary image, the labeling image is generated. In general, the "labeling image" is an image generated by the following processing: (i) find groups of adjacent white pixels or black pixels in the binary image, and (ii) allocating numbers (hereinafter "labeling values") to the groups. In many cases, the outputted labeling image is a multivalued monochrome image, and the pixel value of the region of each group is the label value allocated to the group.

The region of pixels having the same labeling value is hereinafter referred to as "label region". Details of the processing procedure for finding adjacent groups and labeling the groups with labeling values are described in generally available books (for example, Shokodo, "Handbook on Image Processing", published in 1987, p. 318). Therefore, the processing procedure are omitted here, and the following only describes the processing result.

The only difference between the binary image and the labeling image is that the former is a binary image whereas the latter is a multivalued image. Therefore, the following describes an example of the labeling image with reference to FIG. 9(b) and FIG. 10(b). In FIG. 9(b), the number of each of the regions 110 to 115 is followed by a number in parentheses, like "110(1)". This number indicates the labeling value of the region. The same holds true with FIG. 10(b). To the rest of the regions, zero is allocated as a labeling value.

Since it is difficult to illustrate multivalued images on paper, the labeling images of FIGS. 9(b) and 10(b) are illustrated as if they were binary images, although they are in fact multivalued images having labeling values. Therefore, although it is not required to display, FIG. 9(b) and FIG. 10(b) would appear differently if these images were actually displayed.

In S6-2, the object region extracting means 7 removes "noise"-like regions of the labeling images obtained in S6-1. Then, the processing proceeds to S6-3. In general, the "noise" is a portion other than the portion of intended data. In this case, the "noise" is the regions other than the human-shaped region.

There are various methods for removing the noise. In a simple method, label regions whose area (number of pixels) is not more than a threshold value is removed. In this method, first, the area of each label region is calculated. To calculate the area, all pixels are scanned, and the number of pixels having a specific labeling value is calculated. After the area (number of pixels) is calculated with respect to all labeling values, the label region whose area (number of pixels) is not more than a predetermined threshold value is removed. Specifically, the label region may be removed by setting the label value of the label region to zero, or copying a label region other than the noise onto the label region.

FIG. 9(c) is a result obtained by removing the noise from the labeling image of FIG. 9(b). All regions other than the human-shaped region 112 have been removed as noises.

In S6-3, the object region extracting means 7 extracts the object region from the noise-free labeling image obtained in S6-2. Then, the processing jumps to P60.

In general, it is difficult to extract the object region with perfect precision by image processing only; human knowledge and high-level processing are generally required. As a method of extracting a region, there is a method called "snake". However, "snake" is not perfect, either. It is nevertheless possible to estimate a region that can be used in overlap detection processing and combination processing to some extent.

For example, if the number of the first, second, and the like objects is set as a fixed value or a variable in a program or the like, the label regions corresponding to the set number may be extracted from the noise-free labeling images, in descending order in terms of area. Alternatively, all regions whose area is not less than a predetermined threshold value may be treated as object regions or the like.

If fully automated extraction is difficult to realize, the object regions may be specified by a user, using input means such as a tablet, a mouse, or the like. To specify the object regions, the user may specify outlines of the object regions, may specify which label region is an object region, using the outline of each label region in the labeling images, or may employ other methods.

In this example, all the regions whose area is not less than the predetermined threshold value are treated as the object regions. However, FIGS. 9(d) and 10(d) (illustrating processing results) do not look different from FIGS. 9(c) and FIG. 10(c), because, in FIGS. 9(c) and FIG. 10(c), there is only one large region after the noises have been removed.

In FIGS. 9(b) and 10(b), the human-shaped region happens to be a single label region. Depending on the image, however, there is a case where a single object is divided into a plurality of label regions. For example, if color, brightness or the like of a pixel in the vicinity of the center of an object region is similar to the background, the vicinity of the object region is recognized as the background, because the pixel value of that portion of the difference image is small. As a result, the object region is extracted as a region divided into an upper part and a lower part, or a right part and a left part. In this case, there is a possibility that the subsequent object overlap detection and combination processing cannot be performed successfully.

One method that can overcome this situation is a method in which the label regions of the labeling image are expanded so as to integrate neighboring label regions into a single label region. The integration may be attained by snake. Details of the processing procedures for the distention and snake are described in generally available books on image processing and the like (for example, Shokodo, "Handbook on Image Processing", published in 1987, p. 320, and Kass A., et al., "Snakes: Active Contour Models", Int. J. Comput. Vision, pp. 321-331 (1988)). Therefore, the processing procedures are not described here.

Alternatively, if not for the purpose of integrating neighboring label regions, the extracted object regions may be expanded by certain amount for the purpose of reducing the possibility that the occurrence of overlap might be overlooked.

Note that the distention and integration are not performed in the processing example described here.

By the processing in S6-1 to S6-3, the processing in S6 of FIG. 5 for extracting the object region can be performed.

Next, the following describes one example of the details of the processing in S7 of FIG. 5.

In S7, the overlap detecting means 8 detects whether or not there is overlap between the first object region and the second object region obtained from the object region extracting means 7 (S6). If there is overlap, the overlap region is extracted.

In reality, however, in order to detect whether or not there is overlap, it is easier to extract the overlap region, and thereby detect whether or not there is overlapping area. Therefore, the overlap region is extracted first.

One method for detecting the overlap region is as follows. It is judged whether or not a pixel at a position (x, y) belongs to both the first object region and the second object region. If the pixel belongs to both, the pixel value of the pixel is set, for example, to zero (black). If the pixel does not belong to both, the pixel value of the pixel is set, for example, to 255 (white). In this way, the position (x, y) is scanned with respect to all pixels. As a result, overlapping image can be generated.

In order to judge whether or not a pixel at a position (x, y) belongs to both the first object region and the second object region, the pixel at the position (x, y) is found in the image including the first object region and in the image including the second object region, which are obtained in S6. Then, it is judged whether or not both pixels are within the object regions, respectively (for example, in the example above, the pixels belong to the object region unless the labeling value thereof is zero).

If the generated overlapping image has a pixel whose pixel value is zero (black), there is overlap. If the generated overlapping image does not have a pixel whose pixel value is zero (black), there is no overlap.

As information on overlap, the overlap detecting means 8 not only outputs information on whether or not there is overlap, but also the overlap region, that is, the generated overlapping image.

In the examples of FIG. 9(c) and FIG. 10(c), no overlapping image is illustrated, because there is no overlap. In this case, the overlap detecting means 8 judges that there is no overlap.

An example where there is overlap is described below, with reference to the second object image of FIG. 20(a). The background image and the first object image are FIG. 6(a) and FIG. 7(a), respectively.

FIG. 20(b) is a second object region image generated based on FIG. 20(a). The second object region is slightly shifted to the left, as compared with the region 122 of FIG. 10(d). An overlapping image generated based on FIG. 20(b) and the first object region image of FIG. 9(d) is FIG. 12. The overlap region 131 is blackened. In FIG. 12, the first object region 112 and the second object region 130 are indicated by the dotted line, in order to show how the two images overlap (in the actual overlapping image, the dotted line does not exist). In the case of FIG. 12, the overlap detecting means 8 judges that there is overlap.

Figure 21:
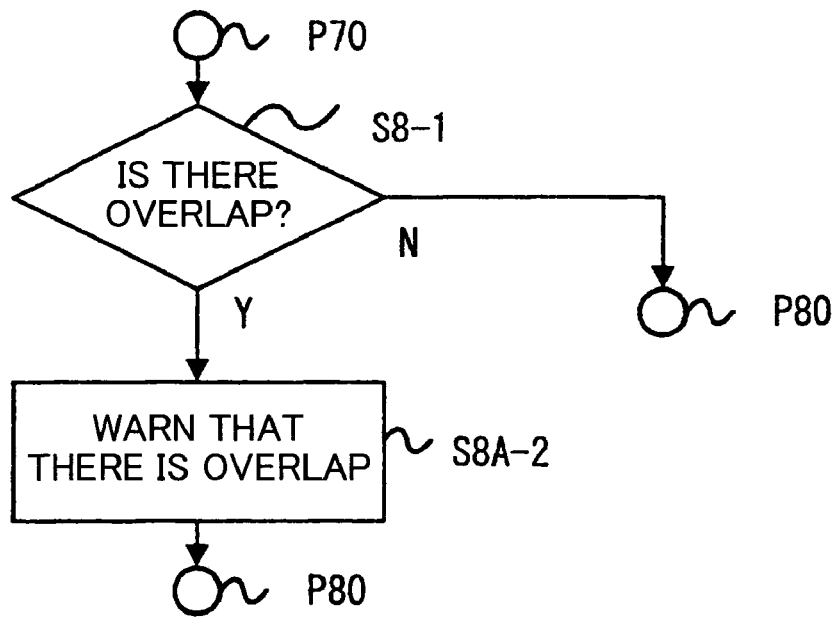
FIG. 21 is a flowchart illustrating a processing method for warning that there is overlap between object regions.

FIG. 21 is a flowchart illustrating a method of performing the processing in S8 of FIG. 5, that is, the processing on overlap. Another method for performing the processing on overlap is described later, with reference to FIGS. 22, 23, 24, and 27.

In S8-1, which is performed after P70, the overlap warning means 13 judges whether or not there is overlap, based on the information on overlap obtained from the overlap detecting means 8 (S7). If there is overlap, the processing proceeds to S8A-2. If there is no overlap, the processing jumps to P80.

In S8A-2, the overlap warning means 13 warns to the user (photographer) and/or the object that there is overlap between the first object and the second object. Then, the processing jumps to P80.

There are various ways to notify the warning.

For example, in the case where the warning is notified by using a composite image, the overlap region may be displayed over the composite image so as to attract attention. FIGS. 13(a) and 13(b) illustrate this case. The two images are different only in that the first object (person (1)) is combined by different image combination methods.

In FIGS. 13(a) and 13(b), the overlap region 131 of FIG. 12 is displayed over the composite image. It is preferable that the region 131 is colored in red or in other striking color by changing the pixel values of the region 131. Alternatively, the region of 131, the outline thereof, or the like may blink while being displayed.

FIG. 13(c) is an example in which the warning is also made with letters. In FIG. 13(c), an warning window is displayed over the composite image, and the warning window includes the following message: "OBJECTS OVERLAPPING!" Like the region 131, the massage may be colored in a striking color, or may blink.

Writing over the composite image may be instructed from the overlap warning means 13 to the superimposed image generating means 9, or to the superimposed image display means 10. In order to cause the warning window to blink, it might be necessary to use the initial composite image. Therefore, it is better in many cases, for example, to supply data of the warning window intermittently from the main memory 74 or the external memory 75 to the superimposed image display means 10.

By displaying the warning on the monitor 141 of FIG. 3(a), photographs can be taken conveniently in that the overlapping state can be confirmed while taking photographs. This is advantageous in that, if an image photographed next is to be used as the second object image or the like, the photographer can ask the object (person (2)) to move rightward, for example, to resolve the state of overlap.

The following are examples of the cases where image photographed next is to be used as the second object image: (i) the case where the user instructs the recording of the second object image (memory writing) by using the shutter button 143, and (ii) the case of the above-described exclusive mode for repeat processing, in which the second object image is photographed in such a manner as to shoot a moving picture, and the corrected superimposed image is displayed substantially in real time.

Although the monitor 141 in FIG. 3(a) is directed to the photographer, if the device is such that the monitor can be directed to the object, the object can also confirm the state of overlap, and move in his/her own initiative to resolve the overlap, without requiring the photographer's instruction. In addition to the monitor 141, another monitor may be provided for use by the object.

If the processing of S3 to S10 in FIG. 5 is to be repeated as in the exclusive mode described above, it is possible to know the current state of overlap substantially in real time. Therefore, it is possible to know substantially in real time whether or not the overlap has been resolved. This makes it possible to take photographs conveniently and efficiently. The processing in S3 to S10 of FIG. 5 do not require much time, if a sufficiently quick CPU, logic circuit, or the like is used. In actual use, it can be called a substantially real-time display if a repeat processing of at least about once a second can be realized.

In the repeat processing, the second object image is kept updated. In generating the difference image in S5, the first object image is used as the standard image, because this is advantageous in that the amount of processing can be reduced at the time of the repeat processing. If the second object image is used as the standard image, such processing as calculation of the amount of background correction, generation of the difference image, and detection of the object region must be performed with respect to all images including the first object image and the background image. On the other hand, if the first object image is used as the standard image, the processing between the first object image and the background image is required only once. Therefore, only the processing related to the second object image needs to be repeated.

After the overlap region is displayed over the composite image, if it can be judged, based on the relationship between (i) the state of overlap between the objects and (ii) the frame of the composite image, that overlap will occur no matter how the object moves, or that the object will be out of the frame, it is possible to judge that it is better to go through the processing again by photographing the first object image, the background image, and the like.

The warning may be notified by lighting up the lamp 142 of FIG. 3(a) or causing the lamp 142 to blink. The warning can be recognized easily if the color of the lamp is red, orange, or the like color. By causing the lamp to blink, there is an advantage that, in general, the photographer can easily recognize the blink even if he/she is not paying attention to the monitor 141.

The overlap region as shown in FIG. 13(b) may be notified by the lamp only, without displaying it over the composite image. In this case, the degree of overlap cannot be recognized immediately. However, as long as whether or not there is overlap is recognized, it is possible to attain the purpose of obtaining a composite image having no overlap, by moving the object and watching over whether or not the notification of warning has stopped. Therefore, the sole use of the lamp is sufficient. This arrangement is advantageous in that the processing for displaying the overlap portion can be omitted.

It is preferable if the degree of overlap can be recognized separately by displaying the area of the overlap portion in numbers or bar graph on the monitor 141, or by changing, in accordance with the area of the overlap portion, (i) the light-up control for a plurality of lamps or (ii) the blinking interval of a single lamp.

Although not provided in FIG. 3(a), if, in addition to the monitor 141, there is another means (e.g. a finder) through which images can be viewed, the same notification of warning as displayed on the monitor 141 may be displayed on the another means, or the notification may be made by using a lamp provided inside the finder.

Moreover, although not shown in FIGS. 3(a) and 3(b), the warning may be notified by using the speaker 80 of FIG. 2. The warning is notified by beeping a warning buzzer when there is overlap, or outputting such voice as "OVERLAPPING!". In this case, the same effect brought about by the lamp can be expected. If the speaker is used, there is an advantage that both the photographer and the object can know the state of overlap through a single speaker, because sound has little directivity unlike light.

By the processing in S8-1 to S8A-2, the processing on overlap in S8 of FIG. 5 can be performed.

Figure 22:
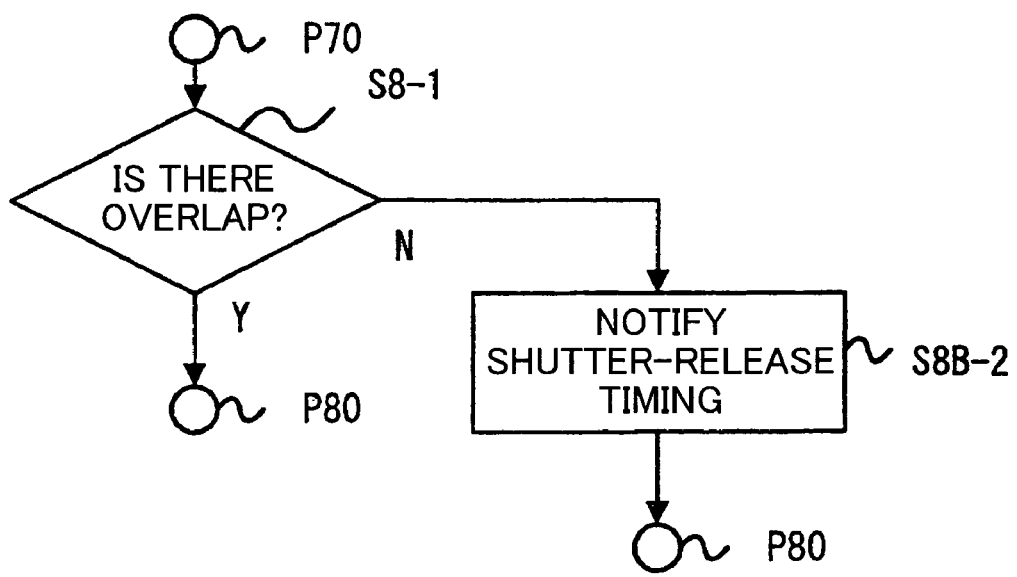
FIG. 22 is a flowchart illustrating a processing method for notifying a shutter-release timing when there is no overlap between the object regions.

FIG. 22 is a flowchart illustrating another method for performing the processing in S8 of FIG. 5, that is, the processing on overlap.

In S8-1, which is performed after P70, the shutter release timing notifying means 14 judges whether or not there is overlap, based on the information on overlap obtained from the overlap detecting means 8 (S7). If there is overlap, the processing jumps to S8B-2. If there is no overlap, the processing proceeds to S8B-2.

In S8B-2, the shutter release timing notifying means 14 notifies, to the user (photographer) and/or the object, that there is no overlap. Then, the processing jumps to P80.

This notification is usually not so much a notification of the absence of overlap as a notification of the right timing for operation that depends upon the absence of overlap, that is, releasing the shutter and thereby recording the second object. In this case, the notification is addressed mainly to the photographer.

To notify the right timing for releasing the shutter, the method described above with reference to FIG. 21 may be employed. The message in FIG. 13(c) may be changed to "RELEASE SHUTTER!", for example. Since the overlap portion of FIG. 13(c) does not exist at this time, it is not necessary to display the overlap portion, as a matter of course. The notification may be made by using the lamp, speaker, and the like, although the color and outputted sound will be different to some degree.

Advantages of notifying the right timing for releasing the shutter are as follows: (i) the photographer can release the shutter and thereby photograph/record an image while there is no overlap, and (ii) the object can prepare for the release of the shutter (for example, the object can turn his/her eyes on something, and/or change facial expression).

By the processing in S8-1 to S8B-2, the processing on overlap in S8 of FIG. 5 can be performed.

Figure 23:
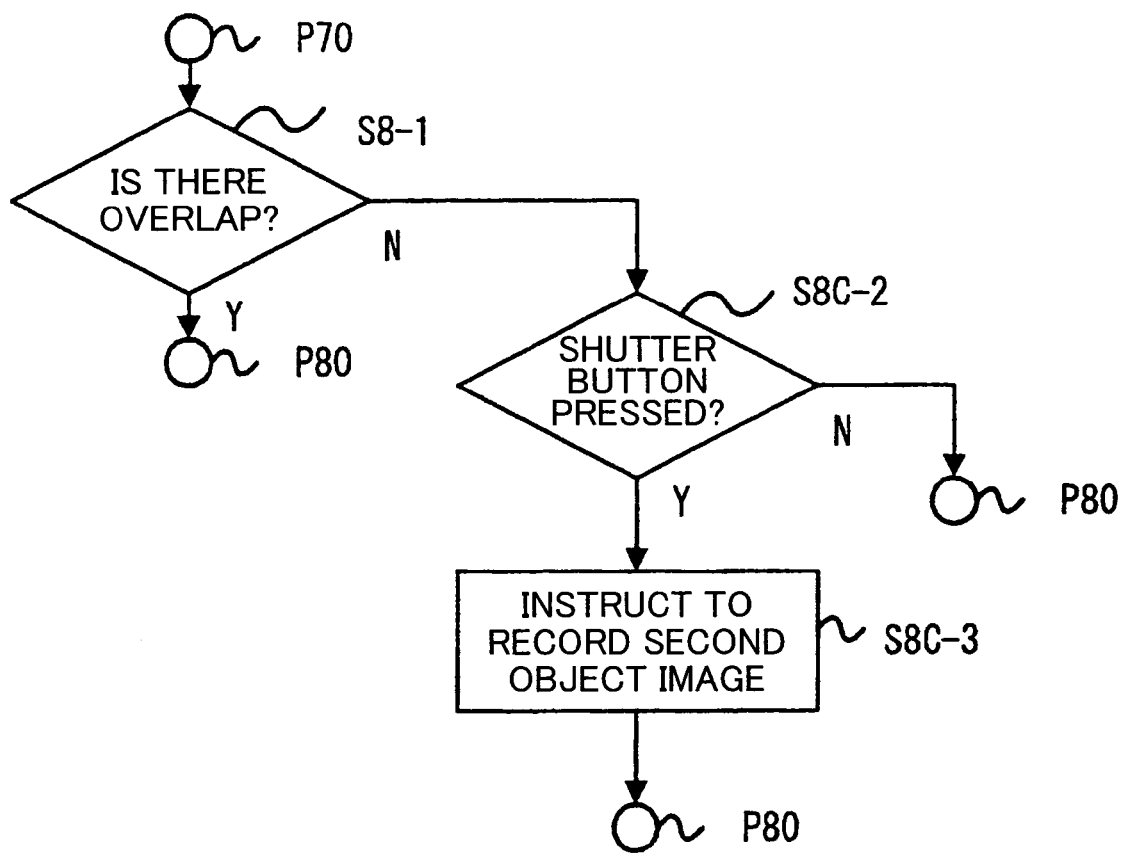
FIG. 23 is a flowchart illustrating a processing method for automatically releasing the shutter when there is no overlap between the object regions.

FIG. 23 is a flowchart illustrating yet another method for performing the processing in S8 of FIG. 5, that is, the processing on overlap.

In S8-1, which is performed after P70, the automatic shutter releasing means 15 judges whether or not there is overlap, based on the information on overlap obtained from the overlap detecting means 8 (S7). If there is overlap, the processing jumps to P80. If there is no overlap, the processing proceeds to S8C-2.

In S8C-2, the automatic shutter releasing means 15 judges whether or not the shutter button is pressed. If the shutter button is pressed, the processing proceeds to S8C-3. If the shutter button is not pressed, the processing jumps to P80.

In S8C-3, the automatic shutter releasing means 15 instructs the second object image acquiring means 3 to record the second object image. Then, the processing jumps to P80. In accordance with the instruction, the second object image acquiring means 3 records the photographed image into the main memory 74, the external memory 75, or the like.

This arrangement has an effect that a photographed image can be recorded automatically if the shutter button is pressed while the objects are not overlapping. At the same time, there is an effect that no photographed image will be recorded by mistake while the objects are overlapping.

In actual use, the photographer observes the object and, when the photographer finds it appropriate to record an image, presses the shutter button. However, recording is not always performed at this time. No recording is performed if there is overlap. If the automatic shutter releasing means 15 judges that there is overlap, the recording of the second object image is prohibited so that no recording operation will be performed by the second object image acquiring means 3 even if the photographer presses the shutter.

If no recording has been performed, it is preferable to notify the photographer and/or the like, by displaying or using such notifying means as lamp or speaker, that no photograph has been taken even through the shutter is pressed.

If the shutter button is pressed again when there is no overlap (after the object has moved, for example), recording is performed this time. It is preferable to notify the photographer and/or the like, by displaying or using such notification means as lamp or speaker, that recording has been performed.

In the case where the shutter button is not pressed every time, but is kept being pressed, automatic recording is performed at the moment the state of overlap is resolved. However, if an image is recorded at the moment the overlap is resolved, there are cases where the photographed image is blurred because the object has not stopped yet, or where the object is not yet prepared for the release of the shutter (e.g. because the object's eyes are directed elsewhere). In such cases, it is preferable to take certain time before automatic recording is performed.

By the processing in S8-1 to S8C-3, the processing on overlap in S8 of FIG. 5 can be performed.

Figure 24:
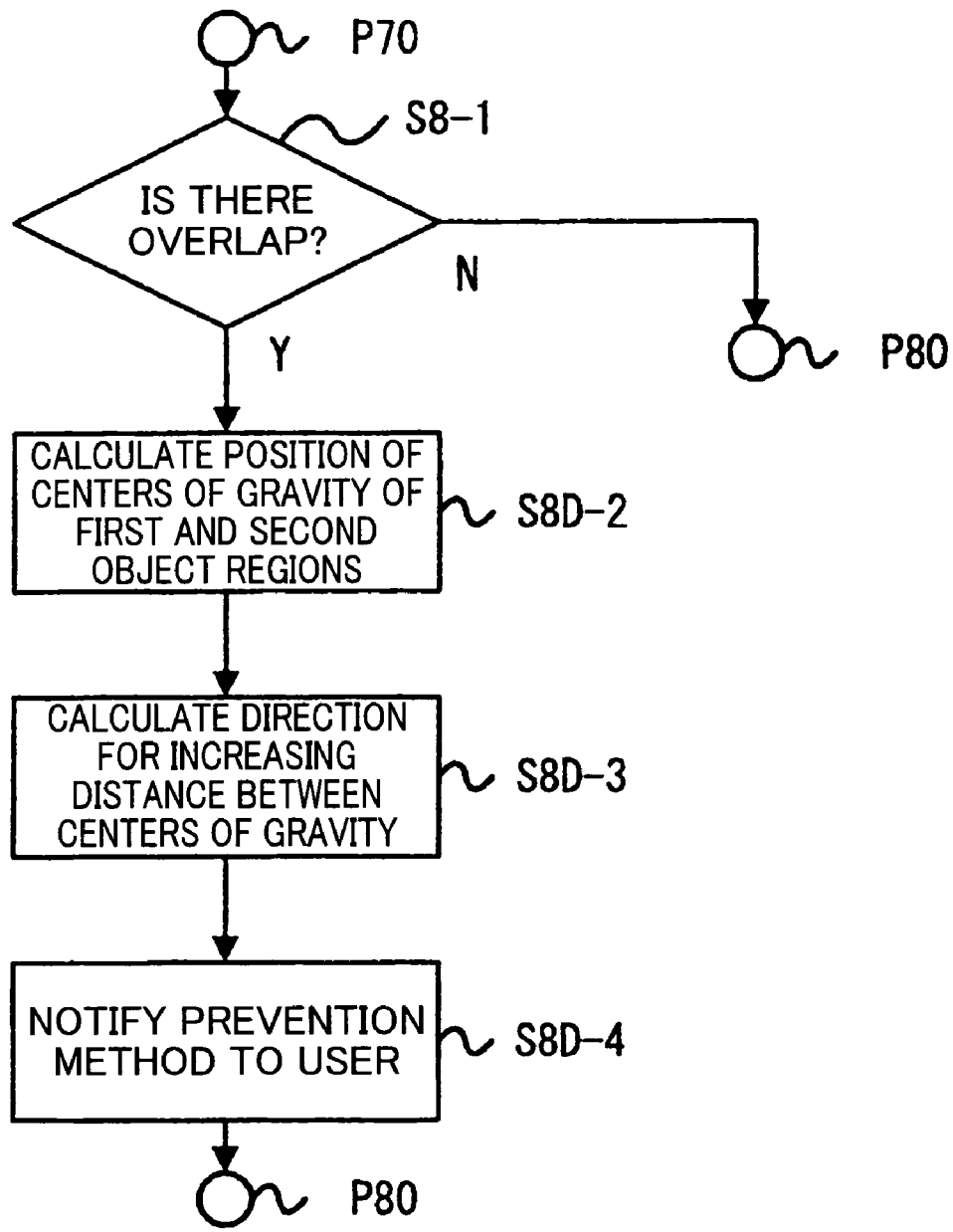
FIG. 24 is a flowchart illustrating a processing method for notifying a direction for reducing overlap, when there is overlap between the object regions.

FIG. 24 is a flowchart illustrating a further method for performing the processing in S8 of FIG. 5, that is, the processing on overlap.

In S8-1, which is performed after P70, the overlap prevention method calculating means 11 judges whether or not there is overlap, based on the information on overlap obtained from the overlap detecting means 8 (S7). If there is overlap, the processing proceeds to S8D-2. If there is no overlap, the processing jumps to P80.

In S8D-2, the overlap prevention method calculating means 11 calculates the center of gravity of each of the first and second object regions. Then, the processing proceeds to S8D-3. In very simple terms, the center of gravity is a center of the region. To be precise, the center of gravity is such a position that, when (i) the distance between the center of gravity and a pixel and (ii) the direction from the center of gravity toward the pixel are expressed in a vector, the sum of vectors of all pixels within the region is zero. Methods for calculating the center of gravity are also described in generally available books on information processing. Therefore, such methods are not described here.

In S8D-3, based on the centers of gravities of the first and second object regions calculated in S8D-2, the overlap prevention method calculating means 11 calculates the direction toward which the second object should be moved so that the distance between the centers of gravities of the first and second object regions becomes the longest (the direction from the center of gravity of the first object region toward the center of gravity of the second object region). Then, the processing proceeds to S8D-4.

For example, if the center of gravity of the first object region calculated in S8D-2 is (Xg1, Yg1), and the center of gravity of the second object region calculated in S8D-2 is (Xg2, Yg2), the direction toward which the distance therebetween becomes the longest is represented by the following vector:

(Xg2−Xg1, Yg2−Yg1)

However, if Xg2=Xg1 and Yg2=Yg1, the direction may be any direction, because the centers of gravity of the first object and the second object are identical.

Figure 25:
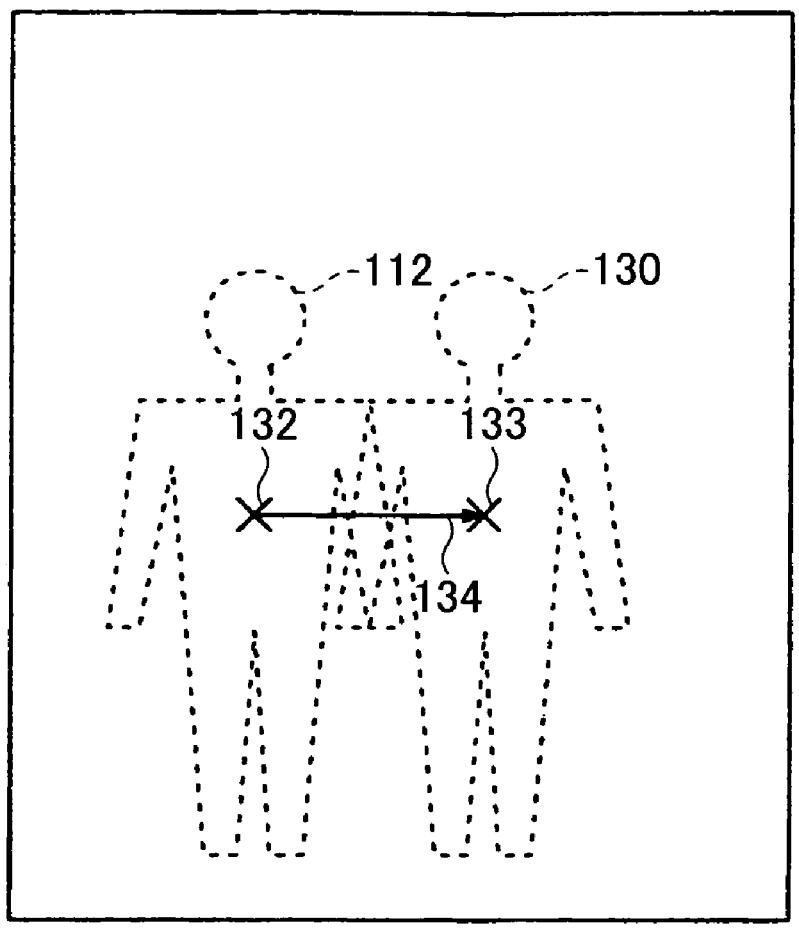
FIG. 25 is an explanatory diagram illustrating a direction for reducing overlap between the object regions.

FIG. 25 is an example in which the direction toward which the distance between the centers of gravities becomes the longest is calculated in the state of overlap of FIG. 12. The direction toward which the distance between (i) a center of gravity 132 of the first object region 112 and (ii) a center of gravity 133 of the second object region 130 becomes the longest is the direction indicated by an arrow 134, which extends from the center of gravity 132 to the center of gravity 133.

In S8D-4, the overlap prevention method notifying means 12 notifies the direction calculated in S8D-3, as a prevention method for reducing the overlap, to the user and/or the object. Then, the processing jumps to P80.

Figure 26:
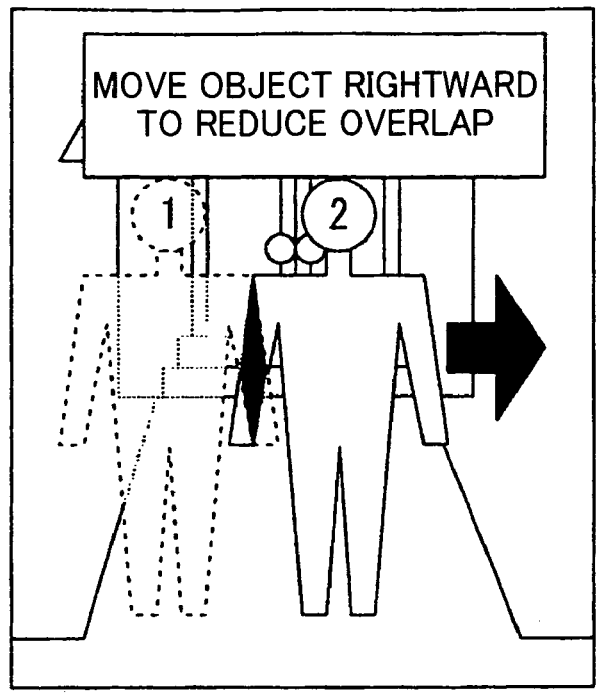
FIG. 26(a) is an explanatory diagram illustrating an example where a direction for reducing overlap is notified when there is overlap between the object regions.
FIG. 26(b) is an explanatory diagram illustrating an example where a position and a direction for reducing overlap is notified when there is overlap between the object regions.
Figure 26:
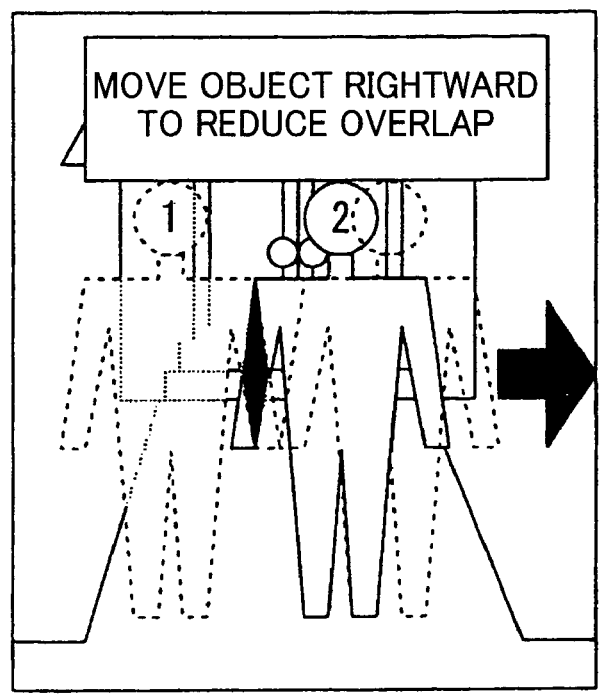

FIG. 26(a) is an explanatory diagram illustrating the monitor 141 notifying a prevention method. Since it has been calculated in S8D-3 that the overlap will be reduced if the second object moves rightward as shown in FIG. 25, an arrow indicating that the second object should move rightward is displayed over the composite image. It is preferable if this arrow is also displayed with color, blink, or the like so as to attract attention, like the overlap portion described above.

If what is displayed is only the state of overlap, it is not easy to judge immediately which direction the object should move. On the other hand, if the direction to which the object should move is indicated by the arrow, there is an advantage that it becomes very easy to judge which direction the object should move.

Based on the directional vector calculated in S8D-3, an angle θd of the arrow is calculated as follows:

θd= arctan((Yg2−Yg1)/(Xg2−Xg1), (0≠Xg2−Xg1)

θd=−π/2, (0=Xg2−Xg1, 0≦Yg2−Yg1)

θd=−π/2, (0=Xg2−Xg1, 0>Yg2−Yg1)

Since what is important about the arrow displayed here is its direction, the magnitude of the vector calculated in S8D-3 may be ignored. However, the length of the displayed arrow may have some meaning. For example, if the area of the overlap between the objects is known, the length and/or thickness of the arrow may be proportional to the area. Since the arrow becomes longer (or thicker) as the area of overlap becomes larger, the degree of overlap can be recognized intuitively. Moreover, there is an effect that the photographer tends to feel compelled to reduce the overlap when the arrow is large.

The direction calculated in S8D-3 can be any direction. However, since it is not necessary to instruct the direction of movement of the object with such high precision, the direction closest to the calculated θd may be chosen from four directions of up, down, right, and left, or from eight directions further including oblique directions, for example.

If the direction of movement is chosen from the four or eight directions, the direction can be notified easily by words. Therefore, such message as "MOVE OBJECT RIGHTWARD TO PREVENT OVERLAP", as shown in the upper part of FIG. 26(a), may be delivered. The message may also be delivered through a speaker.

Instead of the arrow or the message, a lamp may be used to notify the direction of movement. In this case, a plurality of lamps might be required, so that the four directions of up, down, right, and left, or the eight directions can be indicated. For example, direction lamps may be provided to surround the monitor 141.

This notification may be addressed not only to the photographer, but also to the object, like the notification of the state of overlap and the like. The effect is the same as the effect described above.

Although the centers of gravity of the objects are used in this example, there are various other ways. In one method, for example, the pixel value of an object region is projected onto the X-axis and Y-axis, so as to determine approximately where the object region is positioned on the X-axis and Y-axis. Since the center of gravity and the scope of overlap can be calculated based on the result of projection, it is possible to calculate which direction, out of up, down, right, and left, the object should move. By combining the up and down directions and the right and left directions, it is also possible to calculate oblique directions of movement.

By the processing in S8-1 to S8D-4, the processing on overlap in S8 of FIG. 5 can be performed.

Figure 27:
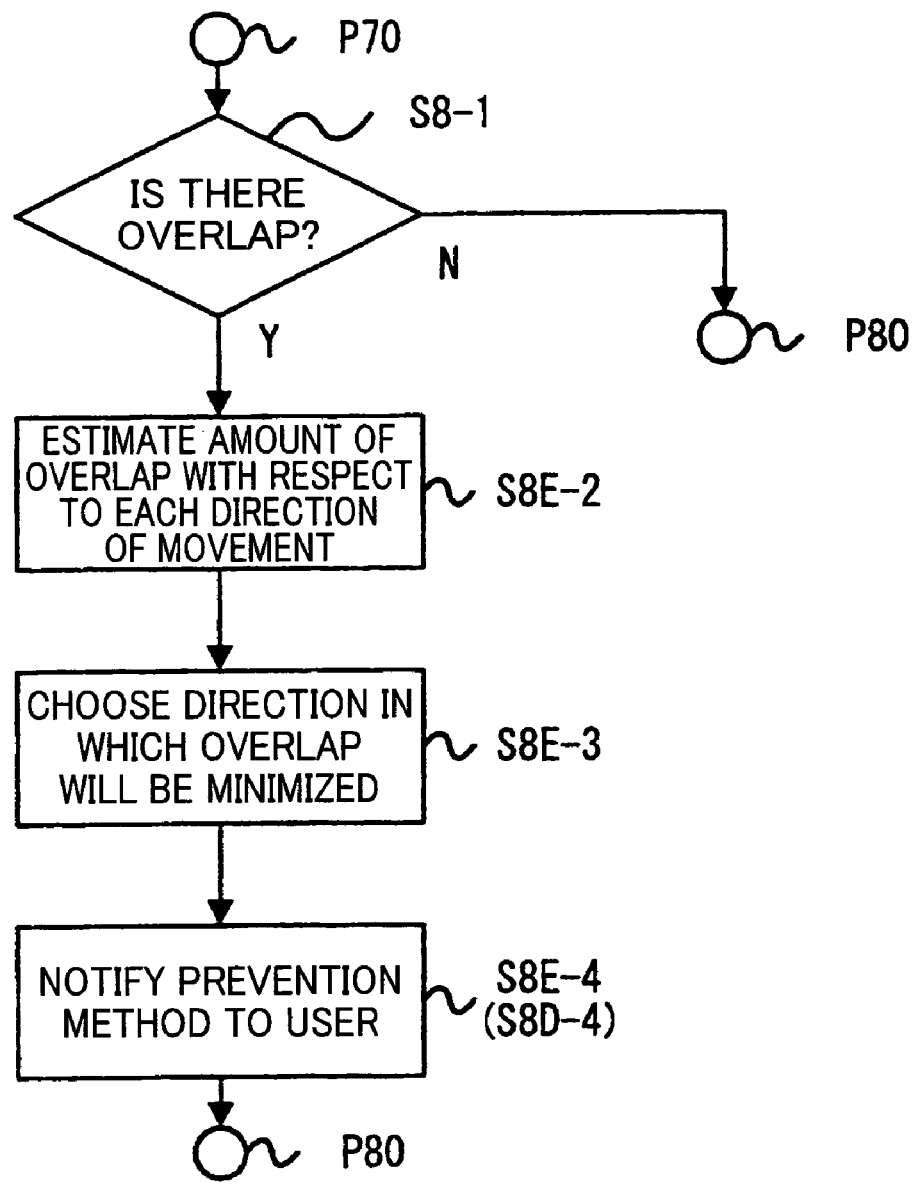
FIG. 27 is a flowchart illustrating a processing method for notifying a position for reducing overlap when there is overlap between the object regions.

FIG. 27 is a flowchart illustrating further another method for performing the processing in S8 of FIG. 5, that is, the processing on overlap.

In S8-1, which is performed after P70, the overlap prevention method calculating means 11 judges whether or not there is overlap, based on the information on overlap obtained from the overlap detecting means 8 (S7). If there is overlap, the processing proceeds to S8E-2. If there is no overlap, the processing jumps to P80.

In S8E-2, the overlap prevention method calculating means 11 predicts, with respect to each direction, an amount of overlap that will remain after the second object is moved in the direction. Then, the processing proceeds to S8E-3.

First, the current situation is the first object region 112 and the second object region 130 of FIG. 12. The overlap region is the region 131. From this situation, the second object region 130 is moved up, down, right, or left by a predetermined amount.

Figure 28:
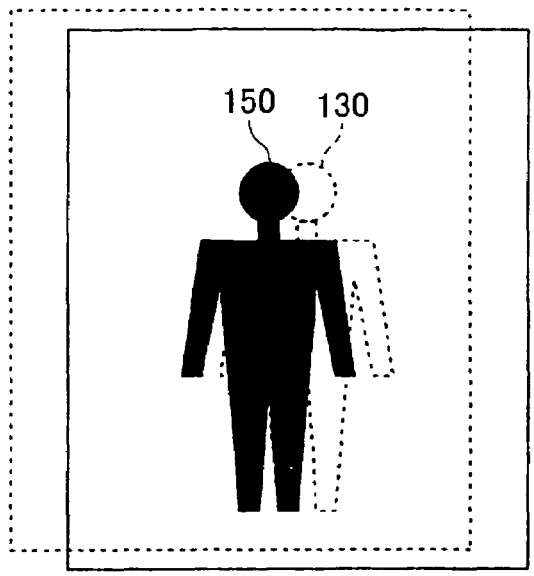
FIGS. 28(a) to 28(d) are explanatory diagrams illustrating examples where the second object region is moved leftward, rightward, upward, and downward, respectively.
Figure 28:
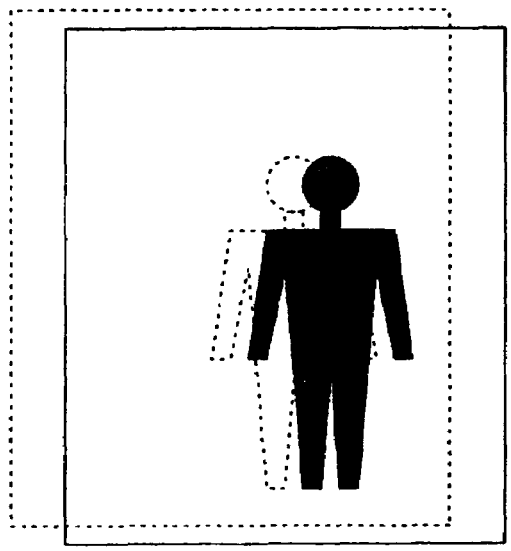
Figure 28:
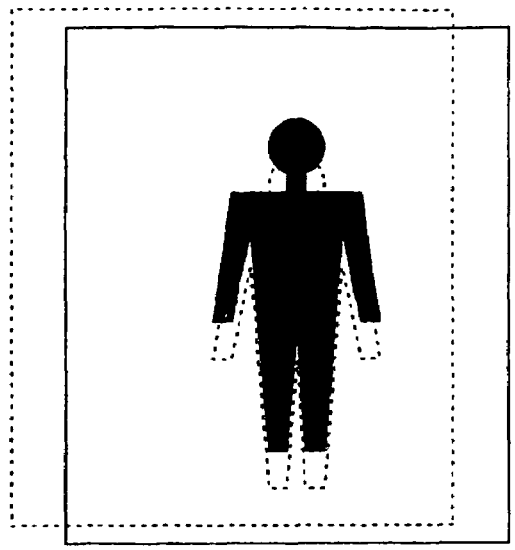
Figure 28:
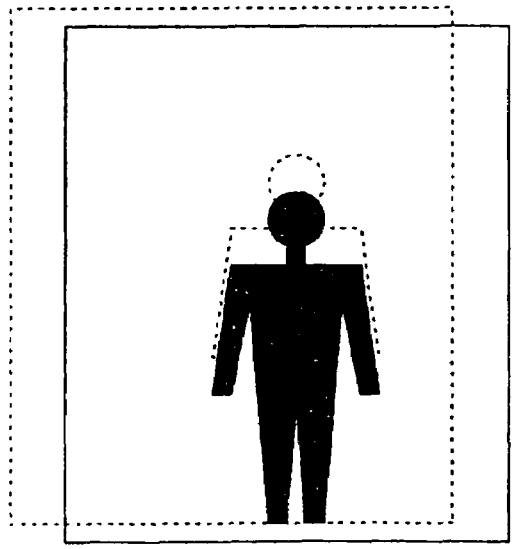

FIG. 28(a) is a diagram illustrating a situation where the second object region 130, which is indicated by the dotted line, is moved to a blackened region 150. Likewise, FIG. 28(b) is a diagram illustrating a situation where the second object region 130 is moved rightward, and FIG. 28(d) is a diagram illustrating a situation where the second object region 130 is moved downward.

FIGS. 29(a) to 29(d) each illustrates overlap image obtained by identifying the overlap between the second object region that has been moved and the first object region. The region of overlap is blackened. The second object region that has been moved and the first object region are indicated by dotted lines.

Figure 29:
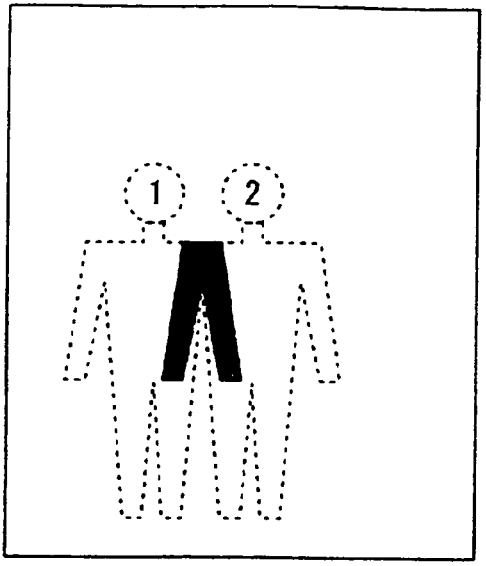
FIGS. 29(a) to 29(d) are explanatory diagrams illustrating an overlap region between the first object region of FIG. 9(d) and each second object region of FIGS. 28(a) to 28(d).
Figure 29:
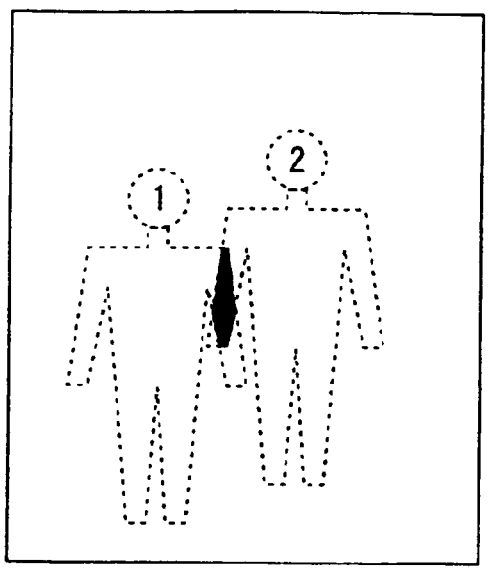
Figure 29:
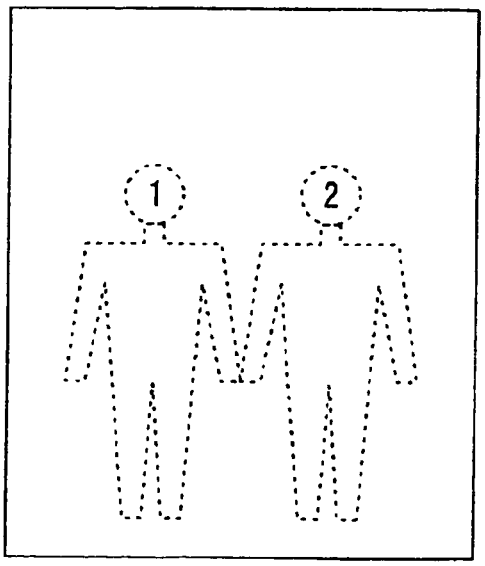
Figure 29:
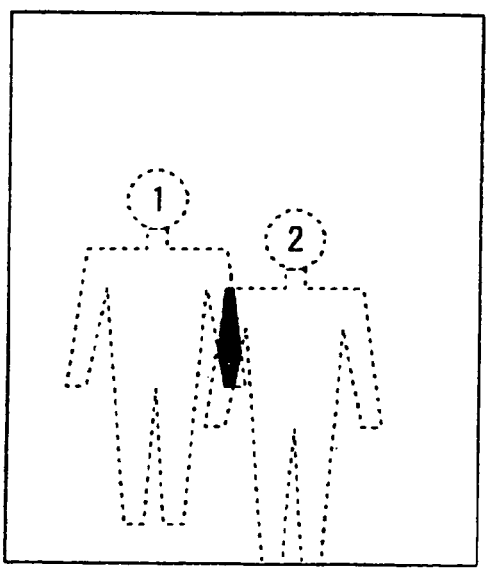

The overlap region in FIG. 29(a) is larger than the overlap region in FIG. 12. FIG. 29(b) has no overlap region. The overlap regions of FIGS. 29(c) and 29(d) are as large as the overlap region 131 of FIG. 12.

In this embodiment, the amount of overlap is predicted with respect to the four directions. However, the amount of overlap may be predicted with respect to more than four directions, considering the required precision and amount of processing. Moreover, although the amount of movement is set to a predetermined value in the present embodiment, plural values may be used with respect to each direction, in calculating the amount of overlap.

In S8E-3, the overlap prevention method calculating means 11 extracts the direction of movement that will make the amount of overlap the smallest, based on the prediction obtained in S8E-2 on the amount of overlap with respect to each direction of movement. Then, the processing proceeds to S8E-4.

If the amount of overlap is calculated with respect to various values of the amount of movement in each direction by the method employed in S8E-2, the direction or position that will make the amount of overlap the smallest may be chosen by considering the various values separately, by comparing the sum of the amounts of overlap in each direction, or by comparing an average amount of overlap in each direction.

Among FIGS. 29(a) to 29(d), FIG. 29(b) has the smallest overlap. Therefore, it is expected that the overlap will become the smallest if the second object is moved rightward (among the four directions).

In S8E-4, the overlap prevention method notifying means 12 notifies the direction determined in S8E-3 to the user and/or the object, as a prevention method for reducing the overlap. Then, the processing proceeds to P80.

Methods for the processing and notification performed here are almost the same as those employed in S8D-4. For example, the notification is made as shown in FIG. 26(a).

The difference between S8E-4 and S8D-4 is as follows. In the processing in S8D-2 to S8D-4, only the direction is determined. On the other hand, in the processing in S8E-2 to S8E-4, not only the direction but also the amount of movement can be indicated, because the direction is determined by hypothetically moving the second object to a destination. The amount of movement may be displayed, for example, by locating the start point of the arrow (which indicates the direction of movement) at the current position of the second object, and locating the end point of the arrow at a position where the overlap becomes the smallest with minimum amount of movement. This arrangement has an effect that how far the second object should move is clearly shown.

In addition to the arrow, the destination of the object may be indicated directly. FIG. 26(b) is an example in which the destination of the object at which the overlap disappears with minimum amount of movement is indicated. The second object at the destination is indicated by a dotted line.

By the processing in S8-1 to S8E-4, the processing on overlap in S8 of FIG. 5 can be performed.

The processing in S21 to S27 are not mutually exclusive; the processing may be combined arbitrarily. Such combination may be made in the following scene, for example.

If the objects are overlapping, a warning ("OVERLAPPING!") is made. At this time, no image is recorded even if the shutter button is pressed. Along with the warning, the direction to which the object should move is indicated as in FIG. 26(a). The object moves in the indicated direction. When the overlap disappears, a shutter release timing indicating lamp turns ON. If the shutter button is pressed while the shutter release timing indicating lamp is ON, an image is recorded.

Figure 30:
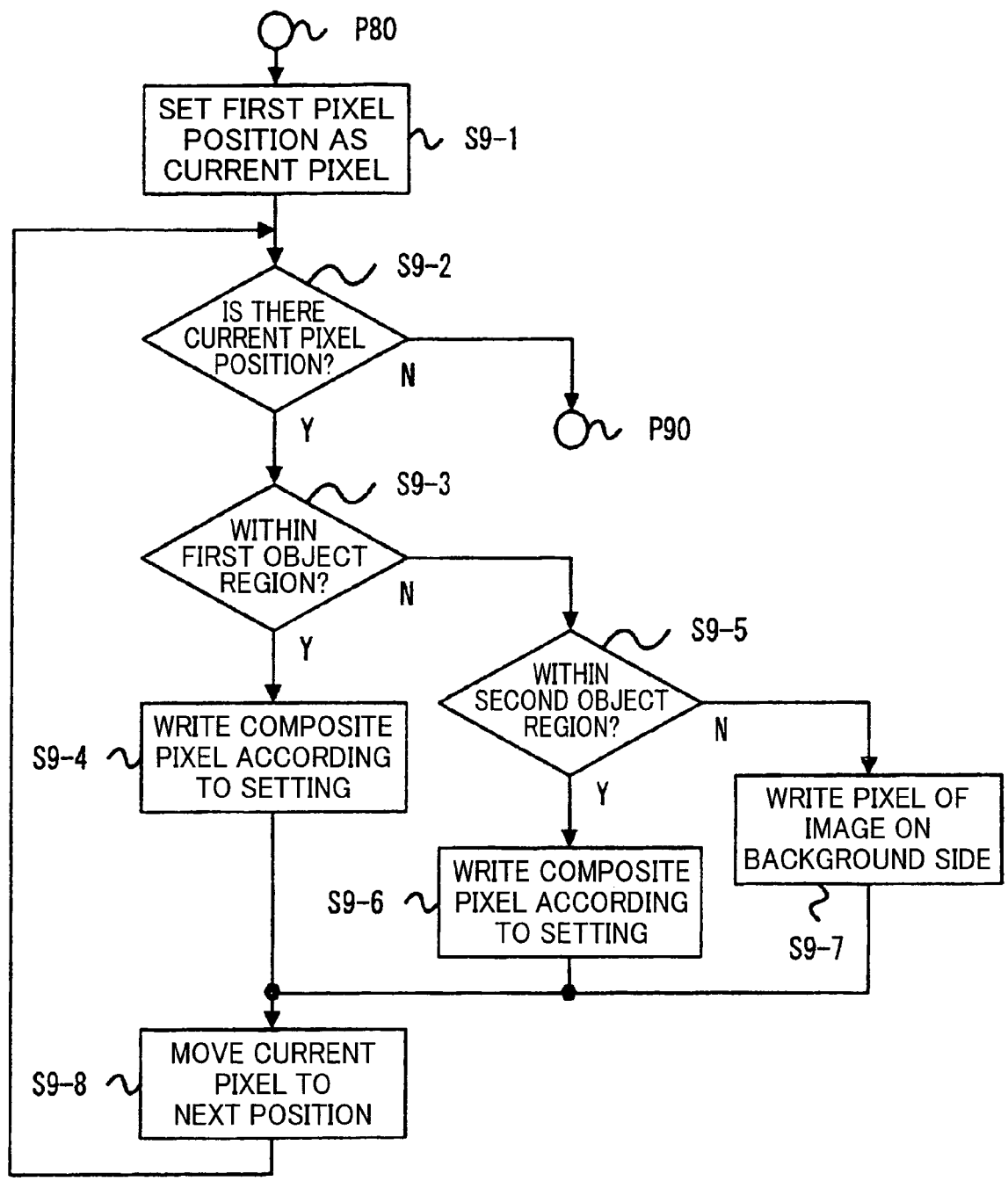
FIG. 30 is a flowchart illustrating a processing method for generating an overlap image.

Next, FIG. 30 is a flowchart illustrating a method for performing the processing in S9 of FIG. 5, that is, the processing for generating a superimposed image.

In S9-1, which is performed after P80, the superimposed image generating means 9 sets, to a current pixel, a first pixel position of the superimposed image to be generated. Then, the processing proceeds to S9-2. In many cases, the first pixel position is on the upper-left corner, for example.

A "pixel position" is a specific position on an image. In many cases, the pixel position is expressed by using X-Y coordinate system where the upper left corner is the origin, the rightward direction is the +X axis, and the downward direction is the +Y axis. The pixel position corresponds to an address on a memory storing image information. The pixel value is a value of the memory of the address.

In S9-2, the superimposed image generating means 9 judges whether or not there is any current pixel position. If there is any current pixel position, the processing proceeds to S9-3. If there is no current pixel position, the processing jumps to P90.

In S9-3, the superimposed image generating means 9 judges whether or not the current pixel position is within the first object region. If the current pixel position is within the first object region, the processing proceeds to S9-4. If not, the processing proceeds to S9-5.

Whether or not the current pixel position is within the first object region can be judged in accordance with whether or not the pixel value of the current pixel position on the first object image obtained from the object region extracting means 7 (S6) is black (zero).

In the case where the same processing is performed regardless of whether or not the current pixel position is within the first object region, the processing may proceed from S9-2 to S9-5, without performing S9-3 and S9-4.

In S9-4, the superimposed image generating means 9 calculates the pixel value according to a setting, and writes the pixel value as a pixel value of the current pixel position of the superimposed image.

The setting is about what kind of superimposed image is to be generated (e.g. whether the first object is to be combined in a translucent state as in FIG. 11(b), or the first object is to be combined by direct overwriting as in FIG. 11(a)).

If the first object is to be combined in a translucent state, a pixel value P1 of the current pixel position of the first object image and a pixel value Pb of the current pixel position of the corrected background image obtained from the corrected image generating means 5 (S5) are obtained, and a combined pixel value (P1×A+Pb×(1−A)), where A is a predetermined transmittance (between 0.0 and 1.0), is calculated. If the first object is to be combined by direct overwriting, P1 can be written directly, with the transmittance A being 1.0.

In S9-5, if the superimposed image generating means 9 has judged in S9-3 that the current pixel position is not within the first object region, the superimposed image generating means 9 subsequently judges whether or not the current pixel position is within the second object region. If the current pixel position is within the second object region, the processing proceeds to S9-6. If not, the processing proceeds to S9-7. The processing performed here is identical to the processing in S9-3, except that the first object region is replaced by the second object region.

In S9-6, the superimposed image generating means 9 generates a composite pixel according to the setting, and writes the pixel value of the composite pixel as a pixel value of the current pixel position of the superimposed image. The processing performed here is identical to the processing in S9-4, except that the first object region (image) is replaced by the second object region (image).

In S9-7, if the superimposed image generating means 9 has judged in S9-5 that the current pixel position is not within the second object region, the superimposed image generating means 9 writes the pixel value of the current pixel position of the first object image as the pixel value of the current pixel position of the superimposed image. Since the current pixel position in this case is neither within the first object region nor within the second object region, the current pixel position is in the background portion.

In the present embodiment, the image of the background portion is obtained from the first object image. However, the image of the background portion may be obtained from the corrected background image. It is more advantageous to use the first object image than to use the corrected background image, in that the boundary between the first object region and the background portion looks more natural. Moreover, if the boundary looks natural, there is an effect that errors are less recognizable even if the first object region and/or the second object region is extracted imprecisely in S6.

In S9-8, the superimposed image generating means 9 sets the current pixel position to the next pixel position. Then, the processing turns back to S9-2.

By the processing in S9-1 to S9-8, the processing in S9 of FIG. 5 for generating a superimposed image can be performed.

According to the processing above, the first object image and the corrected background image are processed in S9-4 and S9-7, respectively. As an alternative, before performing S9-1, all pixels of the first object image or the corrected background image may be copied into the superimposed image that is to be generated. Then, only the first object region and/or the second object region may be processed through the processing for each pixel position. The processing procedure is simpler if all the pixels are copied, although the processing time might increase slightly.

Even if the first object region and the second object region overlap, generation of the superimposed image may be permitted. In this case, the processing becomes simpler if S7 and S8 in the flowchart of FIG. 5 are omitted. As described above, the processing for highlighting the overlap region and/or the processing for warning that there is overlap may be executed.

What is important about the image combination method of the present invention is that the first object region and the second object region can be extracted independently. This makes it possible to determine which one of the first object and the second object should be given priority in combining them in the case where a superimposed image in which the first object region and the second object region overlap is to be generated.

Figure 31:
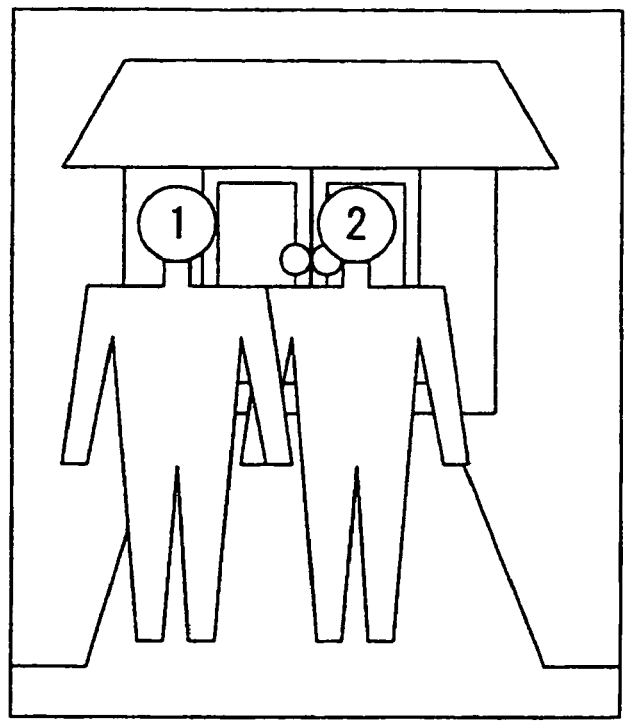
FIG. 31 is an explanatory diagram illustrating a display example where priority is given to the first object in generating the superimposed image.

For example, if the superimposed image generating means 9 is so set as to give priority to the first object, as shown in FIG. 31, the superimposed image is generated so that the first object (person (1)) comes in front of the second object (person (2)) in the overlap region where the first object and the second object overlap. According to the flowchart of FIG. 30, in S9-4, the superimposed image generating means 9 writes the pixel value P1 of the first object image into the current pixel position, with the transmittance A (i.e. combination ratio) being 1.0 (100%).

Figure 32:
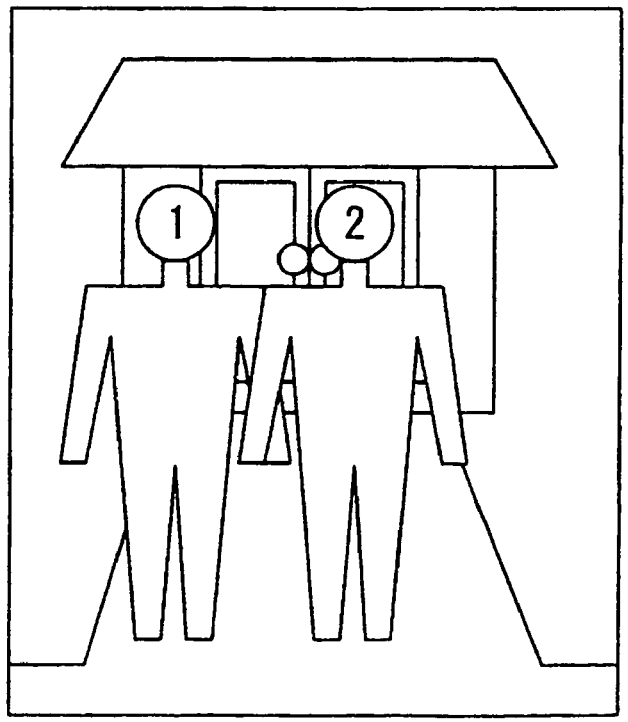
FIG. 32 is an explanatory diagram illustrating a display example where priority is given to the second object in generating the superimposed image.

On the other hand, if the superimposed image generating means 9 is so set as to give priority to the second object, as shown in FIG. 32, the superimposed image is generated so that the first object (person (1)) comes behind the second object (person (2)) in the overlap region where the first object and the second object overlap. This can be realized easily by replacing the processing in S9-3 with the processing of S9-5 in the flowchart of FIG. 30.

In this case, the superimposed image generating means 9 first judges whether or not the current pixel position is within the second object region. If the current object region is within the second object region, the superimposed image generating means 9 write the pixel value of the second object image into the current pixel position, with the combination ratio of the second object image being 1.0, as in the case above.

Such a processing cannot be performed by simply combining the first object image and the second object image without using the background image. If the first object image and the second object image are used alone, the first object region and the second object region cannot be extracted independently. As a result, the first object region and the second object region can only be extracted as a single integrated region.

Although the composite image has the same size as the standard image here, the composite image may be larger or smaller than the standard image. For example, in generating the corrected images of FIG. 6(*c*) and FIG. 8(*c*), the original images are partially cut off. If the original images are not cut off (in this case, the corrected images become larger), the uncut portions can also be combined, thereby obtaining a larger background, hence a larger composite image. As a result, there is an effect that a so-called panoramic image can be generated.

For example, if the first object image and the background image have a common background portion, the second object image and the background image have a common background portion, but the first object image and the second object image have no background portion in common, there might be no background between the first object and the second object in the composite image. If the background image is used, there is an effect that it is possible to generate a composite image in which the portion where there is no background portion in common is filled. In this case, the first object image, the background image, and the second object image are connected in this order, thereby constituting a long composite image (as a result of the processing of the present invention, the first object image and the second object image do not overlap in the composite image).

Figure 11:
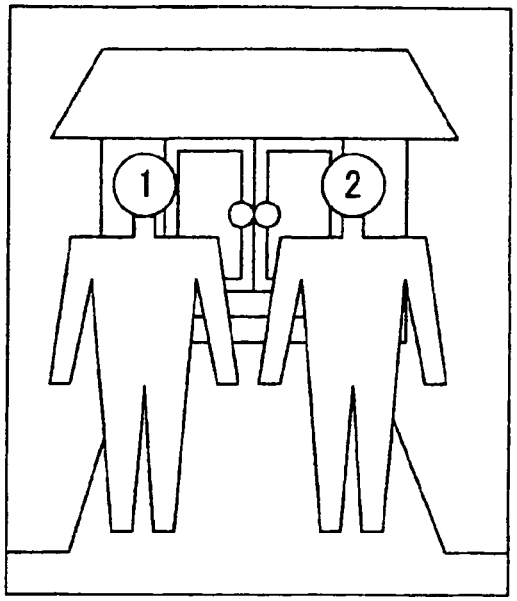
FIG. 11(a) is an explanatory diagram illustrating an example of a superimposed image generated by combining the first object region of FIG. 9(d), a second object region of FIG. 10(d), and a background portion.
FIG. 11(b) is an explanatory diagram illustrating an example of a superimposed image where the first object region is translucent.
FIG. 11(c) is an example of a superimposed image where the second object region is translucent.
Figure 11:
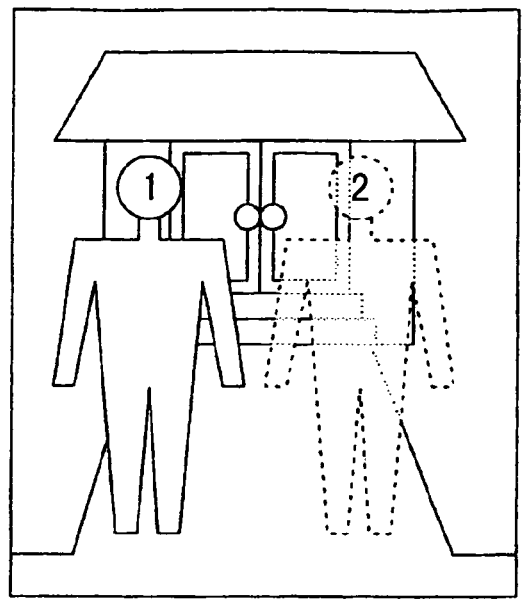
Figure 11:
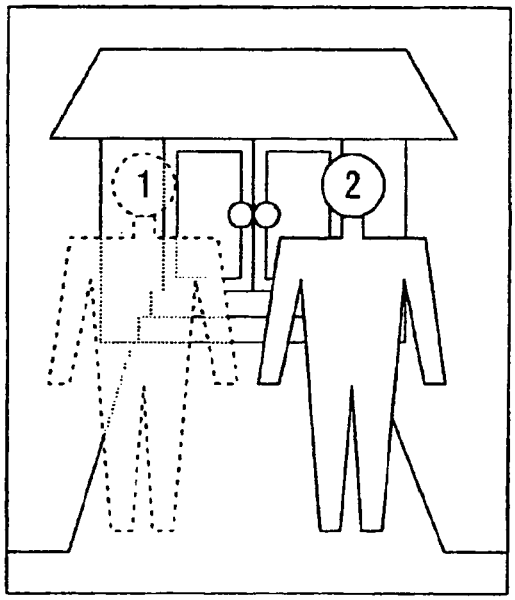

FIG. 11(*b*) is a superimposed image in which the first object region alone is combined as a translucent image. FIG. 11(*c*) is a superimposed image in which the second object region alone is combined as a translucent image. FIG. 11(*a*) is a superimposed image generated by overwriting the first object region and the second object region without making them translucent. Although not shown in the figures, both the first object region and the second object region may be combined as translucent images.

Which combination method to adopt depends on the purpose of combination. Therefore, it is preferable that the user can choose a combination method suitable for the purpose.

For example, at the stage of photographing the second object image without overlap after the background image and the first object image are photographed/recorded, no detailed image of the first object image is required, as long as an approximate position of the first object image can be seen so as to know whether or not there is overlap. Therefore, the first object may be combined as a translucent image. It is preferable to combine the second object image by overwriting, without making it translucent. This is because the shutter cannot be released at the right timing without knowing the facial expression of the second object image at the time of photographing. Thus, the combination method as shown in FIG. 11(*b*) is suitable.

For a user who prefers photographing an image while viewing the object region to be combined, it might be better to make both regions translucent during photographing, or to make only the second object translucent.

If the final composite image is to be generated by combining the background image, the first object image, and the second object image after the second object is photographed/recorded, both the first object image and the second object image need to be combined by overwriting, because it would be troublesome if the objects were translucent. Therefore, the combination method as shown in FIG. 11(a) is suitable.

If the object regions obtained from the object region acquiring means 7 (S6) have already been expanded, not only the objects but also the background portions surrounding the objects are combined. However, since the background portions have already been corrected by the corrected image generating means 5 (S5) so as to correspond to each other, there is an effect that, even if the extracted object regions are slightly larger than the actual object regions (regions within outlines of objects), and include the background portions, the boundary between the combined images does not look unnatural.

If the object regions are expanded, transparency may be changed gradually in the vicinity of the boundary between the combined images including outside the object regions or in the vicinity of the boundary between the combined images within the object regions, so that the boundary between the combined images looks more natural. In this case, for example, the ratio of the images of the background portions is increased toward outside the object regions, and the ratio of the images of the object regions is increased toward inside the object regions.

This arrangement has an effect that, even if the backgrounds are slightly inconsistent due to correction errors in the vicinity of the boundary between the combined images, it is possible to make the inconsistency less visible. Likewise, even if the object regions are extracted imprecisely, or even if the image of the background portion changes (for example, because trees shudder in the breeze, because it becomes cloudy, or because a stranger passes by) due to time lag of photographing, it is possible to make the inconsistency less visible.

As a matter of course, the object of the present invention can also be attained by supplying, to a system or device, a recording medium recording a program code of a software that realizes the functions described in the foregoing embodiment, and causing a computer (CPU) of the system or device to read and execute the program code recorded in the recording medium.

In this case, the functions described in the foregoing embodiment are realized by the program code itself that is read out of the recording medium. The recording medium storing the program code constitutes the present invention.

The recording medium for supplying the program code may be, for example, a flexible disk, a hard disk, an optical disk, a magnetooptical disk, an electromagnetic tape, a non-volatile memory card, and the like.

The program code may be downloaded from another computer system to the main memory 74 or the external memory 75 of the image combination device via a transmission medium such as a communication network.

As a matter of course, the functions described in the foregoing embodiment may be realized not only by executing the program code read out by the computer, but also by performing part or all of actual processing in accordance with the instruction of the program code by using an OS (operating system) activated on the computer.

Moreover, as a matter of course, the functions described in the foregoing embodiment may be realized, after the program code read out of the recording medium is written into a memory provided to (i) an extension board inserted into the computer or (ii) an extension unit connected to the computer, by performing part or all of actual processing in accordance with the instruction of the program code by using a CPU or the like provided to the extension board or the extension unit.

In the case where the present invention is applied to the recording medium, the recording medium stores a program code corresponding to the flowchart described above.

Without limitation to the embodiment described above, the present invention may be varied in many ways within the scope of the claims.

As described above, a first image combination device of the present invention includes: amount of background correction calculating means for calculating an amount of background correction or reading out the amount of background correction after the amount of background correction is calculated and recorded, the background correction being performed among (i) a background image, which is an image of a background, (ii) a first object image, which includes at least a part of the background and a first object, and (iii) a second object image, which includes at least a part of the background and a second object, the amount of background correction being one or a combination of relative amounts including an amount of movement, an amount of rotation, a rate of expansion or reduction, and an amount of distortion correction, with respect to a background; and superimposed image generating means for generating a superimposed image by using one of the background image, the first object image, and the second object image as a standard image, correcting the other two images by the amount of correction obtained from the amount of background correction calculating means, the other two images being corrected so that backgrounds, other than objects, of the other two images correspond to the standard image at least partially, and superimposing the standard image and one or both of the other two images.

According to this arrangement, the gap between backgrounds of two images can be adjusted before combining the two images. Therefore, those portions other than apparently different regions (e.g. objects), that is, the background portions, matches each other in the composite image, regardless of the combination method. As a result, there is an effect that the resultant composite image does not look unnatural. For example, suppose that, principally, only the object regions are to be combined. Even if the object regions are extracted or specified imprecisely, inside and outside of the uncorrected region are combined as a continual scene, because the background portions respectively surrounding the object regions match the background of the composite image. As a result, there is an effect that the composite image looks less unnatural.

According to the prior art method, even if the object regions are extracted precisely on a pixel by pixel basis, the composite image looks unnatural at such a level finer than one pixel, as described in the section of problems to be solved. On the other hand, according to the present invention, the pixels surrounding the pixels of the outlines are at the same positions of the background portions, because the images are combined after adjusting the background portions. As a result, the pixels surrounding the pixels of the outlines matches the background image almost naturally. Thus, there is an effect that it is possible to prevent, or reduce, the unnatural look at such a level finer than one pixel.

Moreover, because the gap between backgrounds is corrected before combining the images, it is not necessary to fix the camera or the like at the time of photographing the background image, the first object image, and the second object image, as long as the direction of the camera or the like is adjusted approximately by hand or the like. As a result, there is an effect that photographing becomes easier.

Moreover, even if there is no overlap between the first object image and the second object image, it is possible to calculate the amount of correction between the first object image and the second object image. Therefore, there is an effect that, even if the background between the background portion of the first object image and the background portion of the second object image is missing, it is possible, as long as the missing background portion is filled by the background of the background image, to combine the first object image and the second object image (background portions of which do not overlap) so that their backgrounds are connected to each other.

Moreover, in generating a superimposed image, the first object and the second object may be combined on a background generated by picking up necessary background portions from the background image, the first object image, and the second object image, and connecting the background portions so that they supplement missing portions of each other.

The first image combination device of the present invention may further include image pickup means for picking up an image of an object or a scene, the background image, the first object image, or the second object image being generated based on an output of the image pickup means.

According to this arrangement, since the image combination device, which generates the superimposed image, includes the image pickup means, the superimposed image can be generated immediately after an object and/or a scene is photographed by the user. This improves usability for the user. There is also an effect that, if there is any problem, e.g. overlap between the objects, about the superimposed image generated, it is possible to photograph the object(s) again immediately.

The images obtained from the image pickup means is usually recorded into the main memory or external memory which may or may not be provided inside the image combination device. By using a shutter button or the like, the user instructs the timing for recording. The recorded images are used for the combination processing, as the background image, the first object image, and the second object image.

The first image combination device of the present invention may be arranged so that one of the first object image and the second object image that is photographed earlier than the other is used as the standard image.

According to this arrangement, for example, if the first object image and the second object image are photographed in this order, the first object image is used as the standard image. The background image may be photographed in any order. By using the first object image as the standard image, the background image and the second object image are corrected. At this time, the amount of background correction calculating means calculates the amounts of correction, e.g. amounts of movement of the background portions, between (i) the first object image (reference image) and the background image and (ii) the background image and the second object image.

The superimposed image generating means performs correction by the amounts of correction, and generates the composite image by using the three images of the first object image (standard image), the corrected background image, and the corrected second object image.

If photographing is to be performed again at this time for reasons such as overlap between the objects, only the second object image is photographed again. Then, the composite image is generated again at this time, it is not necessary to generate the first object image (standard image) and the corrected background image again. Therefore, the first object image (standard image) and the corrected background image may be used as they are in the composite image generated first. Since the second object image has been replaced, the second object image is corrected by using the first object image as the standard image. In this way, a new corrected second object image is generated. By using the three images of the first object image (standard image), the corrected background image, and the newly corrected second object image, a composite image is generated.

To repeat photographing, the processing above is repeated. If the second object image, which is photographed after the first object image is photographed, is used as the standard image, the images to be combined are the three images of the corrected first object image, the corrected background image, and the second object image (standard image). If the second object image is photographed again, the standard image changes. In this case, the correction processing must be performed all over again. Specifically, a corrected first object image and a corrected background image must be generated again.

By thus using, as the standard image, the first object image or the second object image that is photographed earlier than the other, there is an effect that the processing amount and processing time can be reduced in the case where images are photographed again and again.

In combining the first object and the second object, it is more advantageous to place the image of the second object region on the first object image (or the opposite) than to place the first and second object regions on the background image used as the standard image. This arrangement has an effect that it is possible to reduce the area to be combined, thereby reducing the processing amount and processing time.

In this case, there is also an effect that, since the area to be combined becomes smaller, it is possible to reduce the possibility that the resultant composite image looks unnatural. The resultant composite image looks unnatural when, for example, an object region is smaller than the actual outline of the object, because this generates a missing portion in the combined object, or makes the outline look unnatural.

The first image combination device of the present invention may be arranged so that the background image is photographed immediately before or immediately after the standard image is photographed.

According to this arrangement, if, for example, the background image, the first object image, and the second object image are photographed in this order, or the first object image, the background image, and the second object image are photographed in this order, the first object image is used as the standard image. In this way, even if the second object image is to be photographed again for a reason such as overlap between the objects, the second object is likely to be still there. Therefore, the second object can be easily photographed again after a fine adjustment is performed by moving the second object or the second object.

On the other hand, if the first object image, the second object image, and the background image are photographed in this order (using the first object image as the standard image), the second object image is in front of the background at the time of photographing the second object image. However, in order to photograph the background image, the second object must be moved from in front of the background. If the second object image is to be photographed again for a reason such as overlap between the objects, there is a problem that the second object, which is already moved away, must be called back to stand in front of the background. There is also a problem that, even if it is known that the overlap will be resolved if the second object slightly moves rightward, the position of the second object at the time it was photographed cannot be found immediately, and therefore the position to which the second object should move cannot be found immediately, either.

Thus, there are effects that it is possible to reduce the labor of the object or the photographer to perform a fine adjustment at the time of photographing the object again, and that it becomes easy to photograph an image with fewer problems such as the overlap.

In addition to the effect that it becomes easier to photograph an image, there is also an effect concerning processing.

According to the image combination method of the present invention, all the three images are required, after all, to generate the composite image, regardless of the order of taking the background image. However, considering the processing for generating a composite image other than generating the corrected images, the processing procedure can be varied.

According to the order of the first example, as a processing other than correcting the background image before photographing the second object image, for example, a processing for extracting the region of the first object can be performed, as described later. The extracted regions are used for such purposes as combining images, detecting the overlap, and the like. Unless images are photographed at a very short interval, there is usually a certain interval after the second image is photographed before the third image (second object image) is photographed. Therefore, there is sufficient time to perform the processing above. When the third image (second object image) is photographed after the second image is photographed, the extracted region of the first object can be used immediately for such processing as combining the images, detecting overlap, and the like. As a result, there is an effect that it is possible to reduce the processing time required after the third image (second object image) is photographed. For the user, this is an effect that the response of the combination device becomes faster.

In the order of the latter example (in which the background image is photographed lastly), since the background image is not photographed yet, processing such as extracting the region of the first object cannot be performed immediately after the second image is photographed, until the second image is photographed. Therefore, long processing time is required after the third image is photographed.

The first image combination device of the present invention may be arranged so that the superimposed image generating means superimposes the standard image and the other one or two corrected images respectively at predetermined transmittances.

The "predetermined transmittance" may be a fixed value, a value that differs from region to region, or a value that gradually changes in the vicinity of a boundary between regions.

The superimposed image generating means determines a pixel position of the superimposed image, so as to obtain a pixel value of the pixel position on the standard image and a pixel value of the pixel position on another image. The sum of the two pixel values each multiplied by a predetermined transmittance is used as a pixel value of the superimposed image. This processing is performed with respect to all pixel positions of the superimposed image.

By changing the transmittance with respect to each pixel position, it is possible to increase the ratio of the standard image or the ratio of the corrected image from position to position.

For example, in superimposing only the object region of the corrected object image onto the standard image, the object region is superimposed as an opaque image (i.e. the object image in the corrected image is superimposed as it is), and the vicinity of the object region is superimposed so that the farther from the object region, the higher the ratio of the standard image. In this way, even if the outline of the extracted object is incorrect, the pixels in the vicinity of the outline gradually changes from the corrected image toward the standard image. As a result, there is an effect that errors become less visible.

Alternatively, if the composite image is displayed so that the object region alone is superimposed at a half transmittance, for example, there is an effect that it becomes easier to distinguish which portion of the displayed image is the portion already photographed (the portion to which a new image is to be combined) and which portion is the image of the object currently being photographed.

Usually, a human has an ability to distinguish between the background portion of an image and an object portion (outline) of the image by using common sense (image comprehension). This ability is generally effective even if the object region is superimposed and displayed at a half transmittance.

Therefore, by superimposing and displaying the object region at a half transmittance, even if a plurality of object regions are layered, it is possible to distinguish the object regions by using the ability. As a result, it is easy to judge whether or not the object regions overlap each other on the composite image.

It is not impossible to judge whether or not the first object image and the second object image overlap each other by comparing them when they are disposed side by side. In this case, however, it is necessary to distinguish the object region of each image by using the ability, and, considering the overlap between the background portions of the respective images, calculate in mind whether or not the distinguished object regions overlap each other. It is difficult to perform the series of operation precisely in mind alone, as compared to the method in which the object regions in the composite image are distinguished.

If a machine is used to perform positioning so that the background portions correspond to each other, there is created a situation in which it is easy to judge, by using the high image comprehension ability of human, whether or not the object regions overlap each other. By thus superimposing and displaying the object region at a half transmittance, there is an effect that it is easy to judge the position of the currently photographed object even if there is overlap between the objects.

If necessary, the arrangement described here may be combined arbitrarily with the arrangements described above.

The first image combination device of the present invention may be arranged so that the superimposed image generating means generates a difference image from the standard image and the other one or two corrected images, and a region in the difference image that has a difference is generated as an image having a pixel value that is different from an original pixel value.

The "difference image" is an image created by comparing pixel values at corresponding positions of two images, and using a value of the difference as a pixel value. In general, the value of the difference is an absolute value.

The "pixel value that is different from an original pixel value" is a pixel value that realizes, for example, (i) translucency by changing the transmittance, (ii) inverted display by inverting brightness/darkness, hue, or the like of the pixel value, and (iii) striking colors such as red, white, and black. The "pixel value that is different from an original pixel value" also includes such cases where (i) the a pixel value at a boundary between regions and a pixel value inside a region are different, (ii) the boundary is surrounded by dotted lines, or (iii) blink display (the pixel value is changed temporally) is performed.

According to this arrangement, a pixel value at one position of the standard image and a pixel value at a corresponding position of another (corrected) image are obtained, and if there is a difference between the pixel values, the pixel value of that pixel position of the superimposed image is set to a pixel value that is different from the pixel value of other regions. By performing this processing with respect to all pixels, it is possible to generate a difference portion as an image having a pixel value different from an original pixel value.

This arrangement has an effect that the user can easily judge which portions of two images do not correspond to each other. For example, the region of the first object (or the second object) in one of the standard image and the corrected image corresponds to an image of a background portion in the other of the standard image and the corrected image. Therefore, the regions of the first and second objects are extracted as difference regions of the difference image. The extracted regions may be translucent, may be displayed with inversion, or may have a pixel value of a striking color. This arrangement has an effect that the user can easily recognize the regions of the objects, and easily recognize the overlap between the objects, if any.

If necessary, the arrangement described here may be combined arbitrarily with the arrangements described above.

The first image combination device of the present invention may further include object region extracting means for extracting a region of the first object and a region of the second object from a difference image generated based on the standard image and the other one or two corrected images, the superimposed image generating means superimposing the standard image and the regions of the one or two corrected images obtained from the object region extracting means, instead of superimposing the standard image and the one or two corrected images.

This arrangement has an effect that the object regions in the corrected object images only can be combined onto the standard image or the corrected background image. Alternatively, it is possible to combine (i) only an object region in the standard image onto a corrected object image or a corrected background image, (ii) an object region in the standard image and an object region in a corrected object image onto a corrected background image, or (iii) object regions in corrected object images onto the background image as the standard image.

If an object region to be combined has a different transmittance, there is an effect that the user can easily distinguish the region, and the user can easily know whether or not the objects overlap each other. As a result, there is an effect of helping photography by helping the user to judge what should be done to resolve the overlap, for example.

By using the three images of the background image, the first object image, and the second object image, there is an effect that the region of the first object or the region of the second object can be extracted easily. Moreover, since the region of the first object and the region of the second object can be extracted separately, there is also an effect that it is possible to judge which object should be given preference if the objects overlap each other (specifically, it is possible to determine whether the first object should be placed in front of the second object or behind the second object at the overlap portion).

If necessary, the arrangement described here may be combined arbitrarily with the arrangements described above.

The first image combination device of the present invention may further include overlap detecting means for detecting overlap between the region of the first object and the region of the second object obtained from the object region extracting means.

According to this arrangement, since the region of the first object and the region of the second object are obtained from the object region extracting means, the overlap detecting means can examine whether or not a pixel position falls both within the region of the first object and within the region of the second object, and, if there is any pixel position that falls within both the regions, the overlap detecting means can judge that there is overlap.

The processing for making the judgment can be performed suitably by the following method, for example. Each region is generated as an image by the object region extracting means or by the overlap detecting means, and the pixel value of the pixels of each object region is set to a predetermined value. Then, the overlap detecting means judges, with respect to each pixel position, whether or not pixel values of the corresponding pixel positions on both images are equal to the predetermined value. In this way, it is possible to judge accurately whether or not there is overlap.

This method has an effect that the user can easily judge whether or not there is a portion where the objects overlap. As a result, as described above, there is an effect of helping photography by preventing overlap.

The first image combination device of the present invention may further include warning means for warning the user and/or the object that there is overlap, when overlap is detected by the overlap detecting means.

The "warning" includes warning by displaying letters and/or an image on display means or the like. Warning by any other method (e.g. light of a lamp or the like, sounds from a speaker or the like, vibrations of a vibrator or the like) is included, as long as the user and/or the object can sense the warning.

According to this arrangement, the overlap warning means performs warning operation when there is overlap between the objects. Therefore, it is possible to prevent the user from photographing/recording an image or combine images without noticing the overlap. There is also an effect of helping photography by immediately informing the object of the necessity of positional adjustment and the like.

The first image combination device of the present invention may further include shutter release timing notifying means for notifying the user and/or the object that there is no overlap, when no overlap is detected by the overlap detecting means.

Like the "warning", the "notification" includes notification by any method, as long as the user and/or the object can sense the notification.

According to this arrangement, the user can know when there is no overlap between the objects. Therefore, if images are photographed, recorded, and combined at that timing, there is an effect of helping photography in that the objects can be combined without overlap.

Moreover, since the right timing for releasing the shutter can be notified also to the object, there is an effect of helping photography in that the object can immediately prepare for being photographed by posing, looking in an appropriate direction, and the like.

The first image combination device of the present invention may further include image pickup means for picking up an image of an object or a scene; and automatic shutter releasing means for generating an instruction when no overlap is detected by the overlap detecting means, the instruction instructing that the image obtained from the image pickup means be recorded as the background image, the first object image, or the second object image.

According to this arrangement, the image is recorded as the background image, the first object image, or the second object image into the main memory or the external memory, for example. Therefore, the automatic shutter releasing means outputs an instruction for recording control processing to the main memory, the external memory, or the like, when a signal indicating that there is no overlap between the region of the first object and the region of the second object is inputted from the overlap detecting means.

Then, the amount of background correction calculating means and the superimposed image generating means read the image recorded in the main memory, the external memory, or the like. In this way, the background image, the first object image, and the second object image are obtained.

Even if the instruction is automatically made by the automatic shutter releasing means, the image may not always be recorded immediately. For example, the image may be recorded only when the shutter button is pressed at the same time, or when the device is in an automatic recording mode.

According to this arrangement, an image is photographed automatically when there is no overlap between the objects. Therefore, there is an effect of helping photography in that the user is not required to press the shutter button after judging whether or not there is overlap.

The first image combination device of the present invention may further include image pickup means for picking up an image of an object or a scene; and automatic shutter releasing means for generating an instruction when overlap is detected by the overlap detecting means, the instruction instructing that the image obtained from the image pickup means should not be recorded as the background image, the first object image, or the second object image.

According to this arrangement, the automatic shutter releasing means outputs an instruction when a signal indicating that there is overlap is obtained from the overlap detecting means, the instruction instructing that the image obtained from the image pickup means should not be recorded in the main memory, the external memory, or the like. As a result, the image obtained from the image pickup means will not be recorded even if the shutter button is pressed. This prohibition processing may be performed only when the device is in an automatic prohibition mode, for example.

Thus, since the image will not be photographed when there is overlap between the objects, the foregoing arrangement has an effect of helping photography in that it is possible to prevent the user from photographing/recording an image by mistake when there is overlap.

The first image combination device of the present invention may be arranged so that the overlap detecting means extracts an overlap region where the region of the first object and the region of the second object overlap.

According to this arrangement, when the overlap detecting means detects whether or not there is overlap, the overlap region can also be extracted by using the image described above, for example. Based on the extracted overlap region, it is possible to notify the overlap portion by means of display or the like.

Therefore, there is an effect that the user can easily recognize the overlap region. As a result, there is also an effect of helping photography in that it becomes easy to determine (i) the direction or position to which the camera or the object to be recorded should move, and (ii) the amount of movement.

Even if the background image is not used, it is possible to calculate an amount of background correction based on the first object image and the second object image, correct one of the first object image and the second object image, generate the difference image, and identify the difference region, as long as the background portions overlap by an appropriate amount. If there is no overlap between the region of the first object and the region of the second object, the difference region is identified as a first region and a second region that are independent from each other. On the other hand, if there is overlap, the first region and the second region are not independent from each other; they are extracted as an integrated, single region. It is therefore difficult to extract the overlap region from the first object region and the second object region only.

In contrast, if the background image is used, and, for example, the background image is used as the standard image, a difference image includes only one of the first region and the second region. The first region and the second region are extracted separately, not at the same time. Therefore, there is no problem in identifying the first region and the second region. Thus, it is possible to identify the overlap region.

By thus using the background image, there is an effect that the overlap region can be identified even if there is overlap between the objects.

The first image combination device of the present invention may be arranged so that the superimposed image generating means generates the superimposed image in such a manner that the overlap region extracted by the overlap detecting means has a pixel value that is different from an original pixel value of the overlap region.

According to this arrangement, in generating the superimposed image, the superimposed image generating means determines the pixel value of each pixel position in such a manner that, if a pixel position is in the overlap region obtained from the overlap detecting means (for example, if the overlap region is generated as a black image, this judgment can be made easily by judging whether or not the pixel value of the pixel position is black), the pixel value of the pixel position is different from the pixel value of a pixel position in other regions. In particular, it is preferable if the pixel value of the overlap region is such that (i) the border line of the overlap region or inside the overlap region is colored in a striking color, such as red, (ii) the border line blinks on the display, or (iii) the overlap region is translucent so that the background can be seen through the overlap region.

This arrangement has an effect of helping photography in that the user and/or the object can easily recognize the overlap region.

The first image combination device of the present invention may further include: overlap prevention method calculating means for calculating a position or a direction of the position of the first object or the second object when overlap is detected by the overlap detecting means, the position being a position at which the overlap is reduced; and overlap prevention method notifying means for notifying the user and/or the object of the position or the direction of the position of the first object or the second object, the position or the direction of the position being obtained from the overlap prevention method calculating means.

It has already been described that information on the region of the first object and the region of the second object is obtained from the object region extracting means, and the information on overlap is obtained from the information on these regions.

Therefore, by moving the object region from the position obtained from the object region extracting means to a different position, and detecting the amount of overlap by the overlap detecting means, it is possible to estimate the amount of overlap that will be caused if the object is moved to that position. The object region is moved to various positions, and the amount of overlap is estimated with respect to each position. The position or the direction that minimizes the overlap is notified to the user and/or the object.

To make the processing simpler, a direction of movement that will increase the distance between the objects may be calculated, because the overlap usually decreases when the distance between the objects becomes longer.

If the position or direction that will reduce the overlap is to be notified by a display, for example, an arrow or the like may be overwritten into the superimposed image after the processing for combining images are completed.

This arrangement has an effect of helping photography in that, when there is overlap, the user is not required to judge to what direction or position the camera or the object to be photographed should move.

The position or direction that will reduce the overlap may be calculated with respect to the first object, or may be calculated with respect to the second object. However, usually, the object that was photographed the first is no longer be in front of the camera; in front of the camera is the object that was photographed thereafter. Therefore, it is more convenient to calculate the position or direction with respect to the object that was photographed thereafter, because this allows the object to move immediately, in accordance with the result of calculation, to the direction that will reduce the overlap.

A first image combination method of the present invention includes: amount of background correction calculating step, in which an amount of background correction is calculated, or the amount of background correction is read out after the amount of background correction is calculated and recorded, the background correction being performed among (i) a background image, which is an image of a background, (ii) a first object image, which includes at least a part of the background and a first object, and (iii) a second object image, which includes at least a part of the background and a second object, the amount of background correction being one or a combination of relative amounts including an amount of movement, an amount of rotation, a rate of expansion or reduction, and an amount of distortion correction, with respect to a background; and superimposed image generating step, in which a superimposed image is generated by using one of the background image, the first object image, and the second object image as a standard image, correcting the other two images by the amount of correction obtained in the amount of background correction calculating step, the other two images being corrected so that backgrounds, other than objects, of the other two images correspond to the standard image at least partially, and superimposing the standard image and one or both of the other two images.

Various effects of this method are as described above.

A first image combination program of the present invention causes a computer to function as each means provided to the first image combination device.

A first image combination program of the present invention causes a computer to perform each step of the first image combination method.

A first recording medium of the present invention records the first image combination program.

According to the foregoing arrangements, it is possible to realize the image combination method by using a computer in which the image combination program is installed through the recording medium or a network. In other words, it is possible to cause the computer to function as the image combination device.

Embodiment 2

With reference to the drawings, the following describes another embodiment of the present invention. In EMBODIMENT 1, the background image is used in addition to the first object image and the second object image, and the background image does not include an object, but includes a background portion that corresponds to each object image at least partially. In EMBODIMENT 2, on the other hand, the background image is not used in combining images.

Again, definitions of terms are set forth below.

"First object" and "second object" are objects to be combined. In general, these objects are often persons, but they can be articles or the like. Strictly speaking, the "first object" is a region where pixel values do not correspond when a background image and a first object image are superimposed on each other so that at least a part of a background portion overlaps. In other words, any region where there is a change has a possibility to be a "first object region". However, "any region where there is a change" can include a minor change in the background portion caused by leaves waving in the breeze. It is therefore preferable to ignore minor changes and small regions. The same holds true with the "second object".

If the object is a person, the object is not necessarily a single person; a plurality of persons may collectively constitute the "first object" or the "second object". In other words, if a plurality of persons are handled collectively as a unit in combining images, the plurality of persons constitute a single "object".

This is also true when the object is an article, not a person. The object is not always a single region; a plurality of regions may constitute the object. The ordinals "first" and "second" are assigned merely for the purpose of distinguishing different frame images, and these ordinals have no such meaning as an order of shooting. Therefore, there is no fundamental difference between the "first object" and the "second object". For example, if a person has a cloth or an article, and these items do not appear on a "background-only image that does not include the first and second objects", these items are also included in the object.

The "first object image" and "second object image" are separate images respectively including the "first object" and the "second object". In general, these images are images of the respective objects taken separately by a camera or the like. However, if these images only include the objects, and do not include any background portions corresponding to each other, these images are not suitable for combination, because positioning cannot be performed based on the corresponding background portion. Therefore, it is necessary that at least a part (preferably a surrounding part of the object to be combined, so that a surrounding part of the combined object will look natural) of these images is a background portion corresponding to the background image. Usually, the first object image and the second object image are taken with the same background, that is, without moving the camera significantly.

"Background other than the first or second objects" is a portion that remains after the "first object" is removed from the first object image, or after the "second object" is removed from the second object image.

"Amount of movement", "amount of distortion correction", and "superimposed image generating means" are the same as those described in EMBODIMENT 1. Therefore, explanations of these terms are omitted.

"Pixel value", "density value", "luminance value", "transmittance", "opacity", "predetermined transmittance", "difference image", and "pixel value that is different from an original pixel value" are also the same as those described in EMBODIMENT 1. Therefore, explanations of these terms are omitted.

The "region of an object" is a region demarcated by a boundary which separates an object from the background. For example, if a person has a cloth or an article in the first object image, and these items do not appear in the second object image, these items are also included in the object region as an object. The object region is not always a continuous, single region; the object are may be divided into a plurality of regions.

"To superimpose only the region acquired from the object region extracting means" does not mean that no image is generated other than that region; it means that the other regions are filled with the standard image or the like.

A "characteristic" is a property, attribute, or the like of a region of an image. It is preferable if the characteristic can be expressed numerically as an amount of characteristic. Examples of the amount of characteristic are the pixel value of each color, the hue, saturation, and brightness of each color, and statistics values such as cooccurrence matrix, difference statistics value, run-length matrix, power spectrum, and secondary or higher order statistics value of these.

"Region of the first object or the second object" is a region of an object extracted from the difference image or the like. It may be unknown whether the region is the first object region or the second object region.

"Objects to be combined" are not objects obtained in the course of combination processing, but the objects that actually exist (in front of the camera). In other words, the "object to be combined" is the object that is going to be combined by the user to the standard image selected from the first object image and the second object image. Since, as described above, the unit of combination processing handled collectively is a single "object", the "object to be combined" can be a plurality of persons/items.

"Warning", "notification", and "frame" are also the same as those described in EMBODIMENT 1. Therefore, explanations for these terms are omitted.

Figure 33:
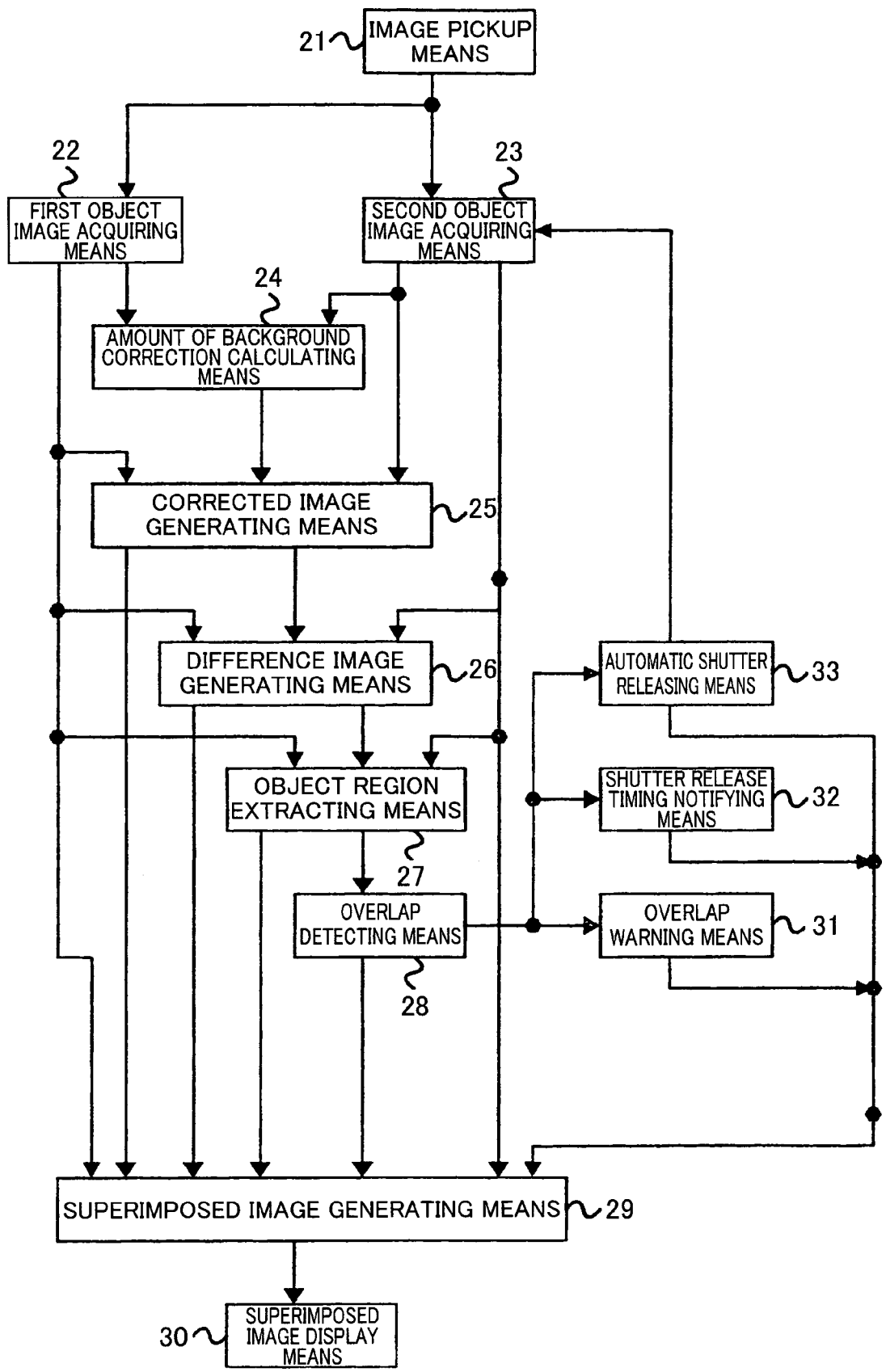
FIG. 33 is a block diagram illustrating a functional arrangement of a second image combination device of the present invention.

FIG. 33 is a diagram illustrating an arrangement of an image combination device for carrying out an image combination method in accordance with one embodiment of the present invention.

Major parts of the image combination device are the following functional blocks: image pickup means 21, first object image acquiring means 22, second object image acquiring means 23, amount of background correction calculating means 24, corrected image generating means 25, difference image generating means 26, object region extracting means 27, overlap detecting means 28, superimposed image generating means 29, superimposed image display means 30, overlap warning means 31, shutter release timing notifying means 32, and automatic shutter releasing means 33.

Figure 34:
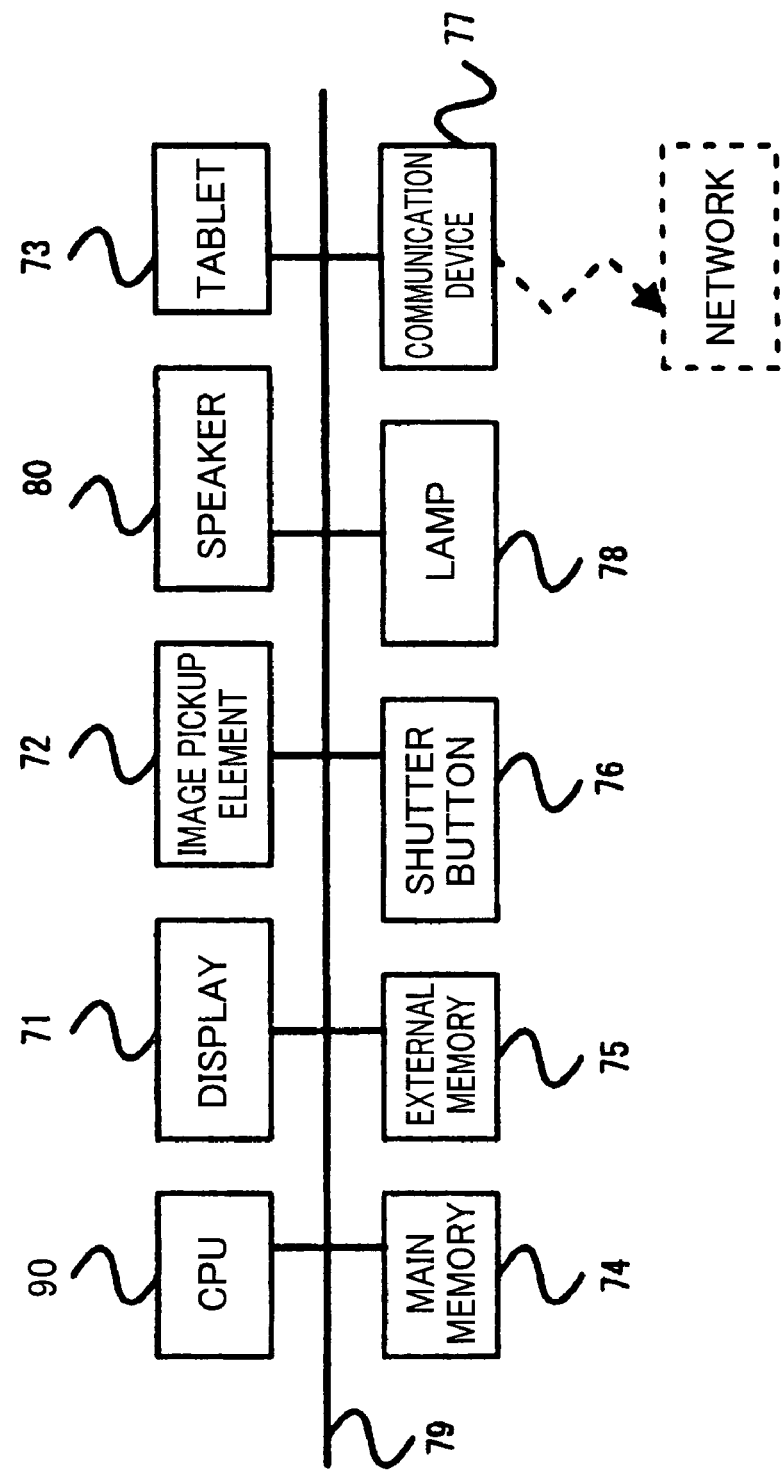
FIG. 34 is a block diagram illustrating an arrangement example of specific devices for realizing each means of the second image combination device.

FIG. 34 illustrates an arrangement example of devices that specifically realize the means 21 to 33 of FIG. 33.

A CPU (central processing unit) 90 functions as the amount of background correction calculating means 24, the corrected image generating means 25, the difference image generating means 26, the object region extracting means 27, the overlap detecting means 28, the superimposed image generating means 29, the superimposed image display means 30, the overlap prevention method calculating means 31, the shutter release timing notifying means 32, and the automatic shutter releasing means 33. The CPU 90 acquires a program that describes processing procedures for the means 24 to 33, from a main memory 74, an external memory 75, and a network destination or the like via a communication device 77.

In some cases, the image pickup means 21, the first object image acquiring means 22, and the second object image acquiring means 23 are also realized by the CPU or the like, for the purpose of internally controlling the image pickup device and various kinds of processing for image data outputted by the image pickup device.

The CPU 90 performs processing while transmitting and receiving data to and from a display 71, an image pickup element 72, a tablet 73, the main memory 74, the external memory 75, a shutter button 76, the communication device 77, a lamp 78, and a speaker 80, which (including the CPU 90) are connected to each other by the bus 79.

The data may be transmitted and received by using such means as communication cables or wireless communication devices, instead of the bus 79. Instead of using the CPU, the means 21 to 33 may be realized by a DSP (digital signal processor) or a logic circuit that includes the processing procedures in the form of circuits.

Usually, the display 71 is realized in combination with a graphic card or the like. The graphic card has a VRAM (video random access memory). The display 71 transforms data in the VRAM into display signals, and transmits the display signals to a display (display/output medium) such as a monitor. Then, the display displays the display signals as an image.

The image pickup element 72 is a device that photographs a scene or the like and acquires image signals. Usually, the image pickup element 72 includes an optical member (e.g. a lens), a light-receiving element, and an electronic circuit attached thereto. The image pickup element 72 of the present embodiment covers a function of transforming the image signals into digital image data through an A/D transformer or the like, and transmitting the image data to such members as the first object image acquiring means 22 and the second object image acquiring means 23, through the bus 79. A device generally used as the image pickup device is a CCD (charge coupled device), for example. Any other device may be used as the image pickup device, as long as a scene or the like can be acquired as image data.

Means for inputting user's instructions are the tablet 73, the shutter button 76, and the like. The user's instructions are inputted to the means 21 to 33 via the bus 79. Various other input means may be used, such as various operation buttons, sound inputs through a microphone, and the like. The tablet 73 includes a pen and a detecting device for detecting the position of the pen. The shutter button 76 includes a mechanical or electronic switch or the like. When pressed by the user, the shutter button 76 usually generates a start signal that starts a series of processing for, for example, recording the image photographed by the image pickup element 72 into the main memory 74, external memory 75, or the like.

Usually, the main memory 74 is a memory device such as a DRAM (dynamic random access memory) or a flash memory. Memories, registers and the like in the CPU may also be regarded as a kind of main memory.

The external memory 75 is recording means to which a HDD (hard disk drive), a PC (personal computer) card, or the like can be mounted and detached. Alternatively, the external memory 75 may be a main memory, an external device, or the like attached to another network device that is connected to the CPU 70 by wire or wireless via a network.

The communication device 77, which transmits and receives data to and from another network device connected by wire or wireless, is realized by a network interface card or the like.

The speaker 80 interprets sound data (which is transmitted via the bus 79 or the like) as sound signals, and outputs the sound signals as sounds. The outputted sounds can be simple sounds having a short wavelength, or can be complex sounds such as music or human voices. If the outputted sounds are predetermined, the transmitted data can be mere control signals for controlling ON/OFF operation, instead of the sound signals.

Next, the means 21 to 33 of FIG. 1 are described from the viewpoint of transmission and reception of data among these means.

Unless otherwise noted, data "acquired from . . . means" and data "transmitted (transferred) to . . . means" are received or transmitted mainly via the bus 79. Data may be transmitted and received directly among these means, or may be transmitted and received through the main memory 74, external memory 75, or a network or the like via the communication device 77.

The image pickup means 21, which mainly includes the image pickup element 72, transmits picked-up scenes and the like as image data to the first object image acquiring means 22, and to the second object image acquiring means 23.

The first object image acquiring means 22 includes such members as the image pickup means 21, the main memory 74, and/or the external memory 75, for example. The first object image acquiring means 22 acquires a first object image from the image pickup means 21, the main memory 74, the external memory 75, and/or a network destination or the like via the communication device 77. The first object image acquiring means 22 may include a CPU or the like for the purpose of internal control, for example.

In the case where the image pickup means 21 is used, the current scene (first object image) including a first object is photographed by the image pickup element 72 usually at the timing when the shutter button 76 or the like is pressed. The photographed image is recorded in the main memory 74, the external memory 75, and/or the network destination or the like via the communication device 77.

On the other hand, in the case where the first object image acquiring means 22 acquires the first object image from the main memory 74, the external memory 75, and/or the network destination or the like via the communication device 77, an image that has already been photographed and prepared in advance is read out. The first object image may be photographed through a network by using a camera provided at the network destination via the communication device 77.

The first object image is transmitted to the amount of background correction calculating means 24, the corrected image generating means 25, the difference image generating means 26, the object region extracting means 27, and/or the superimposed image generating means 29, for example.

The second object image acquiring means 23 includes, for example, the image pickup means 21, the main memory 74, and/or the external memory 75, and acquires an image including the second object (hereinafter "second object image") from the image pickup means 21, the main memory 74, the external memory 75, and/or the network destination or the like via the communication device 77. The second object image acquiring means 23 may include a CPU for the purpose of internal control or the like, as described above. The second object image acquiring means 23 acquires the image in the same manner as the first object image acquiring means 22, although the content of the acquired image is different.

The second object image is transmitted, for example, to the amount of background correction calculating means 24, the corrected image generating means 25, the difference image generating means 26, the object region extracting means 27, and/or the superimposed image generating means 29.

As the amount of background correction calculating means 24, the CPU 90 calculates an amount of correction that is a relative amount including one or an arbitrary combination of an amount of movement, an amount of rotation, a rate of expansion or reduction, and an amount of distortion correction, between backgrounds, other than objects, of the first object image and the second object image. It is sufficient that at least the amount of correction based on (i) one (standard image) of the first object image and the second object image and (ii) the other of the first object image and the second object image is calculated.

The amount of background correction calculating means 24 transmits the calculated amount of correction to the corrected image generating means 25. In the case where the amount of correction is calculated in advance and read out by the amount of background correction calculating means 24, the amount of correction is read out of the main memory 74, the external memory 75, and/or the network destination or the like via the communication device 77.

Using the first object image or the second object image as the reference image, the CPU 90 as the corrected image generating means 25 generates an image (hereinafter "corrected image") by correcting the other image by the amount of correction calculated by the amount of background correction calculating means 24. The other image is corrected so that the background portion thereof (the portion other than the object) corresponds to the background portion of the standard image. The CPU 90 then transmits the corrected image to the difference image generating means 26 and the superimposed image generating means 29. In the case where the corrected image is generated in advance and read out by the corrected image generating means 25, the corrected image is read out of the main memory 74, the external memory 75, and/or the network destination or the like via the communication device 77.

As the difference image generating means 26, the CPU 90 generates a difference image from (i) the standard image determined by the corrected image generating means 25 and (ii) the corrected image generated by the corrected image generating means 25. The CPU 90 then transmits the difference image to the object region extracting means 27 and the superimposed image generating means 29.

As the object region extracting means 27, the CPU 90 extracts the regions of the first and second objects from the difference image obtained from the difference image generating means 26, and transmits the extracted regions to the overlap detecting means 28 and the superimposed image generating means 29.

As the overlap detecting means 28, the CPU 90 detects, from the regions of the first and second objects obtained from the object region extracting means 27, whether or not the first and second objects overlap each other. The CPU 90 then transmits information on whether or not there is overlap and information on overlap regions to the superimposed image generating means 29, the overlap warning means 31, the shutter release timing notifying means 32, and the automatic shutter releasing means 33.

As the superimposed image generating means 29, the CPU 90 generates an image in which the first object image obtained from the first object image acquiring means 22, the second object image obtained from the second object image acquiring means 23, and the corrected image obtained from the corrected image generating means 25 are superimposed completely or partially. The CPU 90 then transmits the generated image to the superimposed image display means 30.

The superimposed image generating means 29 may generate an image having a pixel value different from the original pixel value, based on a difference region of the difference image obtained from the difference image generating means 26.

The superimposed image generating means 29 may superimpose, onto the standard image or the like, only the regions of the first object and the second object obtained from the object region extracting means 27.

The superimposed image generating means 29 may generate an image having a pixel value different from the original pixel value, based on the overlap region obtained from the overlap detecting means 28.

As the superimposed image display means 30, the CPU 90 displays, at the display 71 or the like, the superimposed image obtained from the superimposed image generating means 29.

The superimposed image display means 30 may perform the following operation, for example: (i) display a warning in accordance with warning information obtained from the overlap warning means 31, (ii) display an indication of the right timing for releasing the shatter in accordance with shutter release timing information obtained from the shutter release timing notifying means 32, and (iii) display, in accordance with shutter information obtained from the automatic shutter releasing means 33, an indication that the shutter has been released automatically.

As the overlap warning means 31, the CPU 90 notifies the user and/or the object that there is overlap, if there is overlap according to the information on overlap obtained from the overlap detecting means 28.

The notification may be made in various forms, such as (i) letters or the like including the contents of notification, transmitted to the superimposed image display means 30 and displayed at the display 71, (ii) light emitted from the lamp 78, and (iii) sounds from the speaker 80. Any other device may be used, as long as the notification can be made.

If there is no overlap according to the information on overlap obtained from the overlap detecting means 28, the CPU 90 as the shutter release timing notifying means 32 notifies the user and/or the object that there is no overlap. The notification may be made in various forms, as in the case of the overlap warning means 31.

If there is no overlap according to the information on overlap obtained from the overlap detecting means 28, the CPU 90 as the automatic shutter releasing means 33 automatically instructs the second object image acquiring means 23 to record the image obtained from the image pickup means 21 into the main memory 74, the external memory 75, and the like.

In the present embodiment, it is primarily assumed that the image obtained from the image pickup means 21 is finally recorded/stored as the first object image or the second object image in the main memory 74, the external memory 75, or the like, and is then combined. For example, in the case where the first object image is photographed first, and then the second object image is photographed, the first object image is recorded/stored every time it is obtained from the image pickup means 21. On the other hand, the second object image is not stored immediately after it is obtained from the image pickup means 21.

In the case where the image obtained from the image pickup means 16 is the second object image, the following series of processing are repeated: (i) such processing as overlap detection performed based on the second object image and the stored first object image, and (ii) displaying various types of information at the superimposed image display means 30 or the like, or such processing as warning and notifying. When recording/storing is instructed by the automatic shutter releasing means 33, the second object image is finally recorded/stored.

The second object image may be recorded/stored when an instruction is made by the automatic shutter releasing means 15, and the shutter button 143 is pressed by the user.

The automatic shutter releasing means 33 may notify the user and/or the object that a photographed image has been recorded as a result of instruction. The notification may be made in various forms, as in the case of the overlap warning means 31.

As the automatic shutter releasing means 33, the CPU 90 not only makes the instruction for recording, but also automatically instructs the second object image acquiring means 23 not to record the image obtained from the image pickup means 21 into the main memory 74, the external memory 75, or the like, if there is overlap according to the information on overlap obtained from the overlap detecting means 28. This operation is opposite the operation performed in the case of automatic recording described above.

In this case, if storing is prohibited by the instruction of the automatic shutter releasing means 33, the second object image is not recorded/stored even if the shutter button 143 is pressed by the user.

Figure 35:
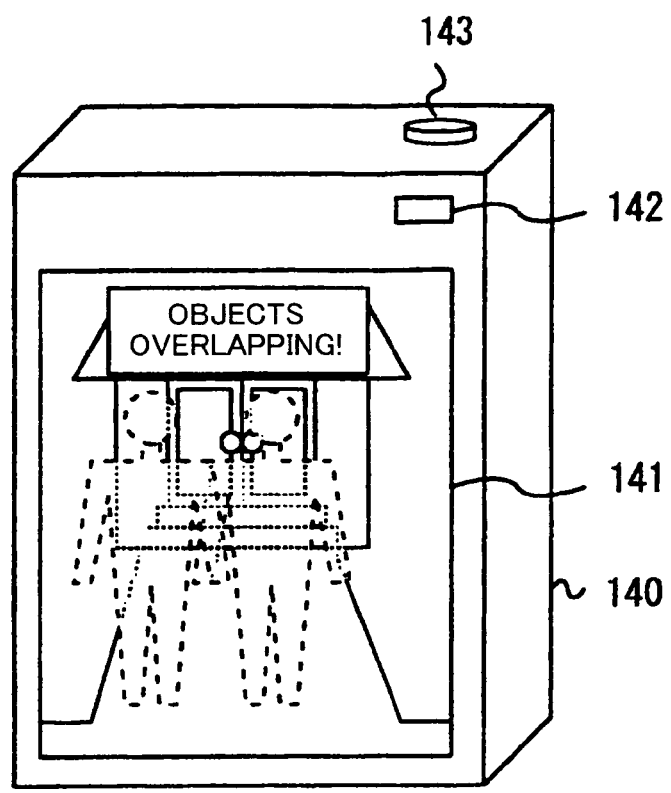
FIG. 35(a) is a schematic perspective view illustrating an example of an exterior view of the back side of the image combination device.
FIG. 35(b) is a schematic perspective view illustrating an example of an exterior view of the front side of the image combination device.
Figure 35:
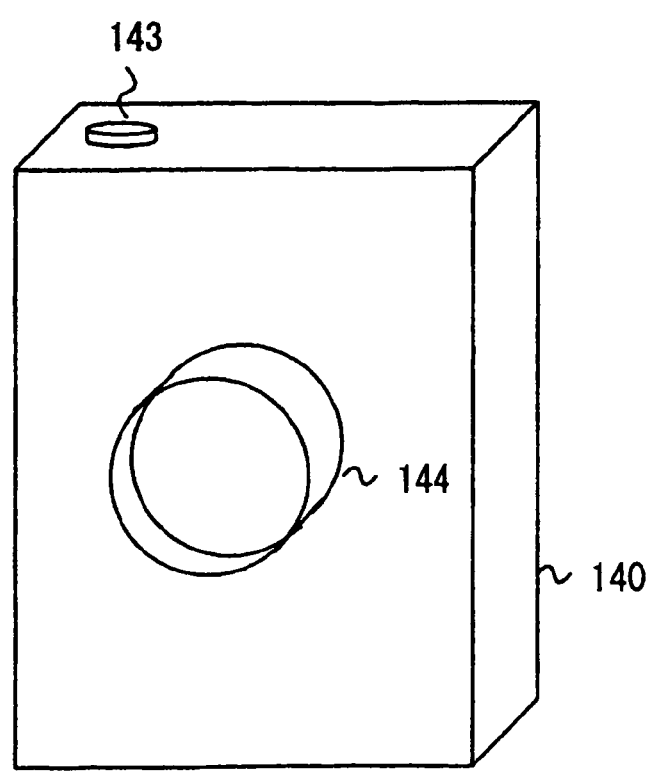

FIG. 35(*a*) illustrates an example of an exterior view of the image combination device of the present invention seen from the back side. On a main body 140, a display-cum-tablet 141, a lamp 142, and a shutter button 143 are provided.

The display-cum-tablet 141 functions as an input/output device (the display 71, the tablet 73, and the like) and as the superimposed image display means 30. As shown in FIG. 35(*a*), the display-cum-tablet 141 displays, for example, the composite image generated by the superimposed image generating means 29, and the notification/warning information obtained from the overlap warning means 31, the shutter release timing notifying means 32, the automatic shutter releasing means 33, and the like. The display-cum-tablet 141 is also used for displaying a menu of various settings of the image combination device, so that the setting can be changed on the tablet with a finger, a pen, or the like.

In addition to the tablet, buttons or the like may be provided as a means for changing the setting. The display-cum-tablet 141 may be so designed that not only the photographer but also the object can view the display-cum-tablet 141 by rotating or separating the main body 140, for example.

The lamp 142 is used for indicating the notification and/or warning transmitted from the overlap warning means 31, the shutter release timing notifying means 32, the automatic shutter releasing means 33, or the like.

The shutter button 143 is used mainly for instructing the timing at which the first object image acquiring means 22 or the second object image acquiring means 23 imports/records an image from the image pickup means 21.

Although not shown in this example, a built-in speaker or the like may be used as a notifying/warning means.

FIG. 35(*b*) illustrates an example of an exterior view of the image combination device of the present invention seen from the front side. A lens section 144 is provided on the front side of the main body 140. The lens section 144 is a part of the image pickup means 21. Although not shown in the example of FIG. 35(*b*), a display section, a lamp, a speaker, and the like may be provided on the front side, so as to transmit information (the notification, warning, and the like) to the object.

The image data and the pixel value are the same as those described in EMBODIMENT 1 with reference to FIG. 4. Therefore, explanations for these arrangements are omitted.

Figure 36:
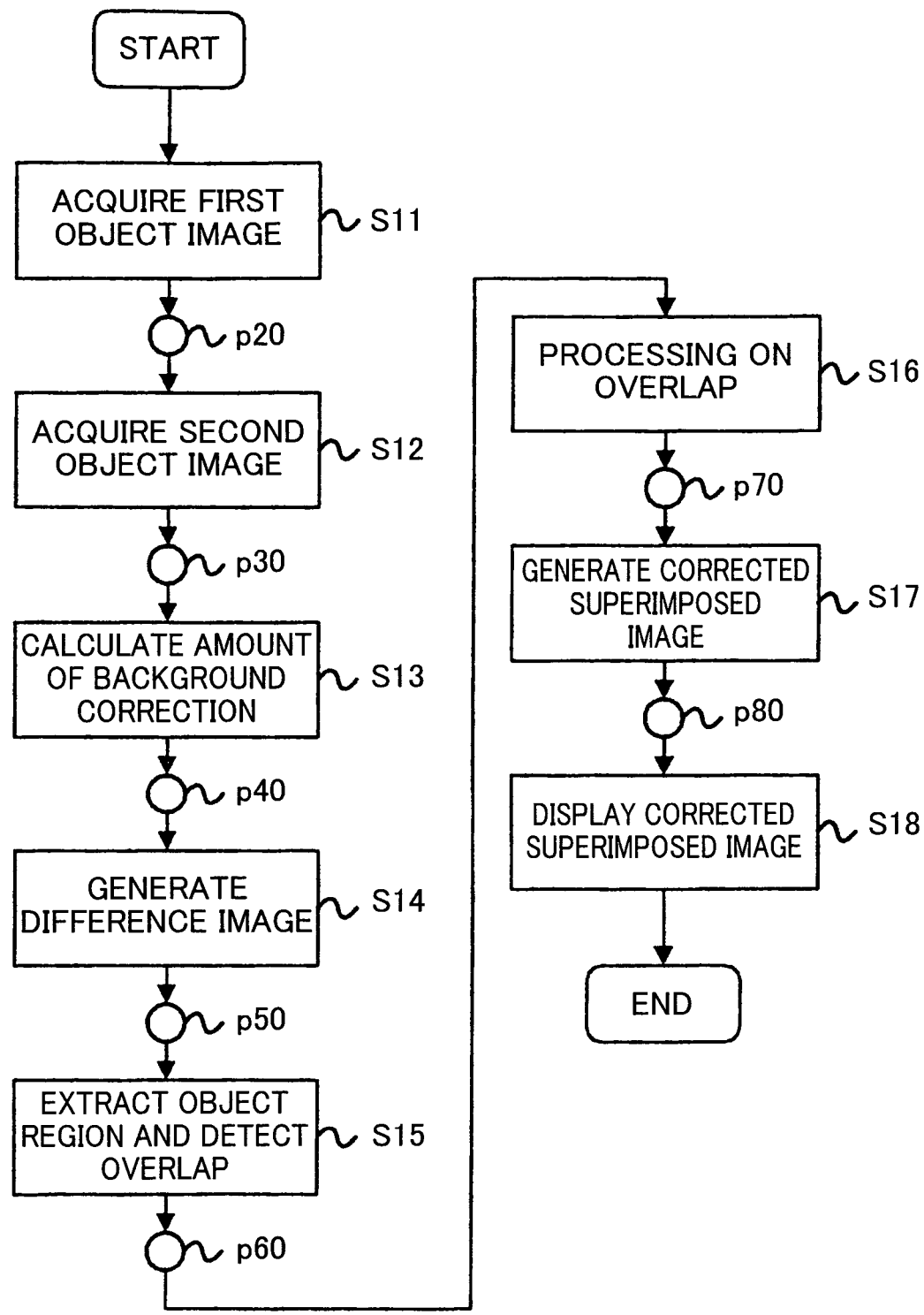
FIG. 36 is a flowchart illustrating an overall flow of an image combination method employed by the second image combination device.

FIG. 36 is a flowchart illustrating an example of the image combination method in accordance with one embodiment of the present invention.

First, in S11 ("step S" is hereinafter abbreviated as "S"), the first object image acquiring means acquires the first object image. Then, through the junction p20 ("junction p" is hereinafter abbreviated as "p"), the processing proceeds to S12. The first object image may be photographed by using the image pickup means 21, or may be prepared in advance and read out from the main memory 74, the external memory 75, or the network destination or the like via the communication device 77.

In S12, the second object image acquiring means 23 acquires the second object image, whose background portion corresponds, at least partially, to the background portion of the first object image. Then, through p20, the processing proceeds to S13. The processing in S12 is described later in detail, with reference to FIG. 44. The second object image is acquired by the same method used for acquiring the first object image. The order of S11 and S12 may be reversed. However, if the image photographed after the other image is photographed is set as the standard image, there is an effect that the composite image can be displayed without causing uncomfortable feeling at the time of photographing.

In S13, the amount of background correction calculating means 24 calculates the amount of background correction, based on the first object image and the second object image. Then, through p40, the processing proceeds to S14. The first object image is obtained from the first object image acquiring means 22 (S11), and the second object image is obtained from the second object image acquiring means 23 (S12).

In the following steps, the first object image and the second object image are supplied by the same methods/steps in S13, unless otherwise noted. Therefore, explanations for the methods/steps used for supplying these images are omitted.

The processing in S13 is described later in detail, with reference to FIG. 45.

In S14, the corrected image generating means 25 corrects the first object image or the second object image (the image other than the standard image) by the amount of background correction obtained from the amount of background correction calculating means 24. The difference image generating means 26 generates a difference image from (i) the image corrected by the corrected image generating means 25 and (ii) the standard image. Then, through p50, the processing proceeds to S15. The processing in S14 is described later in detail, with reference to FIG. 46.

In S15, the object region extracting means 27 extracts the regions of the first and second objects (hereinafter "the first object region" and "the second object region") from the difference image obtained from the difference image generating means 26 (S14). Then, the overlap detecting means 28 detects the overlap between the objects, and the processing proceeds to S16 through p60. The processing in S15 is described later in detail, with reference to FIG. 48.

In S16, at least one of the overlap warning means 31, the shutter release timing notifying means 32, and the automatic shutter releasing means 33 performs various processing, in accordance with the information on overlap obtained from the overlap detecting means 28 (S15). Then, through p70, the processing proceeds to S17. The processing in S16 is described later in detail, with reference to FIGS. 50 to 52.

In S17, the superimposed image generating means 29 generates a "superimposed image" in which the first object image and the second object image are superimposed, based on the first object image, the second object image, the image obtained by correcting the first object image or the second object image that is not the standard image by the corrected image generating means 25 (S14), the first and second object regions obtained from the object region extracting means 27 (S15), the information on overlap between the first and second objects obtained from the overlap detecting means 28 (S16), and the like. Then, through p80, the processing proceeds to S18. The processing in S17 is described later in detail, with reference to FIG. 53.

In S17, the superimposed image display means 30 displays, at the display 71 or the like, the superimposed image obtained from the superimposed image generating means 29 (S17). This is the end of the processing.

By the processing in S11 to S17, the first object and the second object can be combined into a single image, based on the first object image and the second object image. In addition, various processing can be performed in accordance with the degree of overlap between the objects.

The processing is briefly outlined below by taking a simple example, leaving specific processing and its effects to be described later in detail.

Figure 37:
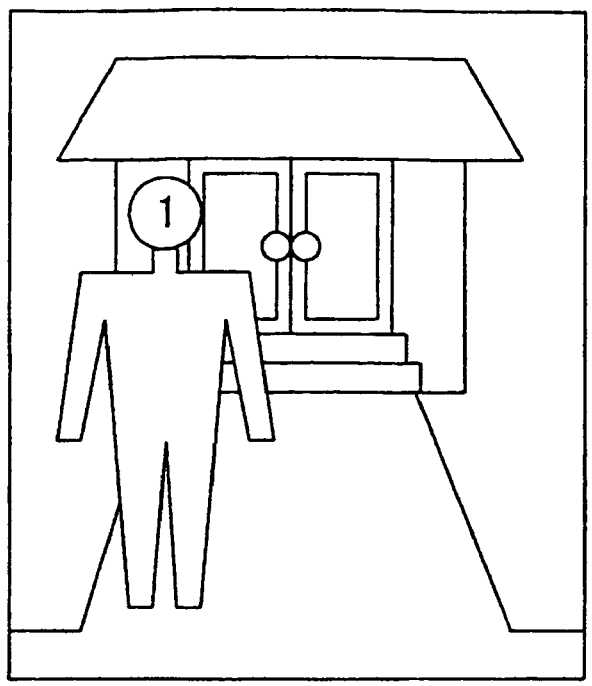
FIG. 37(a) is an explanatory diagram illustrating an example of a first object image.
FIG. 37(b) is an explanatory diagram illustrating how reference matching blocks are arranged in the first object image of FIG. 37(a).
Figure 37:
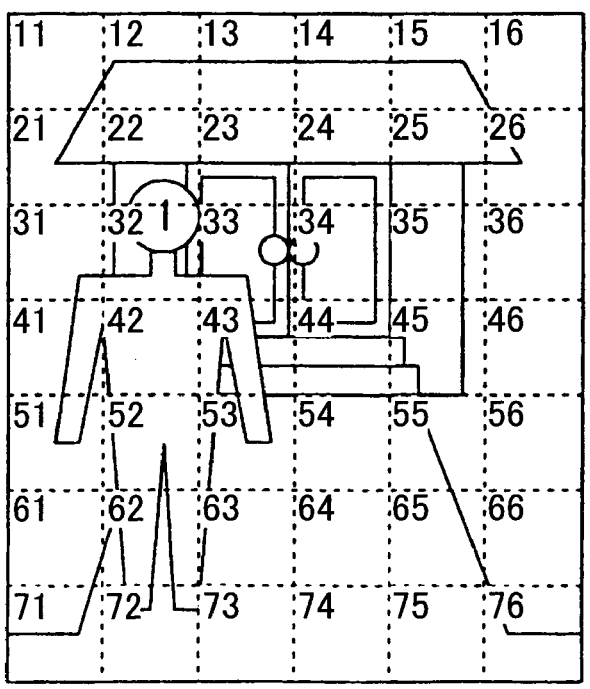

FIG. 37(a) is an example of the first object image acquired in S11. In front of the background, a person (1) (the first object) stands on the left. To make a distinction, the face of the person (1) is labeled with "1". In the following explanation, "on the right" and "on the left" mean "on the right" and "on the left" in the drawings, unless otherwise noted. The directions are directions seen from the photographer/camera.

Figure 38:
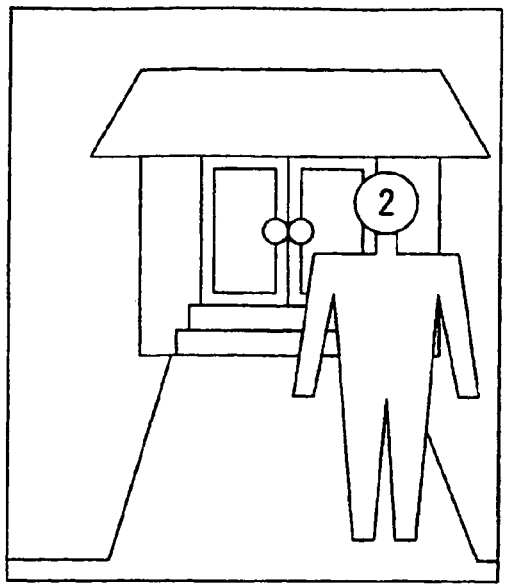
FIG. 38(a) is an explanatory diagram illustrating an example of a second object image.
FIG. 38(b) is an explanatory diagram illustrating how detected matching blocks are arranged in the second object image.
FIG. 38(c) is an explanatory diagram illustrating a corrected second object image obtained by correcting the second object image of FIG. 38(a)
FIG. 38(d) is an explanatory diagram illustrating a mask image for the corrected second object image of FIG. 38(c).
Figure 38:
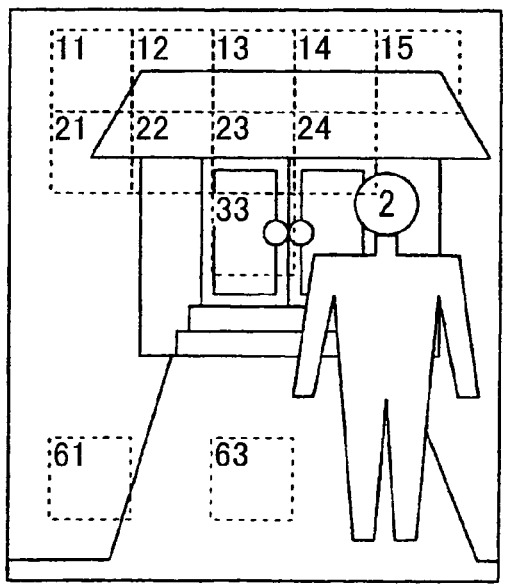
Figure 38:
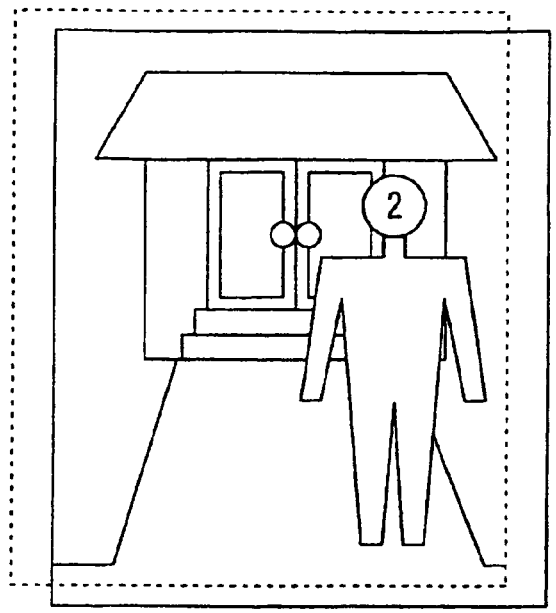
Figure 38:
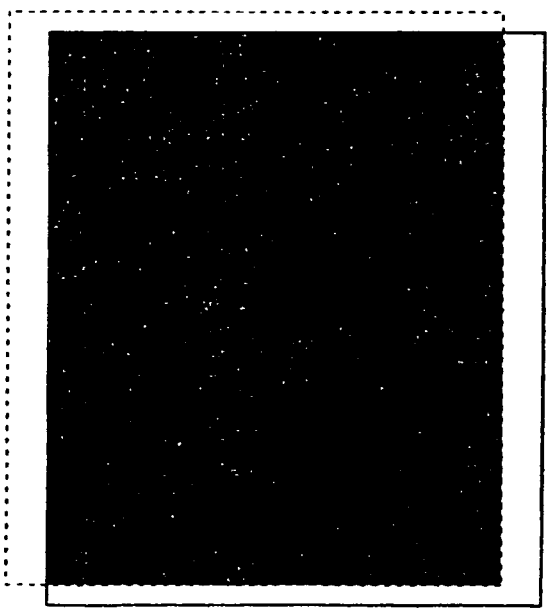

FIG. 38(a) is an example of the second object image acquired in S12. In front of the background, a person (2) (the second object) stands on the right. To make a distinction, the face of the person (2) is labeled with "2".

FIG. 38(c) is an image generated by (i) calculating an amount of background correction based on the first object image of FIG. 37(a) and the second object image of FIG. 38(a), and then (ii) correcting the second object image by using the first object image as the standard image.

The corrected image is the region surrounded by the solid line. To show how the image has been corrected, the scope of the original second object image of FIG. 38(a) and the scope of the first object image of FIG. 37(a) is indicated by the dotted line in FIG. 38(c). The background of FIG. 38(a) is obtained by photographing a slightly upper left side of the scene of FIG. 37(a). In order to correct the second object image of FIG. 38(a) so that its background corresponds to the background of the first object image of FIG. 37(a), it is necessary to choose the scene that is slightly on the lower right side of FIG. 38(a). Accordingly, FIG. 38(c) is the scene that is slightly on the lower right side of FIG. 38(a), as a result of correction. The scope of the original image of FIG. 38(a) is indicated by the dotted line. Since there is nothing on the lower right side of FIG. 38(a), FIG. 38(c) has a blank space on the right of the dotted line at the right end and under the dotted line at the lower end. On the other hand, the upper left portion of FIG. 38(a) is cut off.

In this case, the correction is performed only through parallel movement, with no expansion, reduction, or rotation. Therefore, the amount of background correction determined in S13 is the amount of parallel movement indicated by the gap between the solid line and the dotted line.

FIG. 39(a) is a difference image generated in S14 based on the first object image of FIG. 37(a) and the corrected second object image of FIG. 38(c). In the difference image, the portion where the amount of difference is zero (that is, where the backgrounds correspond to each other) is indicated as a black region. There is a difference within the object region and at a noise portion. The object region portion is a strange image in which the background and the image of the object portion are superimposed (a region where pixels exist only in one of the images as a result of the correction (e.g. a reverse L-shaped region between the solid line and the dotted line on the lower left side of FIG. 38(c)) is excluded from the target of differentiation, and the amount of difference is set as zero).

The processing on the overlap in S16 can be performed in various ways. However, since no overlap is detected in this example, no particular processing is performed here so as to simplify the explanation.

Figure 40:
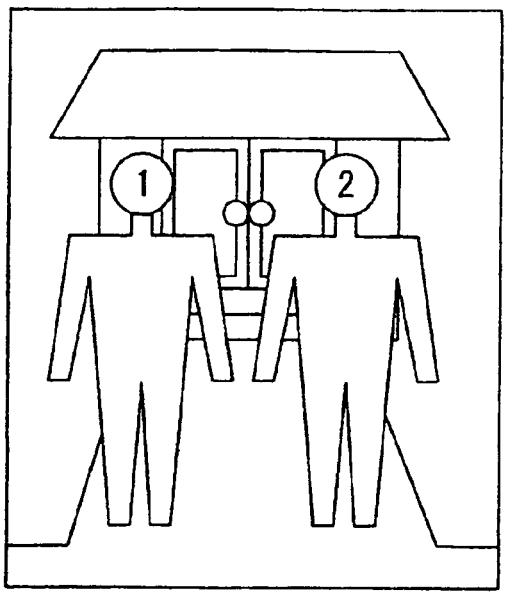
FIG. 40(a) is an example of a superimposed image generated by superimposing the second object region of FIG. 49(d) onto the first object image of FIG. 37(a)
FIG. 40(b) is an example of a superimposed image generated by superimposing (i) the first object region of FIG. 49(b) in a translucent state and (ii) the second object region of FIG. 49(d) onto the first object image of FIG. 37(a)
FIG. 40(c) is an explanatory diagram illustrating an example of a superimposed image generated by superimposing the second object region of FIG. 49(d) in a translucent state onto the first object image of FIG. 37(a).
Figure 40:
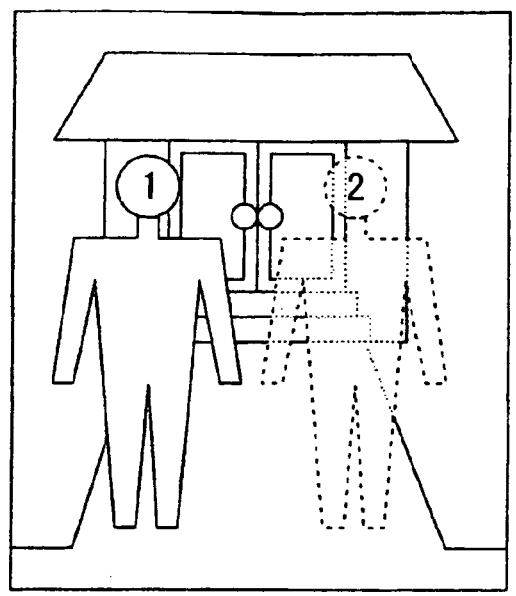
Figure 40:
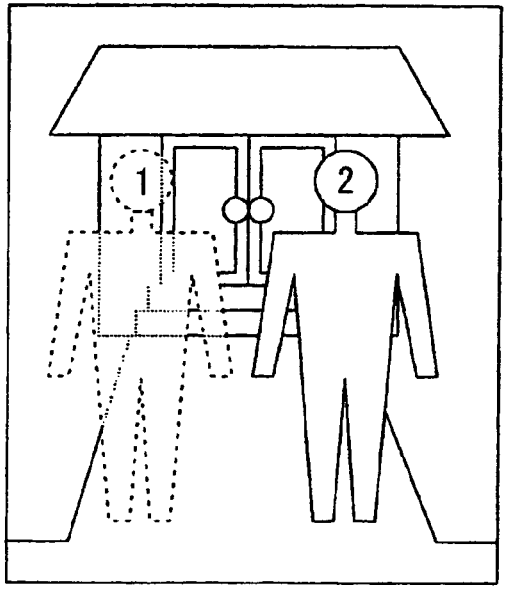

FIG. 40(a) is an image generated by superimposing (overwriting) the image corresponding to the second object region in FIG. 49(d) (described later) onto the first object image (standard image) of FIG. 37(a). In FIG. 40(a), the objects that were respectively in FIG. 37(a) and FIG. 38(a) are arranged next to each other in the same image, without overlap. There are various ways to superimpose the image, and they are described later in detail. The image of FIG. 40(a) is displayed as a composite image on the superimposed image display means 30.

This arrangement brings about an effect that it is possible to generate a composite image including objects that were photographed separately but look as if they were photographed at the same time.

Having outlined the processing from the beginning to the end, the following briefly outlines an example of the processing in S16 in the case where the object regions overlap in S15.

FIG. 41(a) is an example of the second object image different from FIG. 38(a). As compared with FIG. 38(a), the second object in FIG. 41(a) is positioned slightly on the left, with respect to the same background. The first object image is the same as that of FIG. 37(a).

FIG. 42(c) is a region in which the first object region and the second object region are put together. The region 202 in the figure includes the first object region and the second object region. In this case, the region 202 is illustrated as an integrated region because there is overlap between the first object region and the second object region, due to the positions of the first and second objects with respect to the same background.

Figure 43:
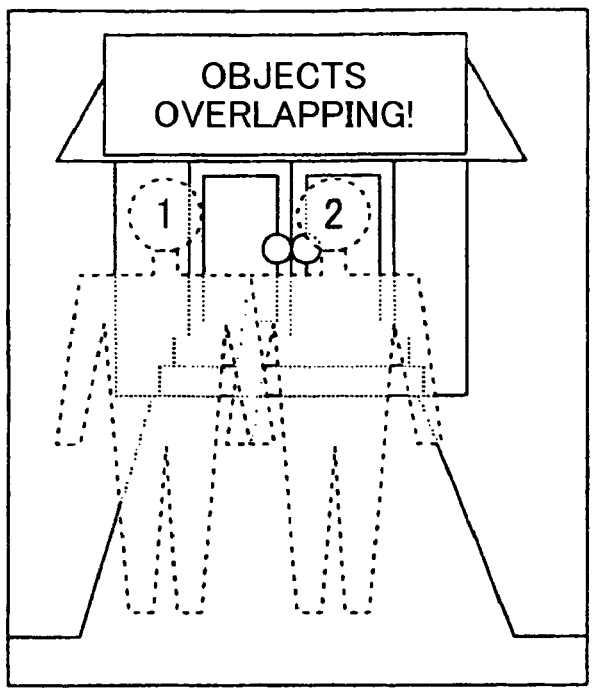
FIG. 43 is an explanatory diagram illustrating an example where the object region of FIG. 42(c) is superimposed at half transmittance, and a message for warning that there is overlap is displayed.

FIG. 43 is a diagram illustrating an example of the superimposed image generated in S17 when there is overlap in S16. Since the region 202 is treated as a single image in which the first object region and the second object region are integrated, the region 202 is collectively displayed as a translucent image. On the superimposed image, a message indicating that there is overlap between the first object and the second object is displayed.

By displaying the superimposed image (including the message), there is an effect that the user and/or the object can easily recognize that the first object and the second object overlap.

Thus, the example of the processing in S16 in the case where the object regions overlap in S15 has been outlined.

The processing is typically used in the following scene, for example. First, a first object like that of FIG. 36(a) is photographed by a camera (image combination device), and recorded. Next, using the same background, a second object like that of FIG. 38(a) is photographed.

The first object and the second object can be photographed alternately by the first object and the second object themselves, without the help of a third person. In order to take photographs using the same background, it is better not to move the camera. However, since correction will be made based on the background, it is not necessary to fix the camera by using a tripod, as long as the camera is held by hand substantially at the same position and directed in the same direction at the time of photographing. The positional relationship between the objects may be an arbitrary relationship, and is not limited to the right-left relationship in FIGS. 37(a) and 38(a).

After the two images are photographed, the processing of S13 to S17 are performed, and the display operation as shown in FIGS. 40(a) and 43 (and warning/notification described later) are performed.

If it is displayed or notified that there is overlap between the objects, the processing of S11 to S17 may be repeated. That is, the first object image and the second object image may be photographed, and a superimposed image may be generated and displayed, for example. The processing may be repeated as many times as necessary, until a satisfactory processing result is displayed.

If the second object moves to another position, for example, there are cases where only the second object needs to be photographed again, and it is not necessary to photograph the first object image once again. In such cases, it is sufficient if S12 to S17 are repeated.

In such cases, if S12 (acquiring the second object image) to S17 (displaying) are repeated automatically, that is, if (i) the second object image is acquired continuously in such a manner as to shoot a moving picture without pressing the shutter button, and (ii) the processing and displaying are repeated, it is possible to track the movement of the camera, the second object, and the like, thereby confirming the processing result in real time. Thus, it is possible to know in real time whether or not the new position of the second object is appropriate (whether or not the second object overlaps the first object). Therefore, there is an advantage that it is easy to photograph the second object in such a manner that the objects in the composite image do not overlap.

In order to start this repeat processing, it is necessary to enter into an exclusive mode by, for example, choosing start of the processing from the menu or the like. When the new position of the second object is appropriate, the shutter button may be pressed, so as to determine (record) the second object image. Then, the repeat processing/exclusive mode may be terminated (even after termination, the processing may be continued until S17, in which the final combination result is obtained).

In the case where the first object image is not good (for example, in the case where the first object is in the middle of the background, and the second object cannot be placed without overlapping the first object or without framing out of the superimposed image), the processing may be performed once again from S11 (obtaining the first object image).

The following provides details of the processing described above.

Figure 44:
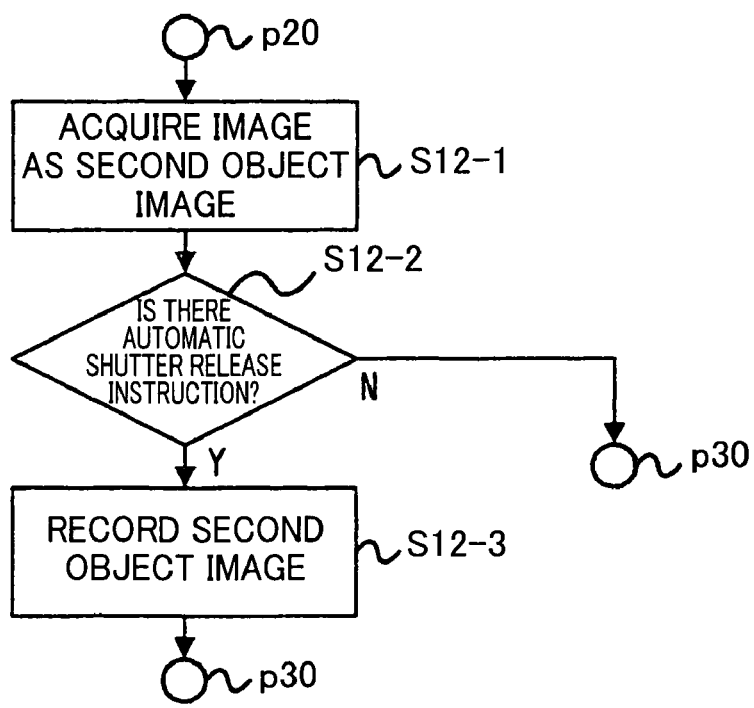
FIG. 44 is a flowchart illustrating a processing method for obtaining the second object image.

FIG. 44 is a flowchart illustrating a processing method for performing S12 of FIG. 36, that is, a processing for acquiring the second object image.

In S12-1, which is performed after p20, the second object image acquiring means 23 acquires the second object image. Then, the processing proceeds to S12-2. The processing in S12-1 is performed by the same method employed for acquiring the first object image in S11 of FIG. 36.

In S12-2, the second object image acquiring means 23 judges whether or not there is an instruction of the automatic shutter releasing means 33 to record the image. If there is an instruction, the processing proceeds to S12-3. If there is no instruction, the processing moves to P30.

In S12-3, the second object image acquiring means 23 records the second object image acquired in S12-1 into the main memory 74, the external memory 75, or the like. Then, the processing jumps to P30.

By the processing S12-1 to S12-3, the processing in S12 of FIG. 36 is performed.

A photographed image may be recorded not only when the shutter is released by the automatic shutter releasing means 33, but also when the shutter button is pressed manually by the photographer or the shutter is released by a self timer. These are included in the processing in S11 and S12-1.

Figure 45:
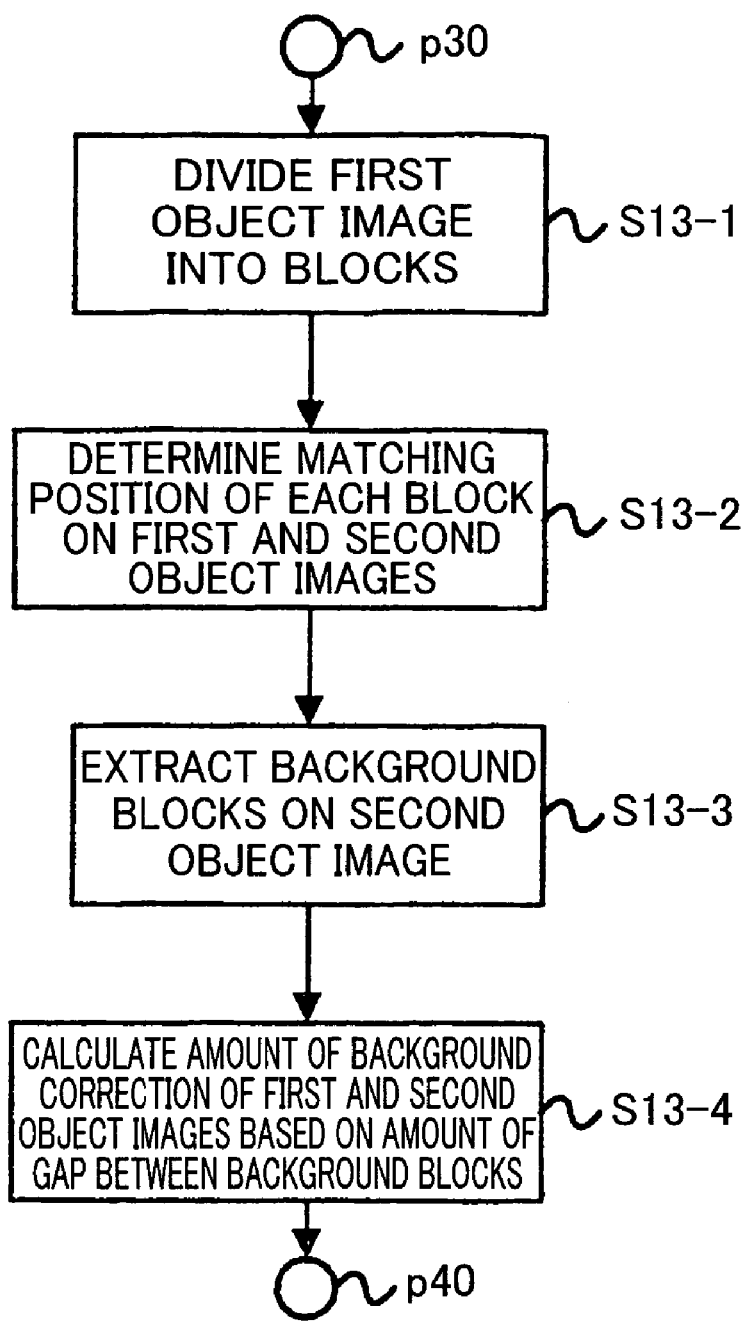
FIG. 45 is a flowchart illustrating a processing method for calculating an amount of background correction.

FIG. 45 is a flowchart illustrating a processing method for performing S13 of FIG. 36, that is, a processing for calculating the amount of background correction.

There are various methods for calculating the amount of background correction. Described below is a simple method using block matching.

In S13-1, which is performed after p30, the amount of background correction calculating means 24 divides the first object image into block regions. FIG. 37(b) is an explanatory diagram illustrating the first object image of FIG. 37(a) divided into block regions. The rectangles partitioned by the dotted lines are the block regions. The upper left block is expressed as "B(1, 1)". On the right of B(1,1) is "B(1, 2)", and below B(1,1) is "B(2,1)". In FIG. 37(b), the block B(1, 1) is labeled as "11" at the upper left of the block, so as to save spaces.

In S13-2, the amount of background correction calculating means 24 determines positions of the second object image to which the blocks of the first object image match respectively. Then, the processing proceeds to S13-3. In this case, "(block) matching" is a processing for searching, on the second object image, a block region that is most similar to a block of the first object image.

Since the matching is the same as the matching described in EMBODIMENT 1, details of the matching are not described here. In the present embodiment, the image that defines the blocks ("standard image") is the first object image, and the image on which similar blocks are searched ("search image") is the second object image. Since the amount of background correction is a relative value, the setting may be reversed; that is, the standard image and the search image may be the second object image and the first object image, respectively.

Next, in S13-3, the amount of background correction calculating means 24 extracts only those search blocks that correspond to the background portion, among the matching blocks determined in S13-2. Then, the processing proceeds to S13-4.

The matching blocks determined in S12-3 are chosen merely because they have the smallest difference. Therefore, there is no guarantee that the matching blocks are identical to the reference blocks. It is possible that they include similar patterns or the like by chance. Moreover, there is a in which no portion in the search image correspond to a reference block, because of the second object. In this case, the matching blocks are determined in an unreliable manner.

In view of this circumstance, it is necessary to remove, from each matching block, what is considered to be an image portion not identical to the reference block. The remaining matching blocks, having considered to be image portions identical to the reference blocks, are background portions, which do not include the first and second objects.

There are various methods for choosing the matching blocks. In the present embodiment, the simplest method is adopted. In this method, the similarity S(xs, ys) is judged by using a predetermined threshold value. If S(xs, ys) of a matching block exceeds the threshold value, the matching block is judged to be incorrect, and removed. Since the size of the block influences S(xs, ys), it is preferable to consider the size of the block in determining the threshold value.

FIG. 38(b) is obtained by removing incorrect matching blocks from the matching result in S13-2 of the second object image of FIG. 38(a). Those matching blocks that are judged to be correct are labeled with numbers identical to those of the corresponding reference blocks. In this way, it is found that the remaining matching blocks are only those matching blocks that do not include, or hardly include, object portions.

Moreover, it can be judged that the remaining matching blocks are background portions common to the first object image and the second object image. If the first object image and the second object image have no background portion in common, the matching block remaining after the processing in S13-3 is zero.

In S13-4, the amount of background correction calculating means 24 calculates the amount of background correction of the second object image, based on the matching blocks of the background portions obtained in S13-3. Then, the processing jumps to p40.

As the amount of background correction, an amount of rotation θ, an amount of expansion or reduction. R, and/or an amount of parallel movement are calculated, for example. Since the amount of background correction and the calculation method therefor are already described in EMBODIMENT 1, these are not described here (the same procedure is taken when there is only one matching block or there is no matching block remaining after S13-3). The transformation formula or the like (the transformation function Fsr, the inverse transformation function Frs, or the like) for transforming an arbitrary point (x', y') into a corrected point (x", y") is also the same, and therefore is not described here.

In the examples of FIGS. 37(a) and 38(a), correction is performed through parallel movement only, with no rotation, expansion or reduction. Details are described later, with reference to FIG. 38(c).

By the processing in S13-1 to S13-4, the processing for calculating the amount of background correction in S13 of FIG. 36 is performed.

Figure 46:
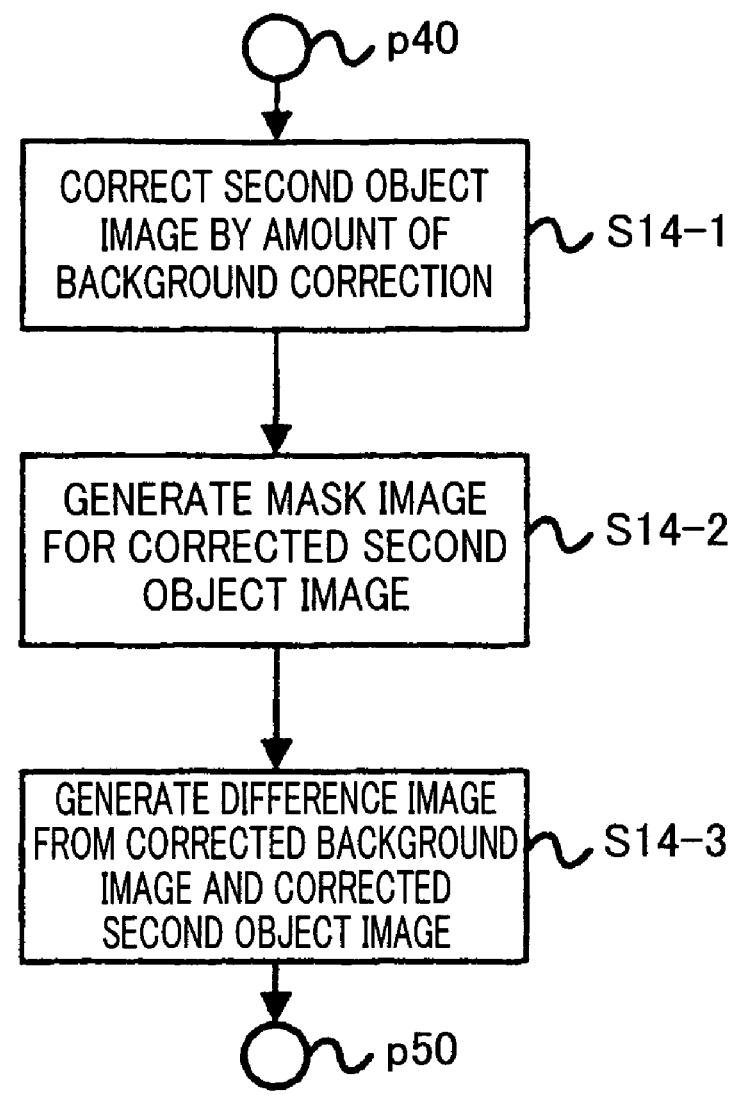
FIG. 46 is a flowchart illustrating a processing method for generating a corrected image of the second object image and generating a difference image from the first object image and the corrected image.

FIG. 46 is a flowchart illustrating a method of performing the processing in S14 of FIG. 36, that is, the processing for generating a corrected image based on the second object image, and generating a difference image from the corrected image and the first object image.

In S14-1, which is performed after P40, the corrected image generating means 25 generates a corrected image by correcting the second object image by the amount of correction calculated by the amount of background correction calculating means 24 (S13). The correction is performed so that the background portion of the second object image corresponds to the background portion of the first object image. Then, the processing proceeds to S14-2. The corrected second object image generated in S14-1 is hereinafter referred to as "corrected second object image" (See FIG. 38(c)).

The correction may be performed by using the transformation function Fsr or the inverse transformation function Frs. In general, in order to generate a clear transformed image, the position of a pixel of the original image (in this case, the second object image) corresponding to the position of a pixel of the transformed image (in this case, the corrected second object image) is determined, and a pixel value is calculated based on the position of the pixel. The transformation function used at this time is Fsr.

In general, the determined position of the pixel of the original image is not an integer. Therefore, the pixel value at the determined position of the original image cannot be obtained directly. Usually, some sort of interpolation is performed. For example, in the most common method, the pixel value is calculated by primary interpolation based on four pixels whose pixel values are integers, the four pixels surrounding the pixel at the determined position of the original image. The interpolation is described in widely available books on image processing (for example, Takeshi Agui and Masayuki Nakajima, "Image Information Processing", Morikita Shuppan, p. 54). Therefore, the interpolation is not described here in detail.

FIG. 38(c) is an example of the corrected second object image generated based on the second object image of FIG. 38(a) and the first object image of FIG. 37(a). The second object image is corrected so that the background portion of the second object image corresponds to the background portion of the first object image. In this example, the correction is performed only through parallel movement. To show how the image has been corrected, the scope of the second object image of FIG. 38(a) is indicated by a dotted line. In FIG. 38(c), the frame as a whole is slightly shifted to the lower right, as compared with the second object image of FIG. 38(a).

As a result of the correction, there is a portion that has no corresponding portion in the second object image. For example, in FIG. 38(c), the portion between the dotted line and the solid line at the right end is blank, because this portion does not exist in the second object image of FIG. 38(a). This can also be seen from the fact that the horizontal line (part of a road) at the bottom abruptly ends, without reaching the right end. Since this portion is to be excluded by using a mask image, it will not become a problem that the pixel values at this portion are unreliable.

Figure 47:
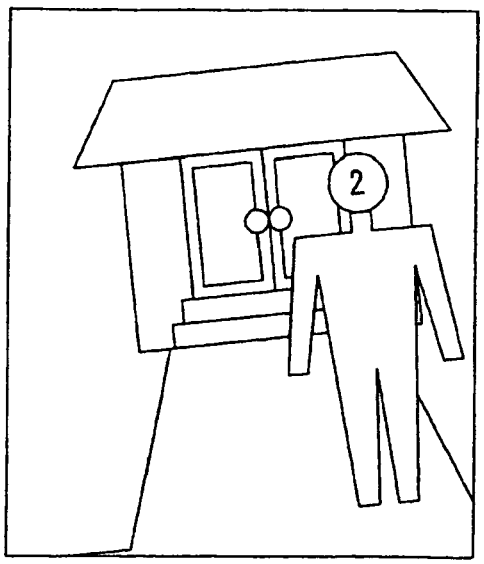
FIG. 47(a) is an explanatory diagram illustrating a rotated second object image.
FIG. 47(b) is an explanatory diagram illustrating how detected matching blocks are arranged in the second object region of FIG. 47(a)
FIG. 47(c) is an explanatory diagram illustrating a corrected second object image obtained by correcting the second object image of FIG. 47(a)
FIG. 47(d) is an explanatory diagram illustrating a mask image for the corrected second object image of FIG. 47(c).
Figure 47:
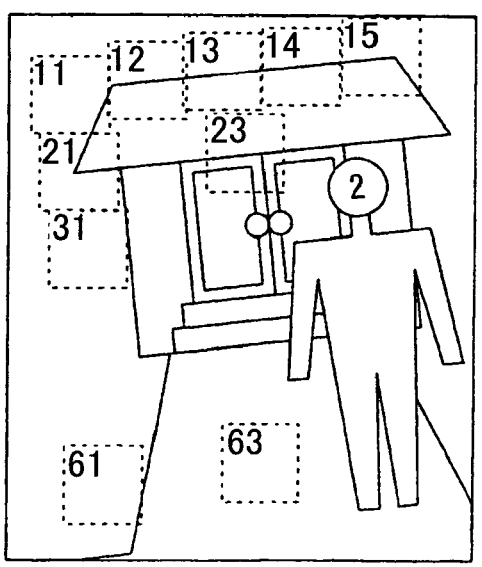
Figure 47:
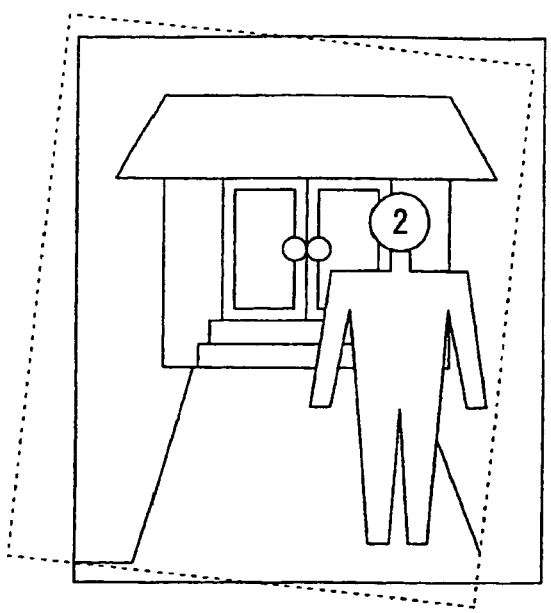
Figure 47:
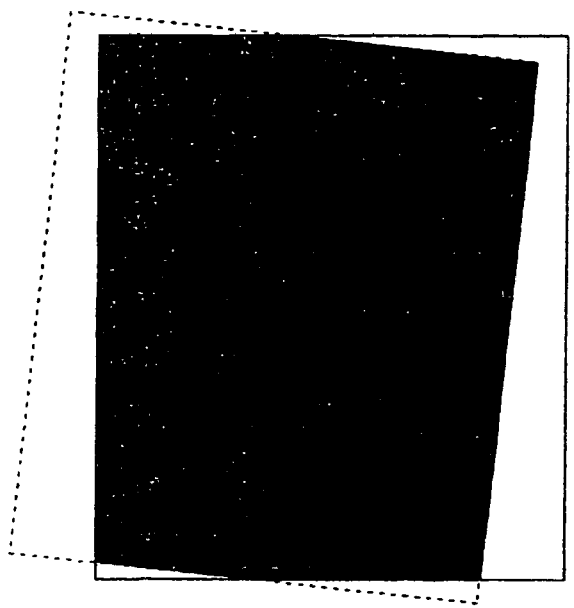

FIG. 47(a) is an example of the second object image that requires rotation so as to be corrected. The first object image is identical to FIG. 37(a). The screen as a whole is slightly rotated in the counterclockwise direction, as compared with FIG. 38(a).

FIG. 47(b) is a result of block matching performed between the second object image of FIG. 47(a) and the first object image of FIG. 37(a). Even if the image is rotated, an image within a block does not change significantly, as long as the amount of rotation and the size of the block are not very large. Therefore, precise matching can be performed to some extent in accordance with the rotation.

FIG. 47(c) is the corrected second object image corrected by the amount of correction calculated based on the result of block matching of FIG. 47(b). Since the background portion of FIG. 47(c) corresponds to the background portion of the first object image of FIG. 37(a), it can be seen that rotation has been corrected. To show how the image has been corrected, the frame of FIG. 47(a) is indicated by a dotted line.

In S14-2, the corrected image generating means 25 generates the mask image for the corrected second object image. Then, the processing proceeds to S14-3.

The mask image is generated as follows. With respect to each pixel of the corrected image to be generated, the position of a corresponding pixel on the original image is calculated according to the formulas described above. If the position of the corresponding pixel falls within the range of the original image, the pixel value of the pixel of the corrected image is set, for example, to zero (black) as a mask portion. If the position of the corresponding pixel does not fall within the range of the original image, the pixel value of the pixel of the corrected image is set, for example, to 255 (white). The pixel value of the mask portion may be determined freely, without limitation to zero or 255. The following discusses the case where the pixel value of the mask portion is zero (black) or 255 (white).

FIG. 38(d) is an example of a mask image for FIG. 38(c). The blackened region within the frame indicated by the solid line is the mask portion. The mask portion indicates the region of the corrected image where the original image (image before correction) has pixels. Therefore, in FIG. 38(d), the left end portion, which has no corresponding portion on the second object image, is white, and not included in the mask portion.

In S14-3, the difference image generating means 26 generates a difference image by using the first object image, and the corrected second object image and its mask image obtained from the corrected image generating means 25 (S14-1). The difference image is based on the difference between the first object image and the corrected second object image. Then, the processing proceeds to S14-4.

In order to generate the difference image, it is judged whether or not the pixel value of the corresponding point, on the mask image, of a point (x, y) is zero. If the pixel value is zero (black), since there must be a corrected pixel on the corrected second object image, the pixel value Pd(x, y) of the point (x, y) on the difference image is represented by $$Pd(x, y)=|P1(x, y)-Pf2(x, y)|$$

Thus, the pixel value Pd(x, y) is an absolute value of the difference between the pixel value P1(x, y) on the first object image and the pixel value Pf2(x, y) on the corrected second object image.

If the pixel value, on the mask image, of a point (x, y) is not zero (black), $$Pd(x, y)=0$$

These processing are repeated with respect to each point (x, y) from the upper left to the lower right of the difference image.

FIG. 39(a) is an example of the difference image generated based on the first object image of FIG. 37(a), the corrected second object image of FIG. 38(c), and the mask image of FIG. 38(d). In those regions other than the regions of person (1) and person (2), the difference is zero because the backgrounds correspond to each other or because the regions are outside the mask portion. As a result, FIG. 39(a) is an image where the image of person (1) and its background image, and the image of person (2) and its background image, are respectively combined mainly within the regions of person (1) and person (2).

Usually, there are small regions where the difference is not zero, due to errors in calculating the amount of correction in S13, errors in the interpolation processing for generating the corrected image, and subtle changes of the background portion itself caused by photographing images at different times. Such regions are usually about several pixels in size, and the difference is not large. FIG. 39(a) has several white portions surrounding the region of person (1) and the region of person (2).

On the other hand, in the case of FIG. 47(b), the mask image is as shown in FIG. 47(d). Even if the amount of correction includes the amounts of expansion, reduction, and/or rotation, the processing after the correction and mask image generation in S14-1 and S14-2 is performed by the same procedure. Therefore, the following description uses FIG. 38(a), instead of FIG. 47(a), as the second object image.

By the processing in S14-1 to S14-3, the processing in S14 of FIG. 36 for generating the difference image can be performed.

Figure 48:
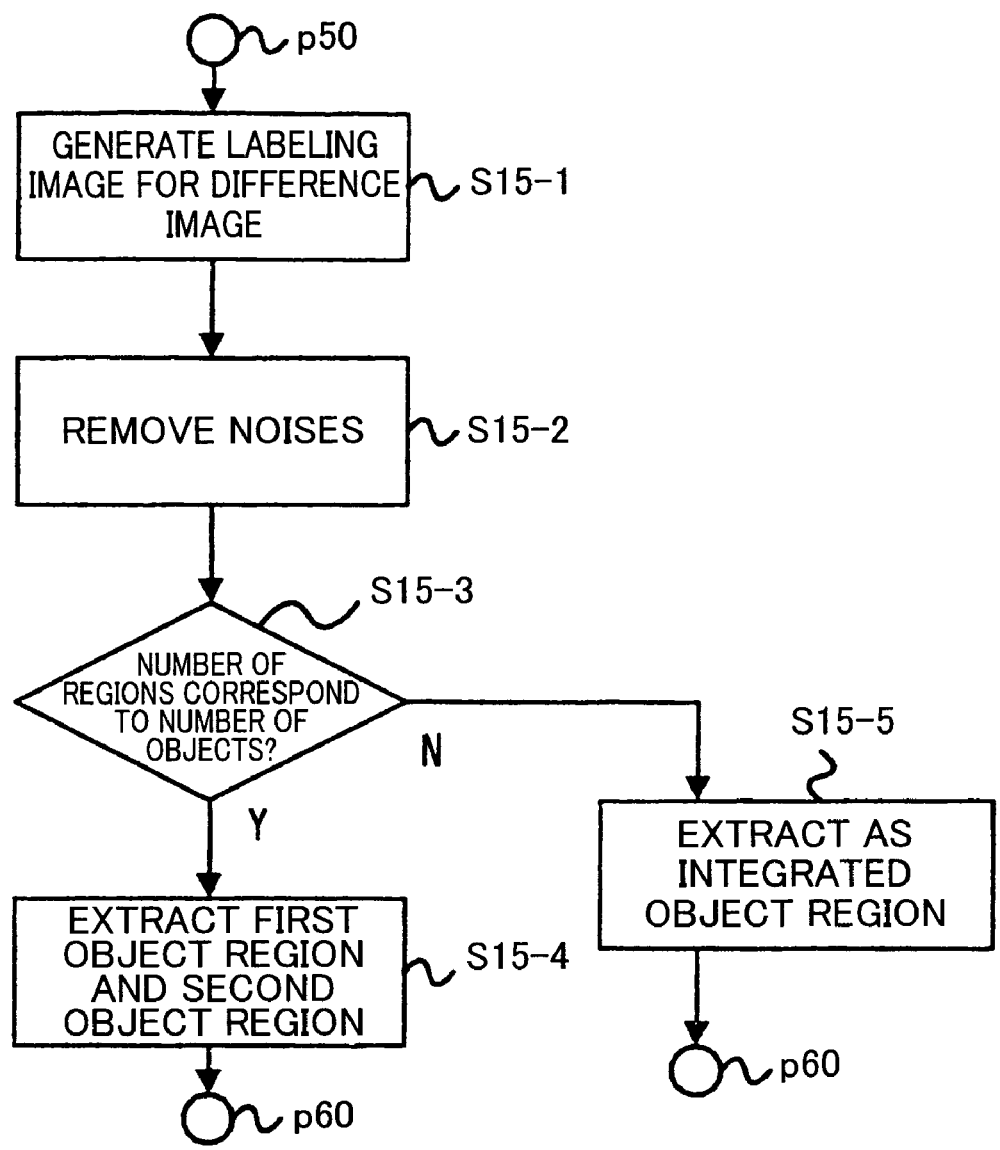
FIG. 48 is a flowchart illustrating a processing method for extracting an object region.

FIG. 48 is a flowchart illustrating an example of the processing in S15 of FIG. 36, that is, the processing for extracting an object region.

In S15-1, which is performed after p50, the object region extracting means 27 generates a "labeling image" (the meaning of "labeling image" is already described in EMBODIMENT 1), based on the difference image obtained from the difference image generating means 26 (S15). Then, the processing proceeds to S15-2.

First, as a preparation, a binary image is generated based on the difference image. There are various methods for generating the binary image. For example, by comparing each pixel value of the difference image with a predetermined threshold value, white is allocated if the pixel value is higher than the threshold value, and black is allocated if the pixel value is not higher than the threshold value. If the difference image has pixel values of R, G, and B, the sum of the pixel values of R, G, and B may be compared with the threshold value.

FIG. 39(b) is an example of the binary image generated based on the difference image of FIG. 39(a). There are seven black regions 110 to 116, which, except the large human-shaped regions 112 and 113, are small regions.

Next, based on the generated binary image, the labeling image is generated. The only difference between the binary image and the labeling image is that the former is a binary image whereas the latter is a multivalued image. Therefore, the following describes an example of the labeling image with reference to FIG. 39(b). In FIG. 39(b), the number of each of the regions 110 to 116 is followed by a number in parentheses, like "110(1)". This number indicates the labeling value of the region. To the rest of the regions, zero is allocated as a labeling value.

Since it is difficult to illustrate multivalued images on paper, the labeling image of FIG. 39(b) is illustrated as if it were a binary image, although it is in fact a multivalued image having a labeling value. Therefore, although it is not required to display, FIG. 39(b) would appear differently if it were actually displayed.

In S15-2, the object region extracting means 27 removes "noise"-like regions of the labeling image obtained in S15-1. Then, the processing proceeds to S15-3. In general, the "noise" is a portion other than the portion of intended data. In this case, the "noise" is the regions other than the human-shaped region.

There are various methods for removing the noise. In a simple method, label regions whose area (number of pixels) is not more than a threshold value is removed. In this method, first, the area of each label region is calculated. To calculate the area, all pixels are scanned, and the number of pixels having a specific labeling value is calculated. After the area (number of pixels) is calculated with respect to all labeling values, the label region whose area (number of pixels) is not more than a predetermined threshold value is removed. Specifically, the label region may be removed by setting the label value of the label region to zero, or copying a label region other than the noise onto the label region.

FIG. 39(c) is a result obtained by removing the noise from the labeling image of FIG. 39(b). All regions other than the human-shaped regions 112 and 113 have been removed as noises.

If it is difficult to realize fully automated noise removal processing for removing the label regions other than the objects, the object regions may be specified by a user, using input means such as a tablet, a mouse, or the like. To specify the object regions, the user may specify outlines of the object regions, may specify which label region is an object region, using the outline of each label region in the labeling images, or may employ other methods.

In FIG. 9(b), the human-shaped region happens to be a single label region. Depending on the image, however, there is a case where a single object is divided into a plurality of label regions. For example, if color, brightness or the like of a pixel in the vicinity of the center of an object region is similar to the background, the vicinity of the object region is recognized as the background, because the pixel value of that portion of the difference image is small. As a result, the object region is extracted as a region divided into an upper part and a lower part, or a right part and a left part. In this case, there is a possibility that the subsequent object overlap detection and combination processing cannot be performed successfully.

As described in EMBODIMENT 1, one method that can overcome this situation is a method in which the label regions of the labeling image are expanded so as to integrate neighboring label regions into a single label region. The integration may be attained by "snake", which is a method of extracting a region.

Alternatively, if not for the purpose of integrating neighboring label regions, the extracted object regions may be expanded by certain amount for the purpose of reducing the possibility that the overlap between the first object region and the second object region might be overlooked.

Note that the distention and integration are not performed in the processing example described here.

In S15-3, the overlap detecting means 28 detects whether or not the objects in the free-free labeling image obtained in S15-2 overlap. If no overlap is detected, the processing proceeds to S15-4. If overlap is detected, the processing proceeds to S15-5.

There are various ways to detect the overlap. Described below is a simple method using the number of objects to be photographed/combined and the number of object regions in the noise-free labeling image.

The number of objects to be photographed/combined is specified in advance by a program, an external memory, a user input, or the like. For example, the camera has such modes as "two-group-photographing mode" (number of objects: two) and "three-group-photographing mode" (number of objects: three). The mode of the camera is set by the user.

The "number of objects" used here is the number of persons or the like constituting a single group (single region). For example, if the first object is a person, and the second object is a person, the number of objects is two. Suppose that the first object is one person, but the second object includes two persons. If the two persons are linked to each other in the image to be photographed, the second object is counted as one object, because the two persons constitute a single group (single region). On the other hand, if the two persons are distanced from each other, the second object is counted as two objects, because the two persons do not constitute a single group (single region). In the latter case, the total number of objects is three.

The number of regions can be determined by counting the number of such regions of the noise-free labeling image that have different label values (except those portions where the labeling value is zero).

The overlap detecting means 28 considers whether or not the number of objects to be photographed/combined and the number of object regions in the noise-free labeling image correspond. If they correspond, the overlap detecting means 28 judges that the objects do not overlap. If they do not correspond, the overlap detecting means 28 judges that the objects overlap.

The overlap detecting means 28 makes the judgments according to the following principle. To simplify the explanation, the following discusses a case where the number of objects to be photographed/combined is two.

If the objects do not overlap, the region of the first object and the region of the second object must be separated, as a matter of course. Therefore, if the objects do not overlap, the number of objects must be two after the noise is removed.

If the objects overlap, the region of the first object and the region of the second object must not be separated, because these regions are integrated to each other at the overlap portion. Therefore, if the objects overlap, the number of objects must be one after the noise is removed.

The same line of reasoning is also applicable to the case where the number of objects to be photographed/combined is three. If the objects do not overlap, the regions must be separated from each other. Therefore, the number of objects must be three after the noise is removed. If the objects overlap, at least two among the three object regions must be integrated to each other at the overlap portion. Therefore, if the objects overlap, the number of objects must be one or two after the noise is removed.

In each of FIGS. 37(a) and 38(a), the object is one person. Therefore, the number of objects to be photographed/combined is set to two. In FIG. 39(c), the number of regions is two (the human-shaped regions 112 and 113). Thus, the number of objects to be photographed/combined and the number of object regions in the noise-free labeling image correspond. Therefore, in this case, the overlap detecting means 28 judges that the objects do not overlap.

Figure 41:
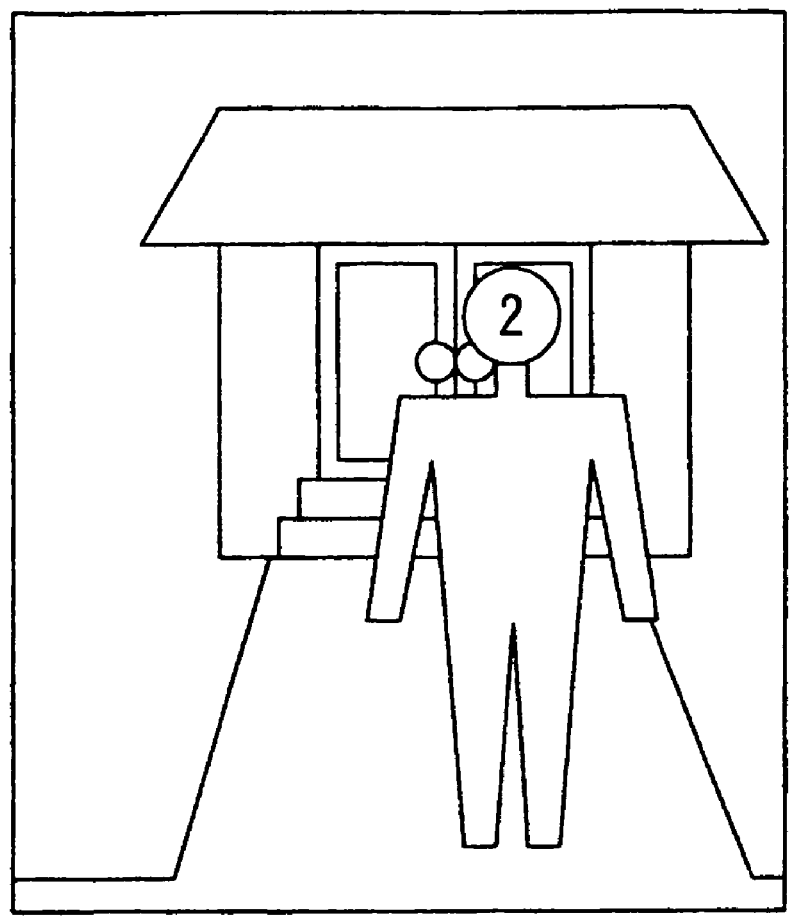
FIG. 41 is an explanatory diagram illustrating an example of a second object image whose object region overlaps the object region of the first object of FIG. 37(a).

As an example where the objects overlap, the case of using the second object image of FIG. 41 is considered. FIG. 37(a) is directly used as the first object image. FIG. 42(a) is a difference image generated based on FIG. 41 and FIG. 37(a). In FIG. 42(a), the objects overlap. In the overlap portion (arm portion), the first object and the second object are combined. In the other portions, the first object and its background portion are combined, and the second object and its background portion are combined. FIG. 42(b) is a labeling image of FIG. 42(a). FIG. 42(c) is an image generated by removing noises from FIG. 42(c).

In FIG. 42(c), the region of the first object and the region of the second object are integrated at the arm portion. Therefore, there is only a single group (region 202). In this case, the number of object regions in the noise-free labeling image is one. This does not corresponds to the number of objects to be photographed/combined. Therefore, it is judged that there is overlap.

In another way for detecting the overlap, the outlines of the first object and the second object are determined precisely, and it is judged whether or not the outlines overlap. If the outlines can be determined precisely, it is possible to detect the overlap, and to perform various processing, such as displaying the overlap region and preventing the overlap.

However, it is generally difficult to extract an object region with perfect precision by image processing only; human knowledge and high-level processing are generally required. As a method of extracting a region, there is a method called "snake". However, "snake" is not perfect, either. If a background image is used, and the background image includes no object but includes a background portion that corresponds to each object image at least partially, an object region can be extracted regardless of whether or not there is overlap. On the other hand, based only on the first object image and the second object image, it is difficult to extract precisely the outlines of the objects that might overlap.

Therefore, the foregoing simple method is employed here to detect only whether or not there is overlap.

In S15-4, the object region extracting means 27 judges which of the object regions in the noise-free labeling image is the first object region, and which of the object regions in the noise-free labeling image is the second object region. Then, the processing jumps to p60.

According to the foregoing method in which the background image is used, the object images can be extracted respectively, because (i) the difference image generated from the background image and the first object image and (ii) the difference image generated from the background image and the second object image are used. The extracted object regions are the first object region and the second object region. Thus, the first object region and the second object region can be extracted independently.

On the other hand, the present invention does not use the background image. Therefore, the region of the first object and the region of the second object cannot be extracted independently from the difference image generated from the first object image and the second object image. The first object region and the second object region can only extracted in a combined state. Specifically, from the noise-free labeling image like FIG. 39(c), the two object regions 112 and 113 can be obtained, but the object region extracting means 27 cannot judge which is the first object region and which is the second object region.

The object region extracting means 27 being unable to judge which is the first object region and which is the second object region, other side of the coin is that the object region extracting means 27 cannot judge whether an image is an image of the first object, the second object, or the background portion.

For example, FIGS. 49(a) to 49(d) are images generated by extracting the regions corresponding to the regions 112 and 113 of FIG. 39(c) from the first object image (FIG. 37(a)) and from the second object image (FIG. 38(a)). Specifically, FIG. 49(a) is a region of the first object image corresponding to the region 112; FIG. 49(b) is a region of the second object image corresponding to the region 112; FIG. 49(c) is a region of the first object image corresponding to the region 113; and FIG. 49(d) is a region of the second object image corresponding to the region 113.

Based on the premise that, other than the background portion, the first object image includes only the first object, and the second object image includes only the second object, either one of the following propositions is true: (1) FIG. 49(a) is the first object image and FIG. 49(d) is the second object image; (2) FIG. 49(b) is the first object image and FIG. 49(c) is the second object image.

Therefore, to distinguish between the first object region and the second object region, it is necessary to judge which one of (i) FIGS. 49(a) and 49(d) and (ii) FIGS. 49(b) and 49(c) is images of objects.

There are various ways to identify the images of objects. For example, if a characteristic of the objects and/or the background is known in advance, judgment can be made based on the characteristic.

For example, if it is known that the objects are persons, it is likely that skin color is included in large area of the images of objects. Therefore, it is possible to judge that those images including skin color in larger area are the images of objects.

There are various methods for recognizing colors. In one method, for example, hue H, saturation S, and brightness I are calculated based on the pixel values of R, G, and B in FIG. 36, and colors are recognized mainly by using hue H. There are various methods for calculating hue H, saturation S, and brightness I. These methods are described in widely available books on image processing (for example, University of Tokyo Press, "Image Analysis Handbook", published in 1991, pp. 485-491). Therefore, these methods are not described here in detail. For example, according to a method (Conversion Using HSI6 Pyramid Color Model) described in the publication above, the value of hue H ranges from zero to $2\pi$.

Specifically, the object region extracting means 27 determines a standard range of H of skin color. Then, the object region extracting means 27 calculates H of each pixel of the regions in FIGS. 49(*a*) to 49(*d*). If the calculated H is within the standard range of H of skin color, the pixel is counted as a skin color. Subsequently, the object region extracting means 27 compares the counted number of skin color of FIGS. 49(*a*) and 49(*d*) with that of FIGS. 49(*b*) and 49(*c*). The images with larger counted number is judged to be the images of objects.

Other than the method of identifying the images of objects by using skin color as a characteristic amount, there is a method of identifying the images of objects by judging whether or not the regions in question are similar to the surrounding background portions.

In this case, the object region extracting means 27 calculates a characteristic amount (described later) in the object regions of the first object image and the second object image. Then, the object region extracting means 27 calculates a characteristic amount in regions respectively surrounding the object regions (for example, surrounding 20 dots). The regions surrounding the object regions are background portions. Since the correction has been made so that the background portions correspond, only one of the background portions is required, in some cases. The object region extracting means 27 judges that the images having a characteristic amount similar to that of the background portion are the images of the background portion, and the images having a characteristic amount not similar to that of the background portion are the images of the object regions.

The characteristic amount may be the pixel values of R, G, and B, hue H, saturation S, brightness I, and in addition, texture.

Various methods have been invented to calculate texture as a characteristic amount. One example of such methods is a method using a histogram of brightness I. In this method, a histogram P(i) (i=0, 1, . . . , n−1) of brightness I of pixels in a region is created (the histogram P(i) is normalized so that the sum is equal to 1.0), and the object region extracting means calculates average μ, dispersion (σ¢2), degree of distortion Ts, and kurtosis Tk, according to the following formulas. Note that (X¢Y) is the y-th power of X.

$$\mu = \sum_{i=0}^{n-1} i \times P(i)$$

$$\sigma\text{\textcent}2 = \sum_{i=0}^{n-1} ((i-\mu)\text{\textcent}2) \times P(i)$$

$$Ts = \left(\sum_{i=0}^{n-1} ((i-\mu)\text{\textcent}3) \times P(i)\right)/(\sigma\text{\textcent}3)$$

$$Tk = \left(\sum_{i=0}^{n-1} ((i-\mu)\text{\textcent}4) \times P(i)\right)/(\sigma\text{\textcent}4)$$

These four values are used as characteristic amounts.

Other characteristic amounts include, for example, cooccurrence matrix, difference statistics value, run-length matrix, power spectrum, and secondary or higher order statistics value of these. These characteristic amounts are described in widely available books on image processing (for example, University of Tokyo Press, "Image Analysis Handbook", published in 1991, pp. 517-538). Therefore, these characteristic amounts are not described here in detail.

Figure 49:
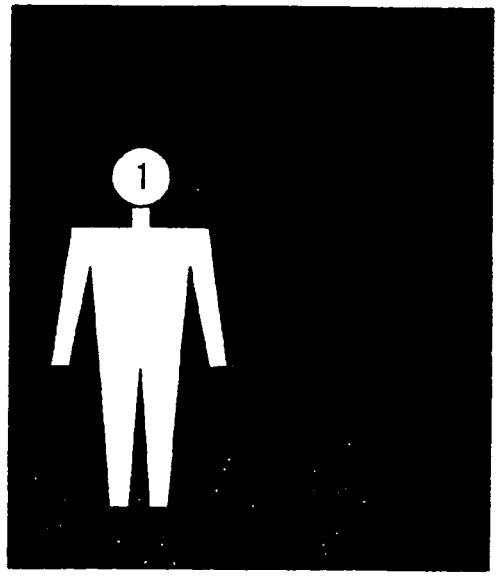
FIG. 49(a) is an explanatory diagram illustrating an image of the first object region in the first object image of FIG. 37(a)
FIG. 49(b) is an explanatory diagram illustrating an image of the first object region in the second object image of FIG. 38(a)
FIG. 49(c) is an explanatory diagram illustrating an image of the second object region in the first object image of FIG. 37(a)
FIG. 49(d) is an explanatory diagram illustrating an image of the second object region in the second object image of FIG. 38(a).
Figure 49:
Figure 49:
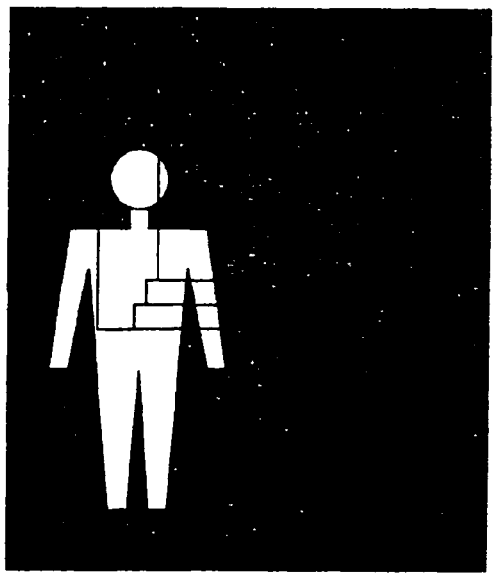
Figure 49:
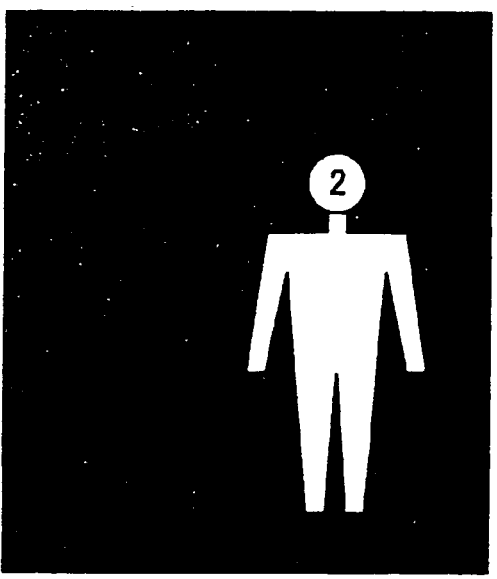

Suppose that, in the case of FIG. 49, the object region extracting means 27 judges that FIGS. 49(*a*) and 49(*d*) are the images of objects. Then, the region 112 is set as the first object region, and the region 113 is set as the second object region.

Figure 39:
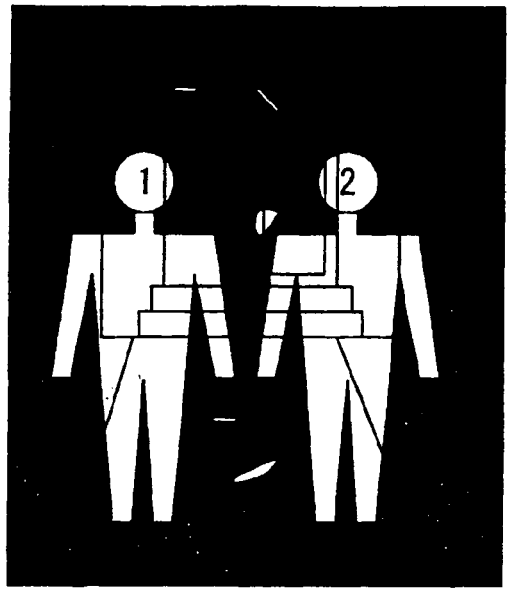
FIG. 39(a) is an explanatory diagram illustrating an example of a difference image generated from the first object image of FIG. 37(a) and the corrected second object image of FIG. 38(c)
FIG. 39(b) is an explanatory diagram illustrating an example of a label image generated from the difference image of FIG. 39(a)
FIG. 39(c) is an explanatory diagram illustrating an example of a label image obtained by removing noise portions from the label image of FIG. 39(b).
Figure 39:
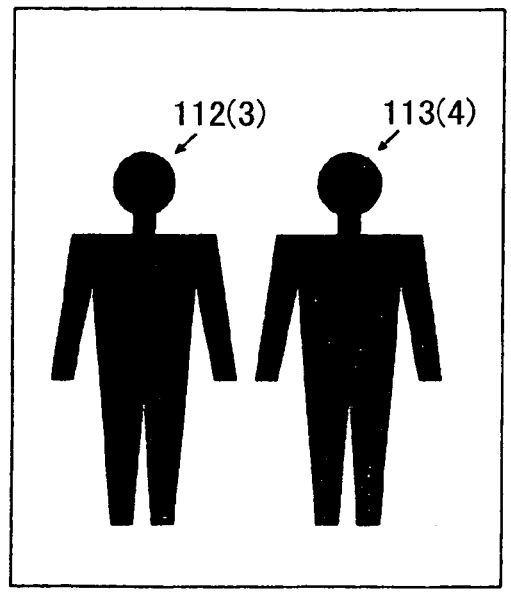
Figure 39:
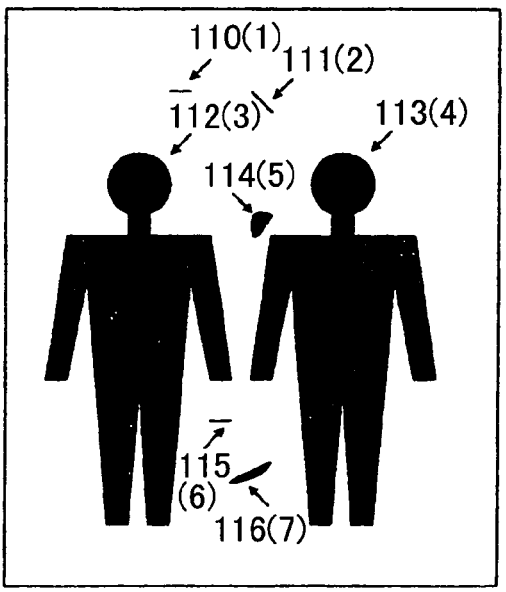
Figure 42:
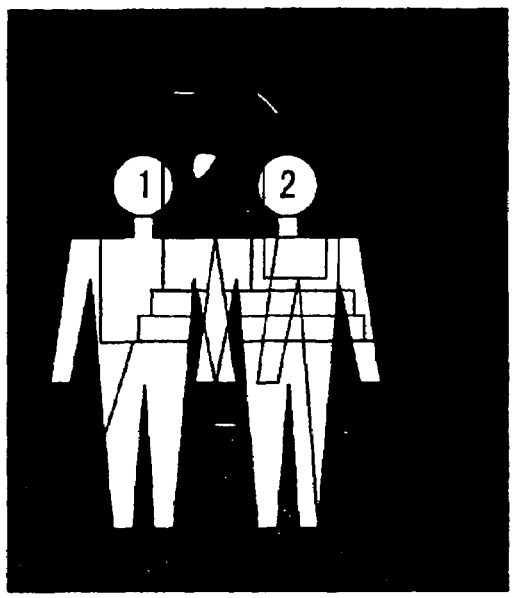
FIG. 42(a) is an explanatory diagram illustrating an example of a difference image generated from the first object image of FIG. 37(a) and a corrected image of the second object image of FIG. 41.
FIG. 42(b) is an explanatory diagram illustrating an example of a label image generated from the difference image of FIG. 42(a)
FIG. 42(c) is an explanatory diagram illustrating a label image obtained by removing noise portions from the label image of FIG. 42(b).
Figure 42:
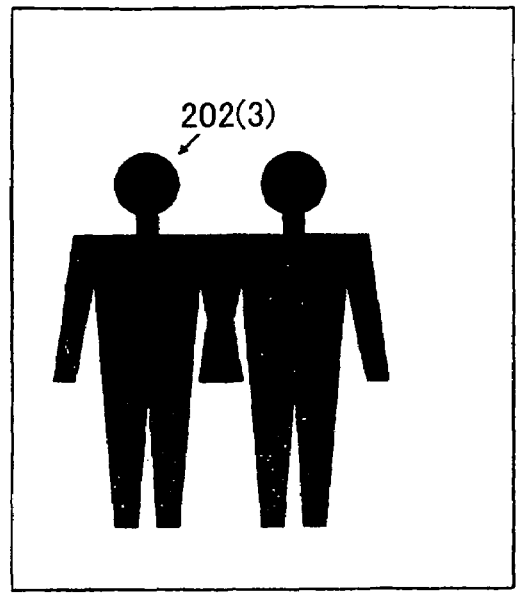
Figure 42:
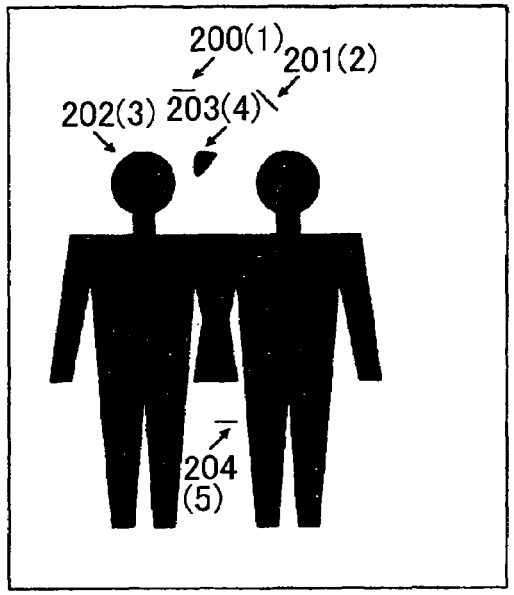

The processing performed here is a processing performed if there is no overlap between the objects in S15-3. Therefore, the first object and the second objects must be separated completely, as shown in FIG. 39(*c*). The first object and the second object must not be integrated as shown in FIG. 42(*c*).

In S15-5, since the number of objects to be photographed/combined does not correspond to the number of objects regions in the noise-free labeling image in S15-3, the object region extracting means 27 determines the object region in the noise-free labeling image as a region in which the first object region and the second object region are integrated (hereinafter "integrated object region"). Then, the processing jumps to p60.

In this case, the object region extracting means 27 treats the first object region and the second object region as an integrated region, instead of extracting the first object region and the second object region separately. As described above, if the outlines of the first object and the second object can be identified precisely, the processing of S15-4 may be performed, without performing the processing of S15-3 and S15-5.

By the processing in S15-1 to S15-5, the object region extraction processing in S15 of FIG. 36 is performed.

Figure 50:
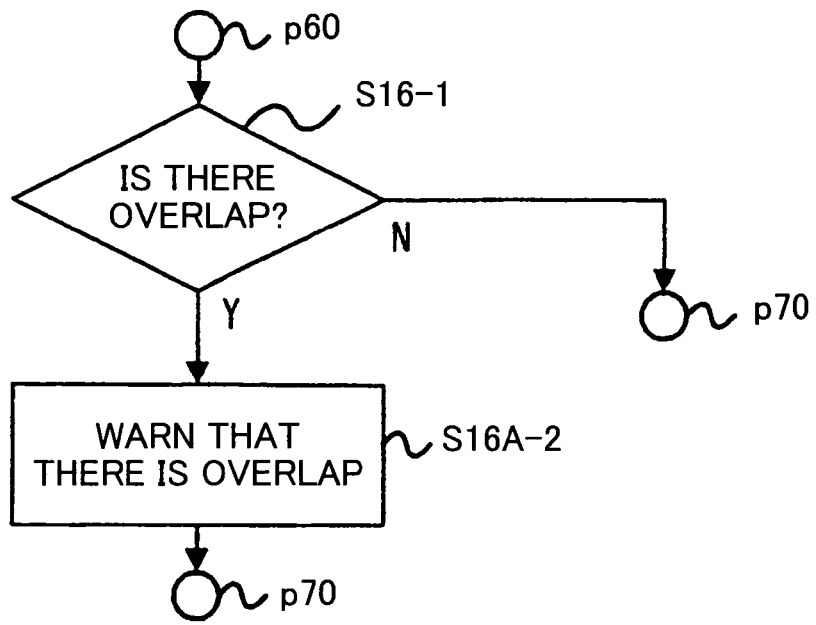
FIG. 50 is a flowchart illustrating a processing method for warning that there is overlap between object regions.

FIG. 50 is a flowchart illustrating a method of performing the processing in S16 of FIG. 36, that is, the processing on overlap. Another method for performing the processing on overlap is described later, with reference to FIGS. 51 and 23.

In S16-1, which is performed after p60, the overlap warning means 31 judges whether or not there is overlap, based on the information on overlap obtained from the overlap detecting means 28 (S15). If there is overlap, the processing proceeds to S16A-2. If there is no overlap, the processing jumps to p70.

In S16A-2, the overlap warning means 31 warns to the user (photographer) and/or the object that there is overlap between the first object and the second object. Then, the processing jumps to p70.

There are various ways to notify the warning.

For example, in the case where the warning is notified by using a composite image, the overlap portion of the object images may be displayed over the composite image so as to attract attention. FIG. 43 illustrates this example.

In FIG. 43, the region 202 of FIG. 42(*c*), that is, the region where the first object and the second object overlap, is displayed as a translucent image over the composite image. It is preferable that filtering effect is applied to the region 202 so that the region 202 is marked in red or other striking color (as if the region 202 is covered with a colored cellophane). Alternatively, the region of 202, the outline thereof, or the like may blink while being displayed. These combination methods are described later, with reference to FIG. 53.

FIG. 43 is an example in which the warning is also made with letters. In FIG. 43, an warning window is displayed over the composite image, and the warning window includes the following message: "OBJECTS OVERLAPPING!" Like the region 202, the massage may be colored in a striking color, or may blink.

Writing over the composite image may be instructed from the overlap warning means 31 to the superimposed image generating means 29, or to the superimposed image display means 30. In order to cause the warning window to blink, it might be necessary to use the initial composite image. Therefore, it is better in many cases, for example, to supply data of the warning window intermittently from the main memory 74 or the external memory 75 to the superimposed image display means 30.

By displaying the warning on the monitor 141 of FIG. 35(*a*), photographs can be taken conveniently in that the overlapping state can be confirmed while taking photographs. This is advantageous in that, if an image photographed next is to be used as the second object image or the like, the photographer can ask the object (person (2)) to move rightward, for example, to resolve the state of overlap.

The following are examples of the cases where image photographed next is to be used as the second object image: (i) the case where the user instructs the recording of the second object image (memory writing) by using a menu or a shutter button, and (ii) the case of the above-described exclusive mode for repeat processing, in which the second object image is photographed in such a manner as to shoot a moving picture, and the corrected superimposed image is displayed substantially in real time.

Although the monitor 141 in FIG. 35(*a*) is directed to the photographer, if the device is such that the monitor can be directed to the object, the object can also confirm the state of overlap, and move in his/her own initiative to resolve the overlap, without requiring the photographer's instruction. In addition to the monitor 141, another monitor may be provided for use by the object.

If the processing of S13 to S17 in FIG. 36 is to be repeated as in the exclusive mode described above, it is possible to know the current state of overlap substantially in real time. Therefore, it is possible to know substantially in real time whether or not the overlap has been resolved. This makes it possible to take photographs conveniently and efficiently. The processing in S13 to S17 of FIG. 36 do not require much time, if a sufficiently quick CPU, logic circuit, or the like is used. In actual use, it can be called a substantially real-time display if a repeat processing of at least about once a second can be realized.

If the first object image is used as the standard image in generating the corrected image in S14, the first image becomes the basis of the composite image. The background displayed on the monitor 141 is the background of the first object image. If the repeat processing is performed in real time as described above, the background to be photographed can be changed by moving the camera. However, the image to be photographed is not the first object image, but the second object image. Therefore, the background displayed on the monitor 141 remains to be the background of the first object image. This will make the user uncomfortable, because the scope to be photographed is not displayed/reflected on the monitor 141.

On the other hand, if the second object image is used as the standard image, the background of the second object image is displayed on the monitor 141. If the repeat processing is performed in real time as described above, the background to be photographed can be changed by moving the camera. Since the image to be photographed is the second object image (standard image), the background to be photographed is displayed on the monitor 141. This brings about an effect that the user will not feel uncomfortable, because the scope to be photographed is displayed/reflected on the monitor 141.

After the overlap region is displayed over the composite image, if it can be judged, based on the relationship between (i) the state of overlap between the objects and (ii) the frame of the composite image, that overlap will occur no matter how the object moves, or that the object will be out of the frame, it is possible to judge that it is better to go through the processing again, starting by photographing the first object image.

The warning may be notified by lighting up the lamp 142 of FIG. 35(*a*) or causing the lamp 142 to blink. The warning can be recognized easily if the color of the lamp is red, orange, or the like color. By causing the lamp to blink, there is an advantage that, in general, the photographer can easily recognize the blink even if he/she is not paying attention to the monitor 141.

As shown in FIG. 43, the overlap region may be notified by a warning message and/or the lamp only, without displaying the overlap image. In this case, the degree of overlap cannot be recognized immediately. However, as long as whether or not there is overlap is recognized, it is possible to attain the purpose of obtaining a composite image having no overlap, by moving the object and watching over whether or not the notification of warning has stopped. Therefore, if the occurrence of overlap is informed by using the warning message and/or the lamp only, there is an advantage that the processing for displaying the overlap portion can be omitted.

In FIG. 35(*a*), the lamp 142 is provided so that it can be seen only from the photographer side. However, the lamp 142 may be provided on the front side of the main body 140 of FIG. 35(*b*), so that it can be recognized from the object side as well. The effect is the same as the effect of the case where the object can view the monitor.

Although not provided in FIG. 35(*a*), if, in addition to the monitor 141, there is another means (e.g. a finder) through which images can be viewed, the same notification of warning as displayed on the monitor 141 may be displayed on the another means, or the notification may be made by using a lamp provided inside the finder.

Moreover, although not shown in FIGS. 35(*a*) and 35(*b*), the warning may be notified by using the speaker 80 of FIG. 34. The warning is notified by beeping a warning buzzer when there is overlap, or outputting such voice as "OVERLAPPING!". In this case, the same effect brought about by the lamp can be expected. If the speaker is used, there is an advantage that both the photographer and the object can know the state of overlap through a single speaker, because sound has little directivity unlike light.

By the processing in S16-1 to S16A-2, the processing on overlap in S16 of FIG. 36 can be performed.

Figure 51:
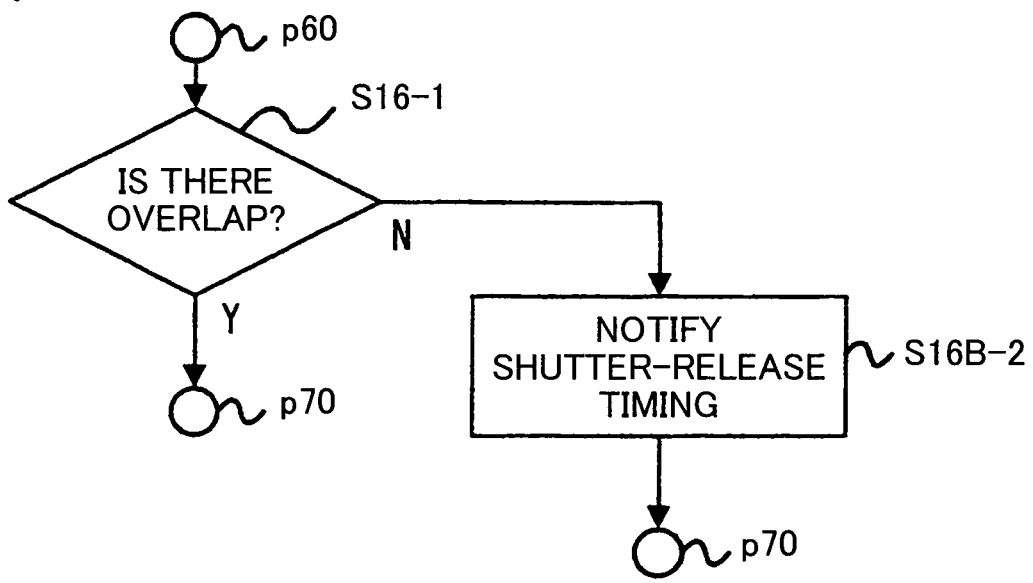
FIG. 51 is a flowchart illustrating a processing method for notifying shutter-release timing when there is no overlap between the object regions.

FIG. 51 is a flowchart illustrating still another method for performing the processing in S16 of FIG. 36, that is, the processing on overlap.

In S16-1, which is performed after p60, the shutter release timing notifying means 32 judges whether or not there is overlap, based on the information obtained from the overlap detecting means 28 (S15). If there is overlap, the processing jumps to p70. If there is no overlap, the processing proceeds to S16B-2.

In S16B-2, the shutter release timing notifying means 32 notifies, to the user (photographer) and/or the object, that there is no overlap. Then, the processing jumps to p70.

This notification is usually not so much a notification of the absence of overlap as a notification of the right timing for operation that depends upon the absence of overlap, that is, releasing the shutter and thereby recording the second object. In this case, the notification is addressed mainly to the photographer.

To notify the right timing for releasing the shutter, the method described above with reference to FIG. 50 may be employed. The message in FIG. 43 may be changed to "RELEASE SHUTTER!", for example. The notification may be made by using the lamp, speaker, and the like, although the color and outputted sound will be different to some degree.

Advantages of notifying the right timing for releasing the shutter are as follows: (i) the photographer can release the shutter and thereby photograph/record an image while there is no overlap, and (ii) the object can prepare for the release of the shutter (for example, the object can turn his/her eyes on something, and/or change facial expression).

By the processing in S16-1 to S16B-2, the processing on overlap in S16 of FIG. 36 can be performed.

Figure 52:
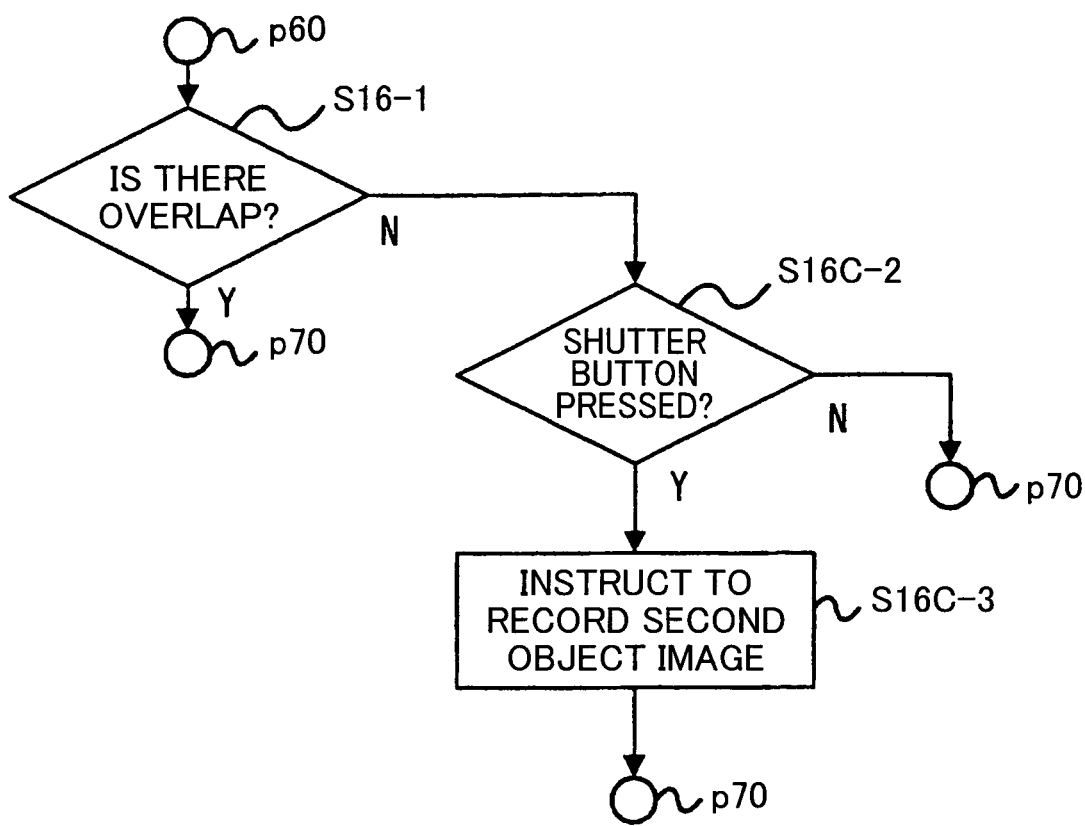
FIG. 52 is a flowchart illustrating a processing method for automatically releasing the shutter when there is no overlap between the object regions.

FIG. 52 is a flowchart illustrating a further method for performing the processing in S16 of FIG. 36, that is, the processing on overlap.

In S16-1, which is performed after p60, the automatic shutter releasing means 33 judges whether or not there is overlap, based on the information obtained from the overlap detecting means 28 (S15). If there is overlap, the processing jumps to p70. If there is no overlap, the processing proceeds to S16C-2.

In S16C-2, the automatic shutter releasing means 33 judges whether or not the shutter button is pressed. If the shutter button is pressed, the processing proceeds to S16C-3. If the shutter button is not pressed, the processing jumps to p70.

In S16C-3, the automatic shutter releasing means 33 instructs the second object image acquiring means 23 to record the second object image. Then, the processing jumps to P70. In accordance with the instruction, the second object image acquiring means 23 records the photographed image into the main memory 74, the external memory 75, or the like.

This arrangement has an effect that a photographed image can be recorded automatically if the shutter button is pressed while the objects are not overlapping. At the same time, there is an effect that no photographed image will be recorded by mistake while the objects are overlapping.

In actual use, the photographer observes the object and, when the photographer finds it appropriate to record an image, presses the shutter button. However, recording is not always performed at this time. No recording is performed if there is overlap. If the automatic shutter releasing means 33 judges that there is overlap, the recording of the second object image is prohibited so that no recording operation will be performed by the second object image acquiring means 23 even if the photographer presses the shutter.

If no recording has been performed, it is preferable to notify the photographer and/or the like, by displaying or using such notifying means as lamp or speaker, that no photograph has been taken even through the shutter is pressed.

If the shutter button is pressed again when there is no overlap (after the object has moved, for example), recording is performed this time. It is preferable to notify the photographer and/or the like, by displaying or using such notification means as lamp or speaker, that recording has been performed.

In the case where the shutter button is not pressed every time, but is kept being pressed, automatic recording is performed at the moment the state of overlap is resolved. However, if an image is recorded at the moment the overlap is resolved, there are cases where the photographed image is blurred because the object has not stopped yet, or where the object is not yet prepared for the release of the shutter (e.g. because the object's eyes are directed elsewhere). In such cases, it is preferable to take certain time before automatic recording is performed.

By the processing in S16-1 to S16C-3, the processing on overlap in S16 of FIG. 36 can be performed.

The processing in FIGS. 50 to 23 are not mutually exclusive; the processing may be combined arbitrarily. Such combination may be made in the following scene, for example.

If the objects are overlapping, a warning ("OVERLAPPING!") is made. At this time, no image is recorded even if the shutter button is pressed. The object moves in accordance with the warning. When the overlap disappears, a shutter release timing indicating lamp turns ON. If the shutter button is pressed while the shutter release timing indicating lamp is ON, an image is recorded.

Figure 53:
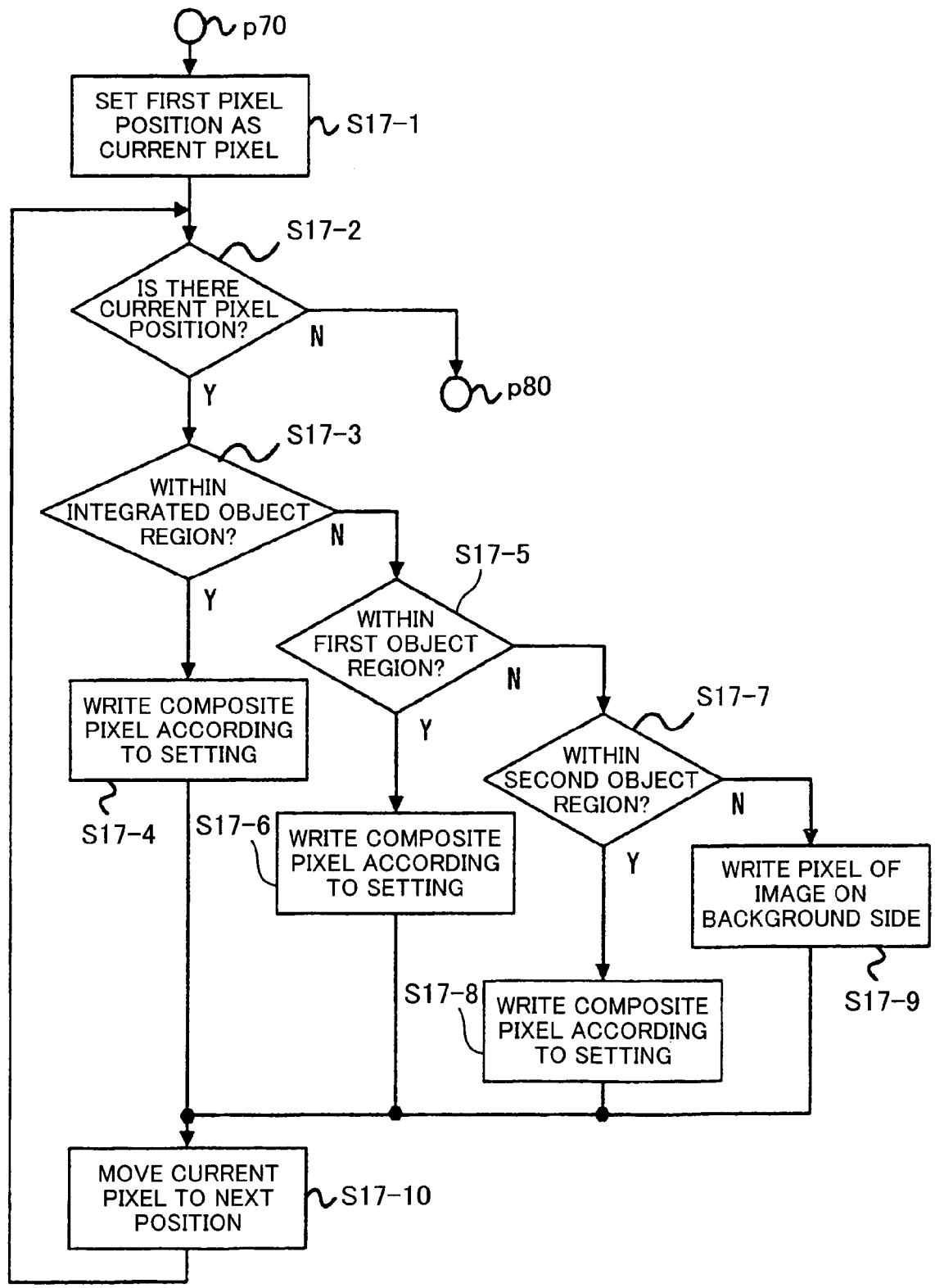
FIG. 53 is a flowchart illustrating a processing method for generating an overlap image.

Next, FIG. 53 is a flowchart illustrating a method for performing the processing in S17 of FIG. 36, that is, the processing for generating a superimposed image.

In S17-1, which is performed after p70, the superimposed image generating means 29 sets, to a current pixel, a first pixel position of the superimposed image to be generated. Then, the processing proceeds to S17-2. In many cases, the first pixel position is on the upper-left corner, for example.

A "pixel position" is a specific position on an image. In many cases, the pixel position is expressed by using X-Y coordinate system where the upper left corner is the origin, the rightward direction is the +X axis, and the downward direction is the +Y axis. The pixel position corresponds to an address on a memory storing image information. The pixel value is a value of the memory of the address.

In S17-2, the superimposed image generating means 29 judges whether or not there is any current pixel position. If there is any current pixel position, the processing proceeds to S17-3. If there is no current pixel position, the processing jumps to p80.

In S17-3, the superimposed image generating means 29 judges whether or not the current pixel position is within the integrated object region. If the current pixel position is within the integrated object region, the processing proceeds to S17-4. If not, the processing proceeds to S17-5.

Whether or not the current pixel position is within the integrated object region can be judged in accordance with whether or not the integrated object region is obtained by the overlap detecting means (S15-5), and the current pixel position on the integrated object region is black (zero).

In S17-4, the superimposed image generating means 29 generates a composite pixel according to a setting, and writes the composite pixel as a pixel value of the current pixel position of the superimposed image.

The setting is about what kind of superimposed image is to be generated (e.g. whether the first object is to be combined in a translucent state as in FIG. 40(b), or the first object is to be combined by direct overwriting as in FIG. 40(a)). Since the region in question is the integrated object region, the setting is virtually about a combination ratio (transmittance) in the region.

Once the combination ratio (transmittance) is determined, a pixel value P1 of the current pixel position of the first object image and a pixel value Pf2 of the current pixel position of the corrected second object image obtained from the corrected image generating means 25 (S14) are obtained, and a combined pixel value $(P1 \times (1-A) + Pf2 \times A)$, where A is a predetermined transmittance (between 0.0 and 1.0), is calculated.

For example, in order to make the integrated object region shown in FIG. 43 translucent, the transmittance A is set to 0.5.

In S17-5, if the superimposed image generating means 29 has judged in S17-3 that the current pixel position is not within the integrated object region, the superimposed image generating means 29 subsequently judges whether or not the current pixel position is within the first object region. If the current pixel position is within the first object region, the processing proceeds to S17-6. If not, the processing proceeds to S17-7.

Whether or not the current pixel position is within the first object region can be judged in accordance with whether or not the current pixel position is black (zero) on the first object image obtained from the object region extracting means 27

(S15). Since the current pixel position cannot be within the integrated object region and within the first object region at the same time, whether or not the current pixel position is within the first object region may not be judged (in other words, S17-5 may be omitted). In this case, the processing proceeds directly to S17-7.

If subsequent processing will not be changed regardless of whether or not the current pixel position is within the first object region, the processing may directly proceed from S17-3 to S17-7, omitting S17-5 and S17-6.

In S17-6, the superimposed image generating means 29 generates a composite pixel according to the setting, and writes the composite pixel as a pixel value of the current pixel position of the superimposed image. The processing performed here is identical to the processing in S17-4, except that the integrated object region (image) is replaced by the first object region (image).

If the first object is combined as a translucent image as in FIG. 40(b), the transmittance of the first object is set to 0.5. If the first object is combined by direct overwriting as an opaque image, the transmittance of the first object is set to 0.0.

In S17-7, if the superimposed image generating means 29 has judged in S17-5 that the current pixel position is not within the first object region, the superimposed image generating means 29 judges whether or not the current pixel position is within the second object region. If the current pixel position is within the second object region, the processing proceeds to S17-8. If not, the processing proceeds to S17-9. The processing performed here is identical to the processing in S17-5, except that the first object region is replaced by the second object region.

In S17-8, the superimposed image generating means 29 generates a composite pixel according to the setting, and writes the composite pixel as a pixel value of the current pixel position of the superimposed image. The processing performed here is identical to the processing in S17-6, except that the first object region is replaced by the second object region.

In S17-9, if the superimposed image generating means 29 has judged in S17-7 that the current pixel position is not within the second object region, the superimposed image generating means 29 writes the pixel value of the current pixel position of the first object image (standard image) as the pixel value of the current pixel position of the superimposed image. Since the current pixel position in this case is neither within the first object region nor within the second object region, the current pixel position is in the background portion.

In S17-10, the superimposed image generating means 29 sets the current pixel position to the next pixel position. Then, the processing turns back to S17-2.

By the processing in S17-1 to S17-10, the processing in S17 of FIG. 36 for generating a superimposed image can be performed.

According to the processing above, the first object image and the corrected background image are processed in S17-4, S17-6, and S17-9. As an alternative, before performing S17-1, all pixels of the first object image or the corrected background image may be copied into the superimposed image that is to be generated. Then, only the first object region and/or the second object region may be processed through the processing for each pixel position. The processing procedure is simpler if all the pixels are copied, although the processing time might increase slightly.

Although the composite image has the same size as the standard image here, the composite image may be larger or smaller than the standard image. For example, in generating the corrected image of FIG. 38(c), the original image is partially cut off. If the original image is not cut off (in this case, the corrected image becomes larger), the uncut portions can also be combined, thereby obtaining a larger background, hence a larger composite image. As a result, there is an effect that a so-called panoramic image can be generated.

FIG. 40(b) is a superimposed image in which the first object region alone is combined as a translucent image. FIG. 40(c) is a superimposed image in which the second object region alone is combined as a translucent image. FIG. 40(a) is a superimposed image generated by overwriting the first object region and the second object region without making them translucent. FIG. 43 is a superimposed image in which both the first object region and the second object region are combined as translucent images.

Which combination method to adopt depends on the purpose of combination. Therefore, it is preferable that the user can choose a combination method suitable for the purpose.

For example, in photographing the second object image without overlap after the first object image is photographed/recorded, no detailed image of the first object image is required, as long as an approximate position of the first object image can be seen so as to know whether or not there is overlap. Therefore, the first object may be combined as a translucent image. It is preferable to combine the second object image by overwriting, without making it translucent. This is because the shutter cannot be released at the right timing without knowing the facial expression of the second object image at the time of photographing. Thus, the combination method as shown in FIG. 40(b) is suitable.

As described above, if it is more comfortable for the user that the background of the image to be photographed (second object image) is adopted as the background of the composite image, it is suitable to use the second object image as the standard image, and combine the images as shown in FIG. 40(b), so that it is easier to recognize that the second object is to be photographed next.

For a user who prefers photographing an image while viewing the object region to be combined, it might be better to make both regions translucent during photographing, or to make only the second object translucent.

If the final composite image is to be generated by combining the first object image and the second object image after the second object is photographed/recorded, both the first object image and the second object image need to be combined by overwriting, because it would be troublesome if the objects were translucent. Therefore, the combination method as shown in FIG. 40(a) is suitable.

If the object regions obtained from the object region acquiring means 27 (S15) have already been expanded, not only the objects but also the background portions surrounding the objects are combined. However, since correction has already been made by the corrected image generating means 25 (S14) so that the background portions correspond, there is an effect that, even if the extracted object regions are slightly larger than the actual object regions (regions within outlines of objects), and include the background portions, the boundary between the combined images does not look unnatural.

If the object regions are expanded, transparency may be changed gradually in the vicinity of the boundary between the combined images, the vicinity including outside the object region, or in the vicinity of the boundary between the combined images, the vicinity being within the object region, so that the boundary between the combined images looks more natural. In this case, for example, the ratio of the images of the background portions is increased toward outside the object regions, and the ratio of the images of the object region is increased toward inside the object regions.

This arrangement has an effect that, even if the backgrounds are slightly inconsistent due to correction errors in the vicinity of the boundary between the combined images, it is possible to make the inconsistency less visible. Likewise, even if the object regions are extracted imprecisely, or even if the image of the background portion changes (for example, because trees shudder in the breeze, because it becomes cloudy, or because a stranger passes by) due to time lag of photographing, it is possible to make the inconsistency less visible.

As a matter of course, the object of the present invention can also be attained by supplying, to a system or device, a recording medium recording a program code of a software that realizes the functions described in the foregoing embodiment, and causing a computer (CPU) of the system or device to read and execute the program code recorded in the recording medium.

In this case, the functions described in the foregoing embodiment are realized by the program code itself that is read out of the recording medium. The recording medium storing the program code constitutes the present invention.

The recording medium for supplying the program code may be, for example, a flexible disk, a hard disk, an optical disk, a magnetooptical disk, an electromagnetic tape, a nonvolatile memory card, and the like.

The program code may be downloaded from another computer system to the main memory 74 or the external memory 75 of the image combination device via a transmission medium such as a communication network.

As a matter of course, the functions described in the foregoing embodiment may be realized not only by executing the program code read out by the computer, but also by performing part or all of actual processing in accordance with the instruction of the program code by using an OS (operating system) activated on the computer.

Moreover, as a matter of course, the functions described in the foregoing embodiment may be realized, after the program code read out of the recording medium is written into a memory provided to (i) an extension board inserted into the computer or (ii) an extension unit connected to the computer, by performing part or all of actual processing in accordance with the instruction of the program code by using a CPU or the like provided to the extension board or the extension unit.

In the case where the present invention is applied to the recording medium, the recording medium stores a program code corresponding to the flowchart described above.

Without limitation to the embodiment described above, the present invention may be varied in many ways within the scope of the claims.

As described above, a second image combination device of the present invention includes: amount of background correction calculating means for calculating an amount of background correction or reading out the amount of background correction after the amount of background correction is calculated, the background correction being performed among (i) a first object image, which includes a background and a first object, and (ii) a second object image, which includes at least a part of the background and a second object, the amount of background correction being one or a combination of relative amounts including an amount of movement, an amount of rotation, a rate of expansion or reduction, and an amount of distortion correction, with respect to a background; and superimposed image generating means for generating a superimposed image by using one of the first object image or the second object image as a standard image, correcting the other of the first object image or the second object image by the amount of correction obtained from the amount of background correction calculating means, so that a background portion, other than the object, of the other of the first object image or the second object image corresponds to the standard image at least partially, and superimposing the standard image and a corrected image.

With this arrangement, two images can be combined after correcting the gap and distortion between backgrounds. Therefore, those portions that remain after obviously different regions, such as objects, are removed (that is, background portions) corresponds in the composite image, no matter how they are superimposed. As a result, there is an effect that the composite image does not look unnatural. For example, in combining primarily an object region only, even if the object region is extracted and specified imprecisely, the background portion surrounding the object region does not mismatch a portion of an image to which the object region is to be combined. Therefore, inside and outside of the imprecise region are combined as a continuous scene. As a result, there is an effect of mitigating the unnatural look.

As discussed in the part of problems to be solved by the present invention, even if the object region is extracted with a pixel-size precision, the unnatural look at a level finer than one pixel is inevitable according to the conventional method. In contrast, according to the present invention, images are combined after correcting the gap and distortion in background portions. Therefore, a pixel surrounding an outline pixel is a pixel in the same position of the background portion, and is therefore combined naturally. Thus, there is an effect that it is possible to eliminate or mitigate the unnatural look at the level finer than one pixel.

Moreover, since the images are combined after the gap and distortion of backgrounds are corrected, it is not necessary to fix the camera or the like by a tripod or the like at the time of photographing the first or second object image. It is sufficient to direct the camera or the like approximately by hand or the like. As a result, there is an effect that photographs can be taken easily.

The second image combination device of the present invention may further include: image pickup means for picking up an image of an object or a scene, the first object image or the second object image being generated based on an output of the image pickup means.

According to this arrangement, the image combination device for generating a superimposed image includes image pickup means. Therefore, a superimposed image can be generated immediately after an object or a scene is photographed. This is more convenient for the user. There is also an effect that, if the superimposed image has any problem, such as overlap between objects, a photograph can be taken again immediately.

The image obtained from the image pickup means is usually recorded in a main memory, an external memory, or the like, which may or may not be provided inside the image combination device. The timing for recording is instructed by the user by using a shutter button or the like. The recorded image is used for combination processing as the first object image or the second object image.

The second image combination device of the present invention may be arranged so that the first object image or the second object image that is photographed later than the other is used as the standard image.

According to this arrangement, if the first object image and the second object image are photographed in this order, for example, the second object image is used as the standard image. Then, using the second object image as the standard image, the first object image is corrected. At this time, an amount of correction (e.g. amount of movement of a background portion) between the second object image (standard image) and the first object image is calculated, and the first object image is corrected by using the amount of correction. By using the corrected first object image, a composite image is created. Then, the composite image is displayed, for example.

As a result, the displayed composite image has the scope of the image that has just been photographed, or, if the composite image is displayed in real time, the scope of the background of the second object image, which is currently being photographed. As a result, there is an effect that the photographer will not feel uncomfortable.

If the first object image is used as the standard image, the background of the composite image has the scope of the background of the first object image. The scope of the background of the first object image could be different from the scope of the background of the second object image photographed earlier, due to change of directions of the camera, or change of photographers. In this case, because the scope of the background photographed later does not correspond to the scope of the background of the composite image displayed, the photographer or the like will feel uncomfortable.

If the operation of photographing the second object image and displaying the composite image is repeated in real time, the scope of the background of the composite image remains to be the scope of the background of the first object, even though the second object image is repeatedly replaced with a photographed image. As a result, the uncomfortable feeling will become greater.

The second image combination device of the present invention may be arranged so that the superimposed image generating means superimposes the standard image and the corrected image respectively at predetermined transmittances.

In this arrangement, a "predetermined transmittance" may be a fixed value, a value that differs from region to region, or a value that gradually changes in the vicinity of a boundary between regions.

The superimposed image generating means determines a pixel position of the superimposed image, obtains a pixel value in the pixel position on the standard image and a pixel value in the pixel position on another image, and multiplies the two pixel values by a predetermined transmittance, so as to obtain a pixel value of the superimposed image. This processing is performed in all pixel positions of the superimposed image.

By changing the transmittance from one pixel position to another, it is possible to increase the ratio of the standard image or the ratio of the corrected image according to the position.

By using this, in the case where only the object region of the corrected image is superimposed on the standard image, for example, the object region is superimposed so as to be opaque (the image of the object in the corrected image as it is) and the regions surrounding the object region are superimposed so that the ratio of the standard image increases as the position becomes farther from the object region. This arrangement has an effect that, even if the object region (the extracted outline of the object region) is incorrect, the incorrectness is indistinctive because the pixels surrounding the object region gradually change from the corrected image to the standard image.

Moreover, by displaying the composite image in such a manner that only the object region is superimposed at a half transmittance, for example, there is an effect that the user and/or the object can easily distinguish which portion of the displayed image is the portion that was photographed before (the part to which an image is combined) and which portion of the displayed image is an image to be photographed.

Usually, a human has an ability to distinguish between the background portion of an image and an object portion (outline) of the image by using common sense (image comprehension). This ability is generally effective even if the object region is superimposed and displayed at a half transmittance.

Therefore, by superimposing and displaying the object region at a half transmittance, even if a plurality of object regions are layered, it is possible to distinguish the object regions by using the ability. As a result, it is easy to judge whether or not the object regions overlap each other on the composite image.

It is not impossible to judge whether or not the first object image and the second object image overlap each other by comparing them when they are disposed side by side. In this case, however, it is necessary to distinguish the object region of each image by using the ability, and, considering the overlap between the background portions of the respective images, calculate in mind whether or not the distinguished object regions overlap each other. It is difficult to perform the series of operation precisely in mind alone, as compared to the method in which the object regions in the composite image are distinguished.

If a machine is used to perform positioning so that the background portions correspond to each other, there is created a situation in which it is easy to judge, by using the high image comprehension ability of human, whether or not the object regions overlap each other. By thus superimposing and displaying the object region at a half transmittance, there is an effect that it is easy to judge the position of the currently photographed object even if there is overlap between the objects.

If necessary, the arrangement described here may be combined arbitrarily with the arrangements described above.

The second image combination device of the present invention may be arranged so that the superimposed image generating means generates a difference image from the standard image and the corrected image, and a region in the difference image that has a difference is generated as an image having a pixel value that is different from an original pixel value.

The "difference image" is an image created by comparing pixel values at corresponding positions of two images, and using a value of the difference as a pixel value. In general, the value of the difference is an absolute value.

The "pixel value that is different from an original pixel value" is a pixel value that realizes, for example, (i) translucency by changing the transmittance, (ii) inverted display by inverting brightness/darkness, hue, or the like of the pixel value, and (iii) striking colors such as red, white, and black. The "pixel value that is different from an original pixel value" also includes such cases where (i) the a pixel value at a boundary between regions and a pixel value inside a region are different, (ii) the boundary is surrounded by dotted lines, or (iii) blink display (the pixel value is changed temporally) is performed.

According to this arrangement, a pixel value at one position of the standard image and a pixel value at a corresponding position of another (corrected) image are obtained, and if there is a difference between the pixel values, the pixel value of that pixel position of the superimposed image is set to a pixel value that is different from the pixel value of other regions. By performing this processing with respect to all pixels, it is possible to generate a difference portion as an image having a pixel value different from an original pixel value.

This arrangement has an effect that the user can easily judge which portions of two images do not correspond to each other. For example, the region of the first object (or the second object) in one of the standard image and the corrected image corresponds to an image of a background portion in the other of the standard image and the corrected image. Therefore, the regions of the first and second objects are extracted as difference regions of the difference image. The extracted regions may be translucent, may be displayed with inversion, or may have a pixel value of a striking color. This arrangement has an effect that the user can easily recognize the regions of the objects.

If necessary, the arrangement described here may be combined arbitrarily with the arrangements described above.

The second image display device of the present invention may further includes: object region extracting means for extracting a region of the first object and a region of the second object from a difference image generated from the standard image and the corrected image, the superimposed image generating means superimposing (a) the standard image or the corrected image and (b) images within the regions obtained from the object region extracting means, instead of superimposing the standard image and the corrected image.

This arrangement has an effect that an object region of the corrected object image alone can be combined onto the standard image. In other words, the object region of the standard image alone can be combined onto the corrected object image.

If this arrangement is combined with the processing for changing the transmittance of the object region by the superimposed image generating means, there is an effect that the user can easily know which region is to be combined and, if any, the occurrence of overlap between objects. This also brings about an effect of helping the photography by avoiding overlap. If there is overlap, the image may be photographed again after resolving the overlap by moving the object or the camera. Helping the photography in this case means, for example, making it easier for the user to know whether or not there is overlap, and giving the user information (here, the composite image) on how much the object or the camera should move to avoid the overlap.

If necessary, the arrangement described here may be combined arbitrarily with the arrangements described above.

The second image combination device of the present invention may be arranged so that the object region extracting means extracts an image within the region of the first object and an image within the region of the second object from the first object image or a corrected first object image, extracts an image within the region of the first object and an image within the region of the second object from the second object image or a corrected second object image, and discriminates between an image of the first object and an image of the second object by using skin color as a benchmark.

According to this arrangement, the object region extracting means can know that an object region extracted from the difference image is the region of the first object or the region of the second object. However, the object region extracting means cannot know whether the object region is the region of the first object or the region of the second object. In other words, the object region extracting means cannot know whether the image of the object represented by the region is within the first object image or within the second object image.

If it is known that the object is a person, colors of the pixels in the region are checked between the first object image (standard image) and the corrected second object image, or between the second object image (standard image) and the corrected first object image. In any case, the object region extracting means extracts the image of the region of the first object and the image of the region of the second object from the standard image and the corrected image. Thus, four image portion are extracted in total.

The four image portions includes an image portion of the first object, a background portion having the shape of the second object, a background portion having the shape of the first object, and an image of the region of the second object. By using a skin color as a benchmark, it is possible to distinguish the image portions of the first object and the second object, which have a skin color or a similar color.

As a result, there is an effect that it is possible to easily judge automatically whether an extracted image portion is the first object or the second object.

The second image combination device of the present invention may be arranged so that the object region extracting means extracts an image within the region of the first object and an image within the region of the second object from the first object image or a corrected first object image, extracts an image within the region of the first object and an image within the region of the second object from the second object image or a corrected second object image, and discriminates between an image of the first object and an image of the second object by using, as a benchmark, a characteristic of an image outside each region.

This arrangement is the same as the foregoing arrangement in that the object region extracting means extracts four image portions. However, instead of the skin color, a characteristic of an image outside each region is used as a benchmark for distinguishing the image portions of the first object and the second object.

A "characteristic" is a property, attribute, or the like of a region of an image. It is preferable if the characteristic can be expressed numerically as an amount of characteristic. Examples of the amount of characteristic are the pixel value of each color, the hue, saturation, and brightness of each color, and statistics values indicating a pattern or structure of an image, such as cooccurrence matrix, difference statistics value, run-length matrix, power spectrum, and secondary or higher order statistics value of these.

The amount of characteristic of each region (each image portion extracted) in the standard image and in the corrected image is calculated. The amount of characteristic of a surrounding region in the standard image and in the corrected image is also calculated. The difference between the amount of characteristic of the region and the amount of characteristic of the surrounding region is compared between the first object image and the second object image, and the image having a greater difference is judged to be the image of the object region.

As a result, there is an effect that it is possible to easily judge automatically whether an extracted image portion is the first object or the second object.

The second image combination device of the present invention may further include: overlap detecting means that judges that the region of the first object and the region of the second object overlap, when the number of regions of the first object or the second object obtained from the object region extracting means does not correspond to a value set as the number of objects to be combined.

In this arrangement, the "regions of the first object or the second object" are regions of objects extracted from the difference image or the like, the regions being indistinguishable between the region of the first object and the region of the second object.

The "objects to be combined" are not objects obtained in the course of combination processing, but objects that actually exist (objects to be combined by the user). Since the unit of combination processing handled collectively is a single "object", one object can be a plurality of persons.

The number of objects may be set as a fixed number in the image combination device. To make the image combination device user-friendlier, it is preferable that the number is set in the image combination device in accordance with an instruction of the user, such as the photographer, before overlap detection is performed by the overlap detecting means.

The object regions extracted from the difference image by the object region extracting means are separated from each other if the objects do not overlap. If the objects overlap, the region of the first object and the region of the second object are integrated as continuous regions. Therefore, the overlap detecting means compares the number of object regions extracted and the number of objects (set number), and judges that the objects do not overlap if the numbers correspond, and that the objects overlap if the numbers do not correspond.

The result of judgment can be used for notifying or warning the user or the object of the occurrence of overlap, by using a composite screen or a lamp.

The foregoing arrangement has an effect that the user can easily judge if there is a portion where the objects overlap. There is also an effect of helping the photography by avoiding overlap, as in the foregoing arrangement.

The second image combination device of the present invention may further include: overlap warning means for warning the user and/or the object that there is overlap, when overlap is detected by the overlap detecting means.

The "warning" includes a warning by displaying letters and/or an image on display means or the like. The warning includes a warning by any other method (e.g. light of a lamp or the like, sounds from a speaker or the like, vibrations of a vibrator or the like), as long as the user and/or the object can sense the warning.

According to this arrangement, a warning is made by the operation of the overlap warning means when there is overlap between the objects. Therefore, it is possible to prevent the user from photographing/recording an image or combining images without noticing the overlap. In addition, there is an effect of helping photography by immediately notifying the object that positional adjustment or the like is needed.

The second image combination device of the present invention may further include: shutter release timing notifying means for notifying the user and/or the object that there is no overlap, when no overlap is detected by the overlap detecting means.

Like the "warning", "notifying" includes any method as long as the user or the object can sense the notification.

With this arrangement, the user can know when there is no overlap between the objects. Therefore, there is an effect of helping photography in that, by photographing/recording an image or combining images at this timing, the objects can be combined without overlap.

Moreover, since the right timing for releasing the shutter can be notified also to the object, there is an effect of helping photography in that the object can immediately prepare for being photographed by posing, looking in an appropriate direction, and the like.

The second image combination device of the present invention may further include: image pickup means for picking up an image of an object or a scene; and automatic shutter releasing means for generating an instruction when no overlap is detected by the overlap detecting means, the instruction instructing that the image obtained from the image pickup means be recorded as the first object image or the second object image.

According to this arrangement, recording an image as the first object image or the second object image is realized, for example, by recording the image in a main memory or an external memory. Therefore, the automatic shutter releasing means outputs an instruction for recording control processing to the main memory, the external memory, or the like, when a signal indicating that there is no overlap between the region of the first object and the region of the second object is inputted from the overlap detecting means.

Then, the amount of background correction calculating means and the superimposed image generating means read the image recorded in the main memory, the external memory, or the like. In this way, the first object image and the second object image are obtained.

Even if the instruction is automatically made by the automatic shutter releasing means, the image may not always be recorded immediately. For example, the image may be recorded only when the shutter button is pressed at the same time, or when the device is in an automatic recording mode.

According to this arrangement, an image is photographed automatically only when there is no overlap between the objects. Therefore, there is an effect of helping photography in that the user is not required to press the shutter button after judging whether or not there is overlap.

The second image combination device of the present invention may further include: image pickup means for picking up an image of an object or a scene; and automatic shutter releasing means for generating an instruction when overlap is detected by the overlap detecting means, the instruction instructing that the image obtained from the image pickup means should not be recorded as the first object image or the second object image.

According to this arrangement, the automatic shutter releasing means outputs an instruction when a signal indicating that there is overlap is obtained from the overlap detecting means, the instruction instructing that the image obtained from the image pickup means should not be recorded in the main memory, the external memory, or the like. As a result, the image obtained from the image pickup means will not be recorded even if the shutter button is pressed. This prohibition processing may be performed only when the device is in an automatic prohibition mode, for example.

Thus, since the image will not be photographed when there is overlap between the objects, the foregoing arrangement has an effect of helping photography in that it is possible to prevent the user from photographing/recording an image by mistake when there is overlap.

A second image combination method of the present invention includes: amount of background correction calculating step, in which an amount of background correction is calculated, or the amount of background correction is read out after the amount of background correction is calculated and recorded, the background correction being performed between (i) a first object image, which includes a background and a first object and (ii) a second object image, which includes at least a part of the background and a second object, the amount of background correction being one or a combination of relative amounts including an amount of movement, an amount of rotation, a rate of expansion or reduction, and an amount of distortion correction, with respect to a background; and superimposed image generating step, in which a superimposed image is generated by using one of the first object image or the second object image as a standard image, correcting the other of the first object image or the second object image by the amount of correction obtained from the amount of background correction calculating means, so that a background portion, other than the object, of the other image corresponds to the standard image at least partially, and superimposing the standard image and the corrected image.

Effects of this arrangement is described above.

A second image combination program of the present invention causes a computer to function as each means of the image combination device.

A second image combination program of the present invention causes a computer to execute each step of the image combination method.

A second recording medium of the present invention contains the image combination program.

According to the foregoing arrangements, it is possible to realize the image combination method by using a commonly used computer in which the image combination program is installed through the recording medium or a network. In other words, it is possible to cause the computer to function as the image combination device.

The present invention is not limited to the foregoing embodiments. The same may be varied in many ways within the scope of the claims. Any embodiment conceived by appropriately combining technical means disclosed in different embodiments is also included within the technical means of the present invention.

The specific embodiments and examples in BEST MODE FOR CARRYING OUT THE INVENTION section are described only for clarifying technical contents of the present invention. The present invention should not be interpreted as being limited to these specific examples. The present invention may be carried out in various ways within the scope of the spirit of the present invention and the following claims.

INDUSTRIAL APPLICABILITY

The present invention is applicable to devices, software, and the like for collecting and processing images, such as digital cameras, portable phones having an image-pickup function, surveillance cameras, web cameras, scanners, copying machines, facsimiles, and image editing software.

What is claimed is:

1. An image combination device, comprising:
    amount of background correction calculating means for calculating an amount of background correction or reading out the amount of background correction after the amount of background correction is calculated and recorded, the amount of background correction being performed among (i) a background image, which is an image of a background, (ii) a first object image, which includes at least a part of the background and a first object, and (iii) a second object image, which includes at least a part of the background and a second object, the amount of background correction being one or a combination of relative amounts including an amount of movement, an amount of rotation, a rate of expansion or reduction, and an amount of distortion correction, with respect to a background;
    superimposed image generating means for generating a superimposed image by using one of the background image, the first object image, and the second object image as a standard image, correcting the other two images by the amount of background correction obtained from the amount of background correction calculating means, the other two images being corrected so that backgrounds, other than objects, of the other two images correspond to the standard image at least partially, and superimposing the standard image and one or both of the other two images; and
    object region extracting means for extracting a region of the first object and a region of the second object from a difference image generated from the standard image and the other one or two corrected images,
    the superimposed image generating means superimposing the standard image and the regions of the one or two corrected images obtained from the object region extracting means, instead of superimposing the standard image and the one or two corrected images.

2. The image combination device as set forth in claim 1, further comprising:
    image pickup means for picking up an image of an object or a scene,
    the background image, the first object image, or the second object image being generated based on an output of the image pickup means.

3. The image combination device as set forth in claim 2, wherein:
    either of the first object image or the second object image that is photographed earlier is used as the standard image.

4. The image combination device as set forth in claim 3, wherein:
    the background image is photographed immediately before or immediately after the standard image is photographed.

5. The image combination device as set forth in claim 1, wherein:
    the superimposed image generating means superimposes the standard image and the other one or two corrected images respectively at predetermined transmittances.

6. The image combination device as set forth in claim 1, wherein:
    the superimposed image generating means generates a difference image from the standard image and the other one or two corrected images, and a region in the difference image that has a difference is generated as an image having a pixel value that is different from an original pixel value.

7. The image combination device as set forth in claim 1, further comprising:
    overlap detecting means for detecting overlap between the region of the first object and the region of the second object obtained from the object region extracting means.

8. The image combination device as set forth in claim 7, further comprising:
    overlap warning means for warning a user and/or the object that there is overlap, when overlap is detected by the overlap detecting means.

9. The image combination device as set forth in claim 7, further comprising:
    shutter release timing notifying means for notifying the user and/or the object that there is no overlap, when no overlap is detected by the overlap detecting means.

10. The image combination device as set forth in claim 7, further comprising:
    image pickup means for picking up an image of an object or a scene; and
    automatic shutter releasing means for generating an instruction when no overlap is detected by the overlap detecting means, the instruction instructing that the image obtained from the image pickup means be recorded as the background image, the first object image, or the second object image.

11. The image combination device as set forth in claim 7, further comprising:
   image pickup means for picking up an image of an object or a scene; and
   automatic shutter releasing means for generating an instruction when overlap is detected by the overlap detecting means, the instruction instructing that the image obtained from the image pickup means should not be recorded as the background image, the first object image, or the second object image.

12. The image combination device as set forth in claim 7, wherein:
   the overlap detecting means extracts an overlap region where the region of the first object and the region of the second object overlap.

13. The image combination device as set forth in claim 12, wherein:
   the superimposed image generating means generates the superimposed image in such a manner that the overlap region extracted by the overlap detecting means has a pixel value that is different from an original pixel value.

14. The image combination device as set forth in any one of claims 7 to 13, further comprising:
   overlap prevention method calculating means for calculating a position or a direction of the position of the first object or the second object when overlap is detected by the overlap detecting means, the position being a position at which the overlap is reduced; and
   overlap prevention method notifying means for notifying the user and/or the object of the position or the direction of the position of the first object or the second object, the position or the direction of the position being obtained from the overlap prevention method calculating means.

15. An image combination device, comprising:
   amount of background correction calculating means for calculating an amount of background correction or reading out the amount of background correction after the amount of background correction is calculated, the amount of background correction being performed among (i) a first object image, which includes a background and a first object, and (ii) a second object image, which includes at least a part of the background and a second object, the amount of background correction being one or a combination of relative amounts including an amount of movement, an amount of rotation, a rate of expansion or reduction, and an amount of distortion correction, with respect to a background;
   superimposed image generating means for generating a superimposed image by using one of the first object image or the second object image as a standard image, correcting the other of the first object image or the second object image by the amount of background correction obtained from the amount of background correction calculating means, so that a background portion, other than the object, of the other of the first object image or the second object image corresponds to the standard image at least partially, and superimposing the standard image and a corrected image; and
   object region extracting means for extracting a region of the first object and a region of the second object from a difference image generated from the standard image and the corrected image,
   the superimposed image generating means superimposing (a) the standard image or the corrected image and (b) images within the regions obtained from the object region extracting means, instead of superimposing the standard image and the corrected image.

16. The image combination device as set forth in claim 15, further comprising:
   image pickup means for picking up an image of an object or a scene,
   the first object image or the second object image being generated based on an output of the image pickup means.

17. The image combination device as set forth in claim 16, wherein:
   the first object image or the second object image that is photographed later than the other is used as the standard image.

18. The image combination device as set forth in claim 15, wherein:
   the superimposed image generating means superimposes the standard image and the corrected image respectively at predetermined transmittances.

19. The image combination device as set forth in claim 15, wherein:
   the superimposed image generating means generates a difference image from the standard image and the corrected image, and a region in the difference image that has a difference is generated as an image having a pixel value that is different from an original pixel value.

20. The image combination device as set forth in claim 15, wherein:
   the object region extracting means extracts an image within the region of the first object and an image within the region of the second object from the first object image or a corrected first object image, extracts an image within the region of the first object and an image within the region of the second object from the second object image or a corrected second object image, and discriminates between an image of the first object and an image of the second object by using skin color as a benchmark.

21. The image combination device as set forth in claim 15, wherein:
   the object region extracting means extracts an image within the region of the first object and an image within the region of the second object from the first object image or a corrected first object image, extracts an image within the region of the first object and an image within the region of the second object from the second object image or a corrected second object image, and discriminates between an image of the first object and an image of the second object by using, as a benchmark, a characteristic of an image outside each region.

22. The image combination device as set forth in claim 15, further comprising:
   overlap detecting means that judges that the region of the first object and the region of the second object overlap, when the number of regions of the first object or the second object obtained from the object region extracting means does not correspond to a value set as the number of objects to be combined.

23. The image combination device as set forth in claim 22, further comprising:
   overlap warning means for warning the user and/or the object that there is overlap, when overlap is detected by the overlap detecting means.

24. The image combination device as set forth in claim 22, further comprising:
   shutter release timing notifying means for notifying the user and/or the object that there is no overlap, when no overlap is detected by the overlap detecting means.

25. The image combination device as set forth in claim 22, further comprising:

image pickup means for picking up an image of an object or a scene; and automatic shutter releasing means for generating an instruction when no overlap is detected by the overlap detecting means, the instruction instructing that the image obtained from the image pickup means be recorded as the first object image or the second object image.

26. The image combination device as set forth in claim 22, further comprising:

image pickup means for picking up an image of an object or a scene; and automatic shutter releasing means for generating an instruction when overlap is detected by the overlap detecting means, the instruction instructing that the image obtained from the image pickup means should not be recorded as the first object image or the second object image.

27. An image combination program encoded within a computer-readable medium, wherein the device set forth in claim 1 includes said computer-readable medium to, when executed by a computer, perform the functions set forth in claim 1.

28. An image combination device, comprising:

amount of background correction calculating means for calculating an amount of background correction or reading out the amount of background correction after the amount of background correction is calculated and recorded, the amount of background correction being performed among (i) a background image, which is an image of a background, (ii) a first object image, which includes at least a part of the background and a first object, and (iii) a second object image, which includes at least a part of the background and a second object, the amount of background correction being one or a combination of relative amounts including an amount of movement, an amount of rotation, a rate of expansion or reduction, and an amount of distortion correction, with respect to a background; and superimposed image generating means for generating a superimposed image by using one of the background image, the first object image, and the second object image as a standard image, correcting the other two images by the amount of background correction obtained from the amount of background correction calculating means, the other two images being corrected so that backgrounds, other than objects, of the other two images correspond to the standard image at least partially, and superimposing the standard image and one or both of the other two images, wherein:

the superimposed image generating means generates a difference image from the standard image and the other one or two corrected images, and a region in the difference image that has a difference is generated as an image having a pixel value that is different from an original pixel value.

29. An image combination device, comprising:

amount of background correction calculating means for calculating an amount of background correction or reading out the amount of background correction after the amount of background correction is calculated, the amount of background correction being performed among (i) a first object image, which includes a background and a first object, and (ii) a second object image, which includes at least a part of the background and a second object, the amount of background correction being one or a combination of relative amounts including an amount of movement, an amount of rotation, a rate of expansion or reduction, and an amount of distortion correction, with respect to a background; and superimposed image generating means for generating a superimposed image by using one of the first object image or the second object image as a standard image, correcting the other of the first object image or the second object image by the amount of background correction obtained from the amount of background correction calculating means, so that a background portion, other than the object, of the other of the first object image or the second object image corresponds to the standard image at least partially, and superimposing the standard image and a corrected image, wherein:

the superimposed image generating means generates a difference image from the standard image and the corrected image, and a region in the difference image that has a difference is generated as an image having a pixel value that is different from an original pixel value.

* * * * *

UNITED STATES PATENT AND TRADEMARK OFFICE
CERTIFICATE OF CORRECTION

| | | |
|---|---|---|
| PATENT NO. | : 7,623,733 B2 | Page 1 of 1 |
| APPLICATION NO. | : 10/523770 | |
| DATED | : November 24, 2009 | |
| INVENTOR(S) | : Masashi Hirosawa | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1326 days.

Signed and Sealed this

Twenty-sixth Day of October, 2010

David J. Kappos
*Director of the United States Patent and Trademark Office*